(12) United States Patent
Khateeb Razack

(10) Patent No.: US 12,394,834 B2
(45) Date of Patent: Aug. 19, 2025

(54) THERMAL MANAGEMENT SYSTEM AND DEVICE

(71) Applicant: Siddique Ali Khateeb Razack, Lombard, IL (US)

(72) Inventor: Siddique Ali Khateeb Razack, Lombard, IL (US)

( * ) Notice: Subject to any disclaimer, the term of this patent is extended or adjusted under 35 U.S.C. 154(b) by 739 days.

(21) Appl. No.: 17/441,357

(22) PCT Filed: Mar. 20, 2020

(86) PCT No.: PCT/US2020/023794
§ 371 (c)(1),
(2) Date: Sep. 21, 2021

(87) PCT Pub. No.: WO2020/197982
PCT Pub. Date: Oct. 1, 2020

(65) Prior Publication Data
US 2022/0158273 A1 May 19, 2022

Related U.S. Application Data

(60) Provisional application No. 62/822,380, filed on Mar. 22, 2019, provisional application No. 62/901,291, filed on Sep. 17, 2019.

(51) Int. Cl.
*H01M 50/213* (2021.01)
*H01M 10/613* (2014.01)
(Continued)

(52) U.S. Cl.
CPC ..... *H01M 10/6556* (2015.04); *H01M 10/613* (2015.04); *H01M 10/643* (2015.04); *H01M 10/6551* (2015.04); *H01M 50/213* (2021.01)

(58) Field of Classification Search
CPC ............. H01M 10/625; H01M 10/655; H01M 10/613; H01M 10/643
See application file for complete search history.

(56) References Cited

U.S. PATENT DOCUMENTS 8,733,465 B1 5/2014 Flood et al.
2003/0183379 A1 10/2003 Krassowski et al.
(Continued)

OTHER PUBLICATIONS

Melamine, Wikipedia, 2011 (retrieved from the internet on May 27, 2020 at <https://en.wikipedia.org/wiki/Melamine>) p. 3 para 1.
(Continued)

*Primary Examiner* — Kenneth J Douyette
(74) *Attorney, Agent, or Firm* — Duane Morris LLP; Heidi E. Lunasin

(57) ABSTRACT

The invention relates to thermal management systems for devices that generate heat, including electronic devices such as portable electronics, for example, cell phones, electronic components, and/or battery systems. A multilayer phase change material composite structure may include multiple layers having different properties. For example, a PCM material composite layer may include a supporting structure having pores and a phase change material. Further, a layer of fire retardant material may be used in the multilayer phase change material. In some embodiments, additional layers such as coatings, thermal interface materials, and/or high thermal conductivity material may be present. A matrix formed from a porous supporting structure and a phase change material may be used to control and/or dissipate heat in a thermal management system. Support elements may provide stability. The thermal management system may mitigate conditions that could lead to a thermal runaway event and/or may influence conditions within the system during a potential thermal runaway event to reduce risk of fire. The thermal management system may include water, flame- and/or fire-retardant materials to control temperatures of an energy storage device and/or system. A housing may be used to surround a portion of a heat generating device such as an energy storage device or system, for example, an individual battery or a group of batteries, respectively. The
(Continued)

housing or enclosure may include interior structures that surround and in some cases electrically isolate batteries from a thermal sink that includes a porous flame- and/or fire-retardant material having water in the pores.

20 Claims, 44 Drawing Sheets

(51) Int. Cl.
  *H01M 10/643* (2014.01)
  *H01M 10/6551* (2014.01)
  *H01M 10/6556* (2014.01)

(56) References Cited

U.S. PATENT DOCUMENTS

| | | | |
|---|---|---|---|
| 2005/0202310 A1* | 9/2005 | Yahnker | H01M 50/24 429/62 |
| 2008/0008883 A1 | 1/2008 | Miller et al. | |
| 2010/0151308 A1* | 6/2010 | Hermann | H01M 50/209 429/120 |
| 2011/0281485 A1 | 11/2011 | Rolland et al. | |
| 2015/0053086 A1 | 2/2015 | Rebouillat et al. | |
| 2016/0212878 A1 | 7/2016 | Quinn et al. | |
| 2016/0226042 A1 | 8/2016 | Hartmann et al. | |
| 2018/0287231 A1 | 10/2018 | Iyengar et al. | |

OTHER PUBLICATIONS

Phase-change material, Wikipedia, 2009 (retrieved from the internet on May 28, 2020 at <https://en.wikipedia.org/wiki/Phase-change_material>] para 7.

Sumirat, I., et al., Theoretical Consideration of the Effect of Porosity on Thermal Conductivity of Porous Materials, J Porous Mater (2006) vol. 13, pp. 439-443. Abstract.

Thermal Interface Material, Wikipedia, retrieved from the internet on May 28, 2020 at <https://en.wikipedia.org/wiki/Thermal_interface_material>) para 1.

Fin (extended surface), Wikipedia 2011 (retrieved from the internet on May 28, 2020) at <https://en.wikipedia.org/wiki/Fin_(extended_surface)>) para 1.

* cited by examiner

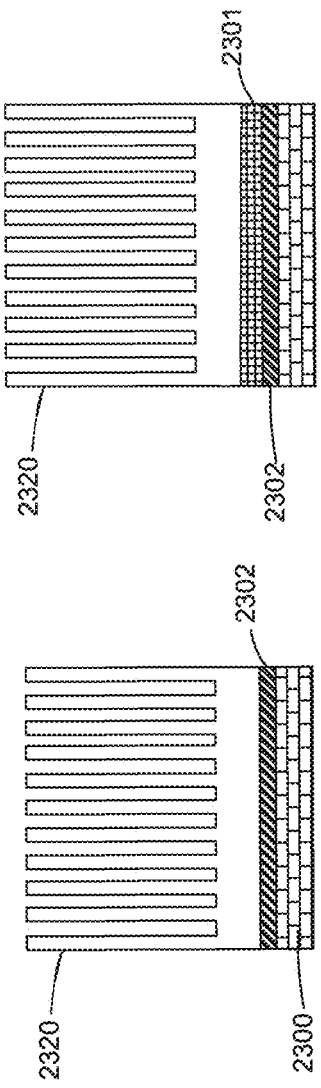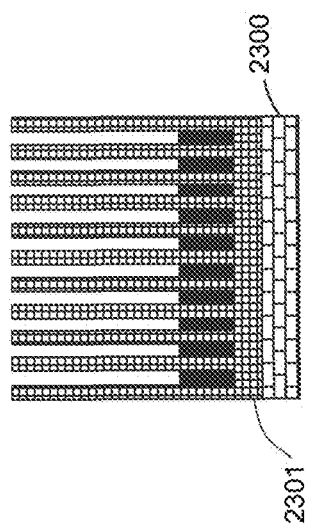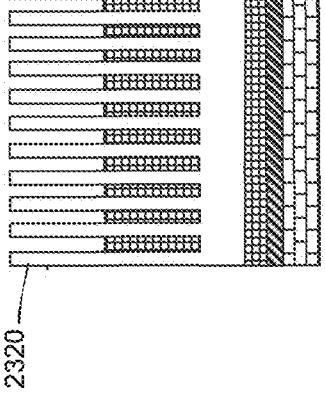

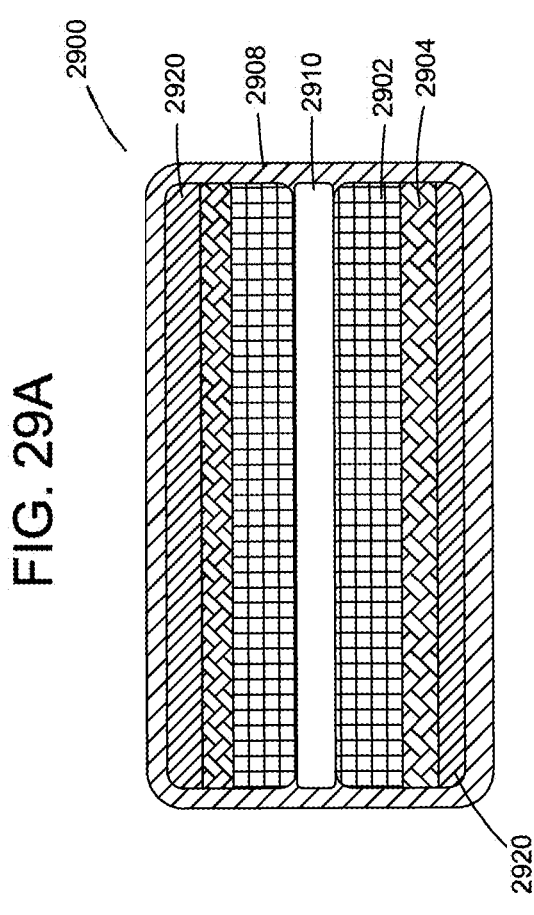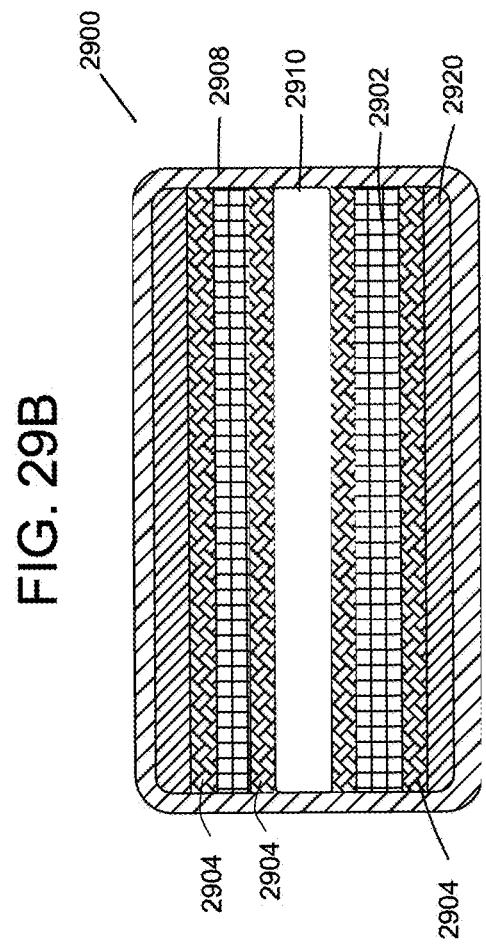

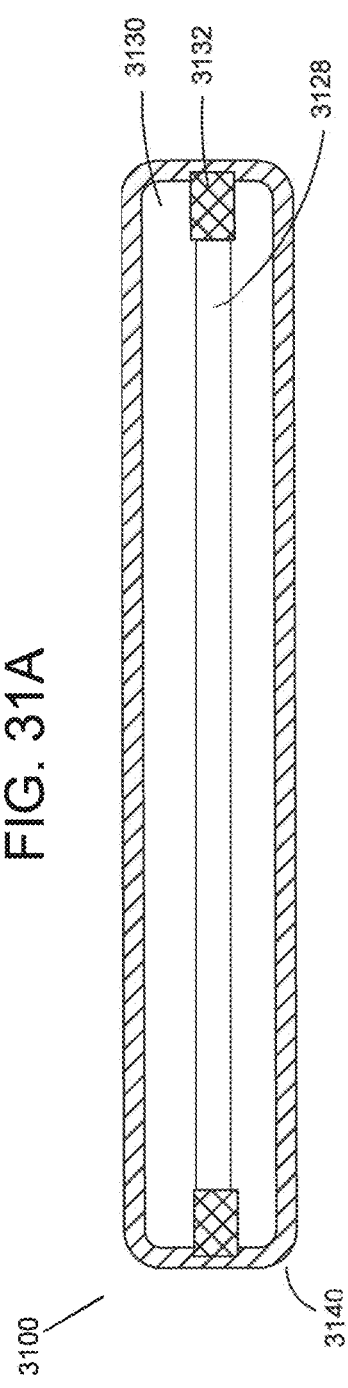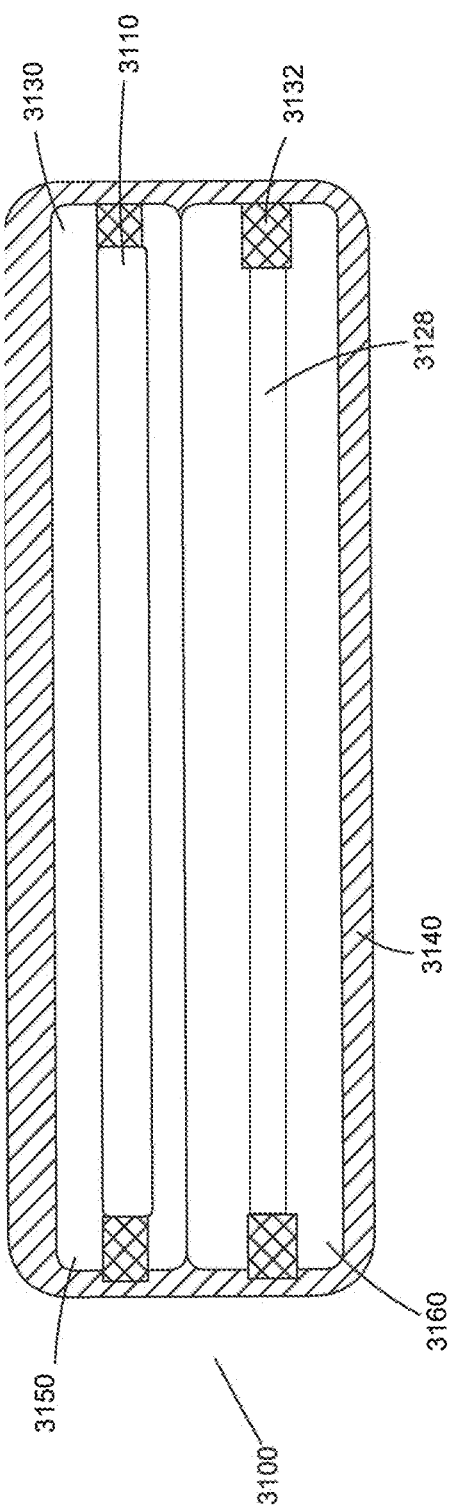
FIG. 31A
FIG. 31B

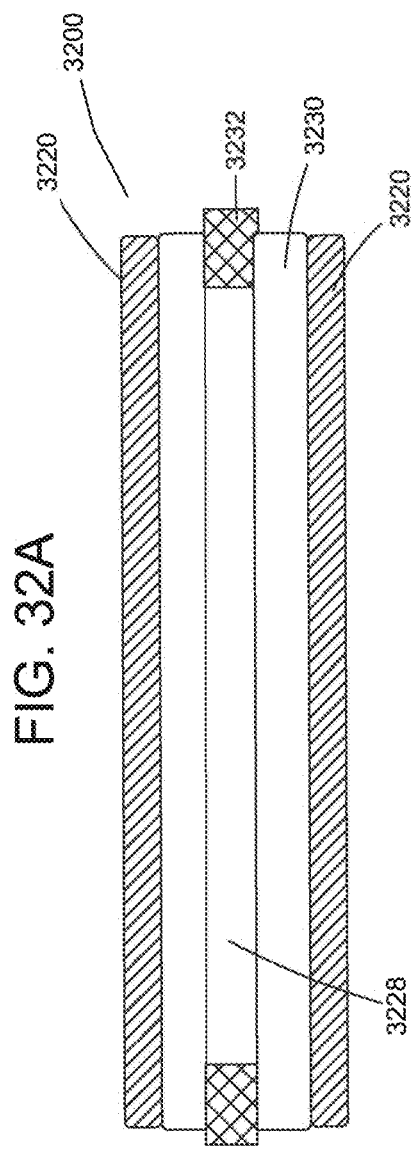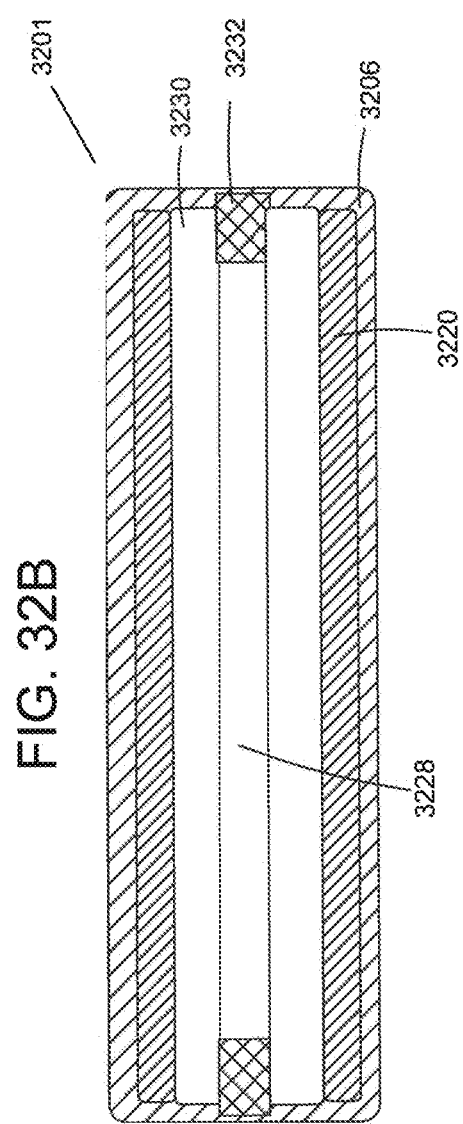

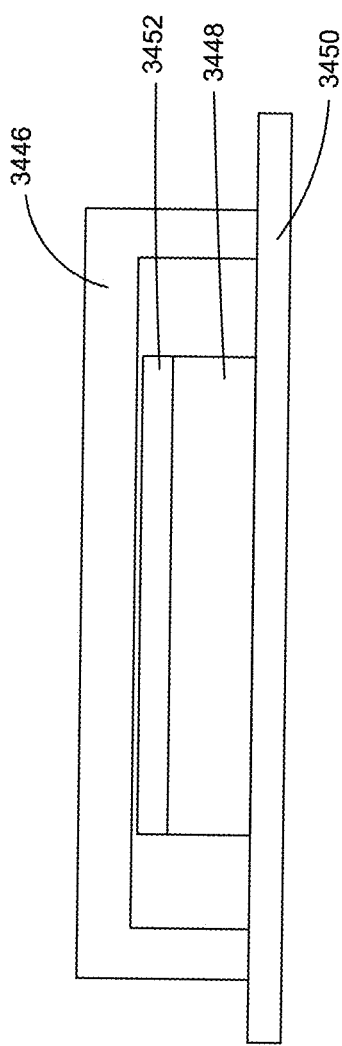

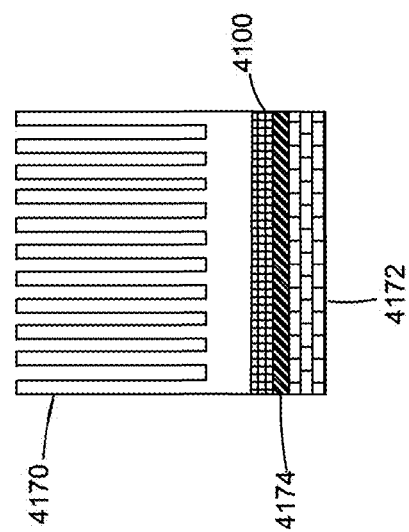
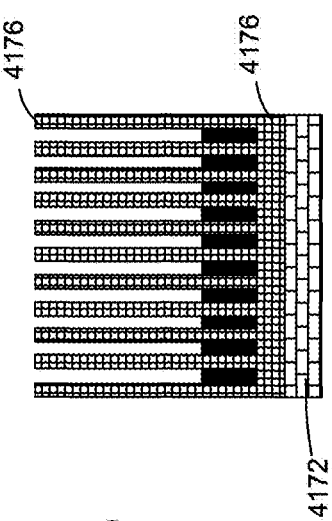
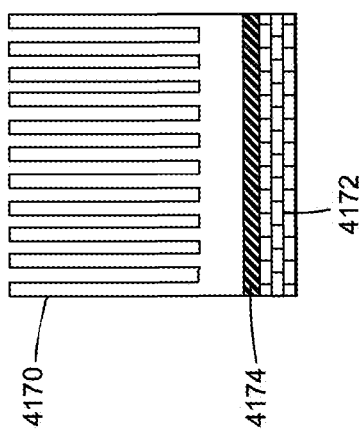
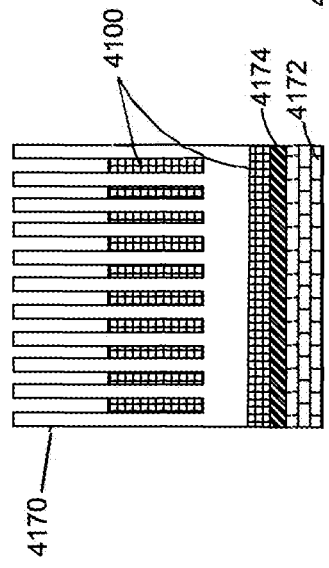

THERMAL MANAGEMENT SYSTEM AND DEVICE

RELATED APPLICATIONS AND INCORPORATION BY REFERENCE

This application claims priority to US provisional patent application Serial Nos. 62/822,380, filed on Mar. 22, 2019 and 62/901,291 filed Sep. 17, 2019.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

This invention relates to thermal management of heat producing devices such as electronic components like CPU (central processing unit) boards, GPU (graphics processing unit) boards, SOC (system on chip), LCD screens, electronic devices like cell phones, tablets, laptops, batteries, LED lighting systems using thin film phase change composite materials. Increasing power demands increase the rate of heat production of the electronic components, for example batteries, and thus, cooling requirements are also increasing. However, the cooling capacity of existing state-of-art technologies is not sufficient without increasing the foot-print of the existing cooling technologies, for example, heat spreaders, fans, heat sink, fins, heat-pipes. Without adequate cooling in portable electronic devices, batteries, and the like, system performance suffers due to limitations placed on CPU systems (electronic devices) or battery management system (batteries) which restrict performance in an effort to reduce temperature rise. Thus, it is necessary to design more efficient, higher capacity cooling systems inside such electronics devices without increasing parasitic energy losses. Thermal management systems that incorporate phase change materials have been developed as cooling solutions to be used in electronics as a full replacement for existing cooling solutions and/or to provide additional cooling capacity. In some instances, the thermal management systems are designed to operate under normal use. Further, in some instances the thermal management system may be used to mitigate conditions that may lead to a thermal runaway event and/or control conditions during a potential thermal runaway event to reduce risk of fire.

BACKGROUND OF THE INVENTION

Citation or identification of any document in this application is not an admission that such document is available as prior art to the present invention.

Thermal management of heat producing systems and devices like CPU (central processing unit) boards, GPU (graphics processing unit) boards, SOCs (system on chip), LCD screens, electronic devices, for example, cell phones, tablets, laptops, energy storage devices, for example, batteries, and/or LED lighting systems using thin film phase change composite material, is a critical requirement. As the power demand of electronics devices and battery operated systems are increasing, the rate of heat production of the electronic components and battery operated systems as well as the cooling requirement is also increasing. However, due to trends towards smaller and more compact devices including battery operated devices having increased power demands, the cooling capacity of existing state-of-art technologies is not sufficient without increasing the foot-print of cooling technologies such as fans, heat sink, fins, heat-pipes. In the absence of adequate cooling in portable electronic devices and the like, CPU systems may be designed to limit the performance of the devices in an effort to reduce temperature rise during use. Limiting the performance in this manner may compromise speed and/or the user experience of devices such as cell phones, tablets, laptops etc. Thus, it is necessary to design more efficient, higher capacity cooling systems inside such electronics devices without increasing parasitic energy losses. Phase change material based cooling solutions are being developed to be used in electronics cooling as a full replacement for existing cooling solutions and/or for additional cooling capacity.

For example, in many battery operated vehicles, the foot print of cooling systems may or may not be a critical constraint but in most cases, the cooling system (typically active cooling solutions like forced air or forced liquid cooling) is either over-designed for extreme operating conditions or under-designed for only normal operating conditions. Thus, it is necessary to design more efficient, higher capacity cooling systems inside such electronics devices and/or battery operated systems without increasing parasitic energy losses. Recently, PCM (phase change material) based cooling solutions have been developed to be used in electronics cooling as a full replacement for existing cooling solutions or for additional cooling capacity. PCM based cooling solutions are also found in battery operated systems and will be discussed in following sections.

Existing cooling solutions such as heat spreaders, metal fins, heat pipes, etc., and the like need to be overdesigned to account for peak power consumption of electronic devices or portable devices. In some instances, prior art heat spreaders made from graphite sheet, aluminum, or copper foils have a high thermal conductivity, but do not have high heat storage capacity to absorb heat spikes during peak operation of electronic devices. For example, cooling solutions are often designed for times of high power demand and/or when demanding applications are run. However, under normal operating conditions the full cooling capacity of these existing thermal management systems may not be utilized. Hence, thermal management systems tend to be bulky, have a large footprint, and are expensive.

Currently, existing PCM materials have some challenges affecting their use in applications, such as cooling solutions. Specifically, properties of PCMs such as low thermal conductivity, potential for PCM leakage during melting, potential for PCM spillage into electronic components after melting, and/or low heat dissipation rates may affect the use of PCMs in cooling solutions. For example, PCM based gels and/or paste may have high heat storage capacity but lack a thermal conductivity high enough to meet the needs of the applications.

PCM based solutions are generally used in the form of gels and/or thermal paste where the PCM (phase change material) is mixed with a polymer material and filler materials like boron nitride, alumina, aluminum oxide, aluminum nitride, magnesium oxide, graphite powder, graphite fibers to enhance thermal conductivity (Reference U.S. Pat. No. 6,054,198A). Such PCM based gels and paste still does not provide very high thermal conductivity >10 W/mK, is messy to apply.

European Patent EP2836784A1 describes a latent heat storage material with expanded graphite material as the carrier and phase change material (PCM) infiltrated into the pores of the expanded graphite and graphite sheet disposed on top of the PCM layer to increase thermal conductivity. This patent mentions a method to infiltrate the expanded graphite with PCM via vacuum furnace. This patent does not disclose method to make very thin structures less than 1 mm and does not address the PCM volume expansion issues.

Further, PCM materials used in cooling systems currently available may require specific thicknesses. Such PCM based cooling materials or solutions are fabricated in various form factors and aspect ratios with minimum thickness generally greater than 1-2 mm. At this time, it is very difficult to manufacture thin sheets or films of PCM composite materials, in particular, materials having very high thermal conductivity, using state-of-art manufacturing methods.

Due to the space constraints for modern electronic devices, systems, and/or components, the thickness of PCM based materials is a critical requirement for electronic cooling devices. Thus, it is necessary to find novel ways to manufacture thin films or sheets of PCM based materials that have high thermal conductivity and good mechanical strength (before and after phase transition), and a high heat storage capacity.

Further, if a thermal management system is not properly designed and controlled, batteries can suffer from undesirable effects such as reduced power output, thermal aging, temperature excursions and thermal runaway situation that could cause uncontrolled release of heat resulting in fire.

The onset of thermal runaway of lithium-ion cells typically begins at temperature greater than 150° C. At temperature less than about 100° C., series of irreversible reactions occur that cause breakdown of materials in the electrodes and separator. This triggers thermal runaway onset and finally leads to combustion reaction inside the cell with temperatures reaching more than 250° C. or 400° C. at much faster self-heating rates.

Thus, power output, reliability and safety are compromised if temperature of energy storage devices and/or heat producing devices are not safely controlled.

Traditionally, the heat from battery is removed via air-circulation or liquid circulation or phase change material.

Current State-of-Art Technologies include active cooling systems and passive thermal management systems.

Air and/or liquid cooling thermal management systems have very reliable cooling performance and are widely used in many applications. However, these systems have complex design and integration, lower system efficiency, many mechanical moving parts such as compressors or blowers, bulky, expensive, system maintenance, and further are not designed to absorb large heat released during battery thermal runaway.

Passive thermal management systems are simple in design, compact, inexpensive and have a fixed or narrow temperature operation window. Typically, these systems use phase change material (PCM) to regulate battery temperature. Their disadvantages include narrow melting ranges, low heat absorption capacities, and/or slow heat removal rates. Further, they are not designed to absorb the large amounts of heat released during battery thermal runaway. Passive thermal management systems using phase change material like paraffin wax needs an auxiliary thermal management system like air cooling/liquid cooling for faster aggressive heat removal rate. Thus, passive thermal management systems are not truly independent thermal management systems capable of handling the thermal load for large applications like EV Cars, trucks etc.

Currently, the passive thermal management system use the principle of phase change material (PCM) to regulate the battery temperature during "Normal Operation" only. They rely on a melting range that varies between about 2 to 15° C., for example, phase change materials typically operate in a melting range between about 40° C. to 45° C. or 55° C. to 60° C. Generally, the melting range is selected for a thermal management system based on the requirements of normal battery operation and/or to ability to protect the system when it reaches the melting temperature range of the PCM. PCM materials that are designed to absorb heat during normal battery operation. Generally, PCM materials have a heat storage capacity of 60-250 J/g. Such systems are designed to absorb the battery heat released during normal discharge cycle, but not for the large amounts of heat released potentially during thermal runaway which for example may release 10-20 times more than during a normal discharge cycle. If a system were to be designed using phase change materials, then such a system would be very bulky, heavy, and not economical from cost and design point of view. Currently, there are products that are commercially available for Li-ion battery cooling applications including, for example, cells manufactured by AllCell Technologies (www.allcelltech.com) and Outlast LHS (outlastlhs.com). As shown in FIG. 1, individual energy storage devices 10, for example, batteries are surrounded by graphite composite material 12 that contains a paraffin wax PCM in its pores (not shown). The paraffin wax used has a heat storage capacity of 125-200 J/g. These constructions can be made with PCM having different melting ranges. The composite material is thermally and electrically conductive. However, a composite material that is electrically conductive property may be undesirable in a battery due to risk of short-circuiting the cells. As shown in FIG. 2, some systems use a "flame retardant" thermoset polymer composite containing PCM with a storage capacity of 80-100 J/g to form holder 14 to house energy storage device 10. Further, PCM of different melting ranges may be used in these systems.

Both these products provided limited heat storage capacity. Thus, these systems are effective for normal discharge operation but not during thermal runaway situation. Both systems cannot be designed for thermal runaway heat absorption as it would be bulky, expensive and heavy, thereby reducing battery energy density significantly. The heat is stored as latent heat during normal operation and takes long time to dissipate the heat to ambient. The latent heat also ensures neither system is effective for multiple fast discharge cycles of battery as heat is not completely dissipated out.

Use of water in a thermal management system could address the drawbacks of the previously described and currently available systems. In particular, use of water as a PCM has numerous advantages, especially in the context of inhibiting and/or preventing thermal runaway, as opposed to simply serving as a heat-absorptive medium. First, as compared to, for example, waxes or paraffins used in the prior art, water exhibits higher specific heat. In particular, water exhibits approximately twice the specific heat when compared to waxes or paraffins. Thus, water as a PCM is capable of absorbing more heat per unit mass than wax and/or paraffin materials without phase change. Moreover, the amount of heating required to cause phase change in water, that is, from liquid to gas, is much higher than that required to melt solid to liquid phase change materials like paraffin wax. Thus, water can absorb more heat (10-15 times higher) during its phase change from liquid than would be absorbed by wax or paraffin melting. Further, water is not flammable. In contrast, waxes, paraffins, wax compounds, and the like may be flammable. Thus, use of wax, paraffins, paraffin wax compounds, and the like may be contrary to the goal of preventing thermal runaway. Further, even when prepared as a gel, water is much less expensive than waxes, paraffins, parafffin wax compounds, and the like.

Generally, water has not been used in commercial products, due to a risk of short-circuiting the electronics and individual cells.

Different fabrication strategies are currently employed to fabricate PCM composite material. The following two steps are commonly used to manufacture PCM composite structures using expanded graphite and described in many literature.

In a first step, PCM composite structure is made from expanded graphite fibers. An example of the manufacture of PCM composite structure is described by Mills et al. in "Thermal conductivity enhancement of phase change materials using a graphite matrix" Applied Thermal Engineering, Volume 26, Issues 14-15, October 2006, Pages 1652-1661 (hereinafter "Mills") and is incorporated by reference. As described by Mills, PCM composite materials may include expanded graphite fibers. Expanded graphite fibers may be used as starting raw materials and then compressed to a known density to achieve a required thermal conductivity (higher the density, higher the thermal conductivity). Mills describes compressing the expanded graphite fibers to an initial graphite density in a range between 50 to 350 g/L that resulted in different thermal conductivity and porosity. For example, Mills found that at an initial graphite density of 200 g/L, the porosity of the sample was typically around 78-80% while the thermal conductivity was in a range from about 15 to 25 W/m-K in the in-plane direction of the compressed graphite fibers.

Once the expanded graphite matrix is formed, the pores are filled with a PCM material which may be organic or inorganic, and may have a desired melting range needed for the heat dissipation application. It can range from 25° C. to 60° C. for heat removal applications in devices, such as electronic devices, batteries.

The filling of pores is ideally done under ambient pressure and in a liquid bath of the molten PCM. The PCM fills the pores of expanded graphite under capillary action. Vacuum pressure can also be used to fill the pores at faster rate. Once all the pores are filled, the resulting PCM composite material possesses a high thermal conductivity resulting from the graphite matrix and high heat storage capacity due to the PCM.

Thermal management systems to suppress battery thermal runaway have been previously described. U.S. 2010/0028758 A1 provides for battery packs wherein hydrogel acts to diffuse and absorb thermal energy released by the cells in the event of cell failure. U.S. Pat. No. 8,623,538 B2 provides for a microencapsulated phase change material used in conjunction with a cooling fluid as a part of a thermal management system for an automotive battery pack assembly. US 2011/0159340 A1 provides for a protective structure for preventing thermal dissipation and thermal runaway diffusion in a battery system; the protection system includes a battery module casing and at least one composite heat conduction plate. US 2009/0004556 A1 also provides for a battery system that minimizes or prevents thermal runaway propagation in the electrochemical cells of the system.

U.S. 2016/0043453 A1, U.S. 2013/0084487 A1, and U.S. 2014/0004394 A1 provide for battery packs comprising a phase change material.

U.S. 2014/0335382 A1 provides for thermal management matrix materials comprising a hydrocarbon mixture with Graphene particles and optionally a PCM, such as paraffin. U.S. 2013/0264023 A1 provides for a latent heat storage device latent heat comprising a carrier substrate formed of expanded graphite material where a PCM has been infiltrated therein. EP 2 836 784 A1 relates to a latent heat storage device is formed with a carrier substrate formed of expanded graphite material where the phase change material is infiltrated in the graphite material.

EP 1 783 169 A2 relates to a thermally conductive phase change composition ("PCC") comprising an silicone-organic block copolymer and a thermally conductive filler; the PCC can be used as a thermal interface material.

U.S. Pat. No. 6,054,189 relates to a heat transfer material, which is interposable between the thermal interfaces of a heat-generating, electronic component and a thermal dissipation member. The material is of the type which melts or softens at a temperature or range within the operating temperature range of the electronic component to better conform to the thermal interfaces for improved heat transfer from the electronic component to the thermal dissipation member; the interface material is form-stable and self-supporting at room temperature. Materials include blends of a paraffinic wax component having a melting temperature of from about 60-70° C. and of one or more thermally-conductive fillers.

U.S. Pat. No. 6,631,755 B1 provides for thermal modules with temporary heat storage that includes a heat storage, a heat absorber, a heat dissipater, and a heat pipe for rapidly transferring heat from the heat absorber to the heat dissipater. The heat storage includes a phase change material and is in contact with the heat pipe.

EP 2 836 784 A1 relates to a latent heat storage device is formed with a carrier substrate formed of expanded graphite material where the phase change material is infiltrated in the graphite material.

U.S. Pat. No. 9,537,344 B2 provides for the management and system for management of thermal energy produced in an implanted medical devise where a PCM acts as a heat sink. U.S. Pat. No. 6,037,032 relates to a process for producing a carbon foam heat sink is disclosed which obviates the need for conventional oxidative stabilization. The foam is encased and filled with a phase change material, which is useful in high temperature sandwich panels for both thermal and structural applications. U.S. Pat. No. 7,157,019 B2 also relates to a carbon foam heat sink.

CN 106940148 relates to a phase transition heat sink comprising a gradient fractal lattice sandwich. CN 106052452 relates to a phase transition heat sink comprising a low-melting point metal PCM. CN 106817880 relates to a heat accumulation heat dissipation device comprising foam and graphite flakes and a PCM. CN 105431003 relates to a heat sink with a thermal control unit which comprises a PCM. CN 105611807 relates to an integrated heat sink based upon a PCM and heat pipes.

U.S. 2014/02110068 A1 provides a method and system for aligning graphite nanofibers in a thermal interface material used in three-dimensional chip stacks.

U.S. Pat. No. 7,960,019 B2 relates to a computer electronic assembly wherein a thermal interface material is placed between the computer components.

U.S. Pat. No. 9,368,843 relates to a battery pack comprising a plurality of prismatic format batteries in a stacked configuration where flexible graphite sheet heat spreaders are interposed between adjacent prismatic batteries in the stack. U.S. Pat. No. 9,716,296 B2 provides for a lithium ion battery pack that includes a plurality of prismatic lithium polymer cells and one or more graphite heat spreaders where each spreader has at least two major surfaces and is made of one of a sheet of a compressed mass of exfoliated graphite particles, a graphitized polyimide sheet, or combinations thereof. U.S. Pat. No. 9,774,063 B2 provides for a battery pack assembly having thermal transfer sheets of exfoliated graphite particles. U.S. 2016/0141225 A1 relates to an apparatus comprising a heat dissipation device comprising an expanded graphite matrix infiltrated with a PCM to be used with an electronic device. U.S. Pat. No. 7,923,112 B1 relates to a latent heat storage material comprising a first phase change material, at least one second phase change material and an expanded graphite material. The first and said second phase change materials are immiscible and may have different phase change temperatures in the latent heat storage material.

CN 109880536 provides for a heat dissipation material to be used in a wireless charging application process. The heat dissipation material is a composite, laminated structure comprising a PCM and a thermally conductive gel.

CN 204810781 relates to a heat dissipation graphite flakes comprising graphite flake and phase change material layer where the PCM layer is attached to a side surface of the graphite flakes.

EP 1 067 164 B1 relates to a thermal interface material for power supply assemblies that that facilitates heat transfer from the heat generating device to a heat sink. The thermal interface material includes a phase change substance, which includes a polymer component and a melting point component and softens at about the operating temperature of the heat source.

U.S. Pat. No. 8,431,048 B2 provides for a method and system for aligning graphite nanofibers to enhance thermal interface material performance. The method includes preparing the graphite nanofibers in a herringbone configuration and dispersing the graphite nanofibers in the herringbone configuration into the thermal interface material and includes applying a magnetic field to align the graphite nanofibers.

AU 2010 261729 A1 relates to composite materials comprising a porous carbon structure at least partially filled with LiOH/KOH for storing heat energy high temperatures.

U.S. 2012/0227926 A1 relates to energy storage systems comprising a PCM and heat transfer fluid heat exchanger apparatus.

In the following sections, different embodiments of fabrication methods are described using the Expanded Graphite-PCM (EG-PCM) composite material as one of the key starting materials.

Traditional PCM based cooling systems have disadvantages that may be addressed by various embodiments disclosed herein. For example, the thermal conductivity of PCMs can be increased by adding thermal conductivity enhancer materials. For example, powders such as metal powder, graphite powder, or mixtures thereof, fibers including metal, graphite or mixtures thereof, filler materials and/or mixtures thereof may be used to enhance the thermal conductivity of PCMs. Thermal conductivity can also be enhanced by impregnating PCM inside pores (e.g., micro-capillary pores) of a graphite matrix in order to form a PCM composite material with very high thermal conductivity.

Issues relating to PCM leakage of PCM based cooling systems may be addressed by using encapsulation (e.g., microencapsulation or macro-encapsulation methods) that are known in the art.

Typically, pouch cells such as Lithium-ion cells that are commonly used in portable electronics, electrical vehicle battery systems tend to expand and contract during battery charge/discharge cycles owing to the electrochemical reactions inside the pouch cell. This cycling exerts lot of mechanical stress on the cells. To mitigate this problem, a compressible pad made from, for example a polyurethane material, may be sandwiched between the cells to absorb the mechanical stress. This compressible pad has very low thermal conductivity and heat storage capacity. Metal or Graphite cooling plates are also used adjacent to compressible pad to increase the rate of heat transfer but these materials lacks high heat storage capacity and rely on active cooling system to remove the additional heat.

Currently, forced liquid cooling or air cooling system is used in thermal management of such pouch cell battery systems. A thin aluminum plate with cooling channels are used in such systems. Another approach is to use a PCM-based composite instead of a cooling plate in a passive thermal management system design. The PCM composite would absorb the heat and dissipate the heat away from the battery cells. The problem with such PCM composite is that PCM composites may tend to crack or break due to the mechanical stress exerted by the pouch cells. To overcome this issue, a polymer material is incorporated in the PCM composite to make the material more resilient to the mechanical stresses, as described in US Patent Application 20160319174A1 and incorporated herein by reference. However, added polymer lowers the latent heat capacity of the PCM composite and also lowers the thermal conductivity by 10 times but it does make it possible to make the PCM composite flexible and thinner.

Using a combination of different materials with different physical, thermal and mechanical characteristics allows one to fabricate a thin PCM composite material that is multilayer and that fulfills the requirements of high thermal conductivity, good mechanical strength, and inhibiting or preventing PCM leakage. For example, some embodiments may be constructed in such a manner that no PCM leakage is exhibited. Thus, some applications may benefit from a PCM composite materials having a thickness in a range from about 0.02 mm to about 2 mm. In some instances, the PCM composite materials may have a thickness in a range from about 0.05 mm to about 1 mm. For example, an application may necessitate the use of a PCM composite material having a thickness of less than about 1 mm. Further, a PCM based composite structure may have a thickness of less than about 0.75 mm. For example, a PCM based composite structure may have a thicknesses in a range from about 0.1 to about 0.5 mm in electronic applications and battery applications. Applications that generate high amounts of heat may use PCM composite materials, for example, in a range from about 0.5 mm to about 2 mm to offset the higher heat generation. In particular, battery applications may use thicker PCM composite materials than electronic devices due to the tendency of battery applications to generate higher heat than electronic devices. In some instances, multiple layers of PCM composite may be combined to reach the desired thickness. In some instances, multiple stack of Multilayer PCM composite material may be combined to reach the desired thickness.

SUMMARY OF THE INVENTION

Disclosed is a thermal energy management system that utilizes a combination of elements to control temperatures of an exothermic component, device or system. These elements may be combined in many ways to generate both passive, active, and hybrid systems. For example, phase change materials, such as water, paraffin, or wax, porous structures having predetermined geometries that enhance thermal transfer and constructed from flame- or fire-retardant materials, channels having predetermined geometries that position them proximate heat generation zones, heat transfer fluids such as air, water, coolant or liquid refrigerant, may be combined to form a thermal energy management system. In some instances, the system will be designed to maintain a temperature below a predetermined temperature for a specific exothermic or heat generating device, such as an electronic device, component, or system or an energy storage device such as a battery. A method and construction to safely encapsulate and use water as a thermal sink in a battery application is described.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph), such that Applicants reserve the right and hereby disclose a disclaimer of any previously described product, process of making the product, or method of using the product. All rights to explicitly disclaim any embodiments that are the subject of any granted patent(s) of applicant in the lineage of this application or in any other lineage or in any prior filed application of any third party is explicitly reserved.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention. A phase change material composite material ("PCM composite material") and/or structure may include a supporting structure comprising pores and a phase change material positioned within the pores of the structure. Depending on the use for the thermal management system, the phase change material may be selected based on one or more properties including, but not limited to melt temperature, heat capacity, heat of fusion, thermal conductivity, heat storage capacity, non-flammable, non-corrosiveness, chemical properties, stability, ability to reverse the effect (i.e., making the PCM reusable), small change in volume in the different states, density, cost, availability, or the like.

Based on the constructions described herein, a PCM composite material may have a thickness greater than about 0.02 mm. Depending on the requirements of an application, for example, an amount of heat generated at any given point and/or specific geometry of a component, device, system and/or element thereof, there may be a need to use PCM composite materials having different thicknesses and/or a PCM composite material and/or structure that includes zones of different thicknesses. In some instances, multiple layers of PCM composite material may be used to form a composite component, such as a PCM composite structure.

For example, a PCM composite materials may have a thickness in a range from about 0.02 mm to about 4 mm. In particular, a thickness of the PCM composite materials may be in a range from about 0.02 mm to about 2 mm. In some instances, the PCM composite material may have a thickness in a range from about 0.05 mm to about 1 mm.

One or more PCM composite material components, for example sheets, layers and/or coatings, may be used to form a PCM composite structure. For example, an application may necessitate the use of a PCM composite structure having a thickness of less than about 1 mm. Further, a PCM based composite structure may have a thickness of less than about 0.75 mm. For example, a PCM based composite structure may have a thicknesses in a range from about 0.1 to about 0.5 mm in electronic applications and battery applications.

Applications that generate high amounts of heat may use PCM composite materials, for example, in a range from about 0.5 mm to about 2 mm to offset the higher heat generation. In particular, some battery applications may use thicker PCM composite materials than electronic devices due to the tendency of battery applications to generate higher heat than electronic devices. In some instances, multiple layers of PCM composite may be combined to reach the desired thickness.

In some systems, it may be desirable for the phase change material to occupy about 5% to about 95% of the porosity of the supporting structure prior to use. Further, some systems may include phase change material occupying from 20% to 85% of the porosity of the supporting structure prior to use. Based on the system requirements, a phase change material may occupy between about 40% to about 80% of the porosity of the supporting structure prior to use.

The composite structure may include a channel traversing the supporting structure wherein a fluid introduced at a first end of the channel passes near a heat generating unit. The flow of fluid through the supporting structure may result in heat transfer. The fluid may be removed at a second end at a different temperature than the fluid had the first end.

The supporting structure may include graphite, carbon, a thermoplastic, a metal, or a mixture thereof. For example, the supporting structure may include expanded graphite. In some instances, the supporting structure may include fiber, powder, filament, sheet or a combination thereof. For example, the supporting structures may be formed from fiber, powder, filament, or a sheet. The porosity of the supporting structure is typically in range of about 10% to about 95%. In another embodiment, the porosity of the supporting structure may be in a range of about 50% to about 80%. Higher the porosity, higher is the heat storage capacity of the Multilayer PCM Composite material whereas lower porosity increases the thermal conductivity of the PCM composite material. Additionally, filler materials like graphene, metal powder can be added to enhance thermal conductivity if higher porosity of preferred.

In some instances, the multilayer composite structure may further include a support element formed from at least one of paper, cloth, or a structural element. Such support elements comprising at least one of carbon, graphite, plastic or metal.

Any of the parts described herein may be formed completely on in part by additive manufacturing, sintering, printing, molding, extrusion, deposition, jetting, knitting, braiding, or weaving. For example, at least a portion of the supporting structure, the support element, the housing, the heat sink may be formed in this manner.

The phase change material may be water, paraffin wax compounds, n bio-based phase change materials, or wax. In some instances, the phase change material may be encapsulated. In some instances, the phase change material may be encapsulated using a polymer coating.

Heat transfer within a thermal management system may be controlled by a number of factors including, but not limited to PCM properties, amount of PCM, percent of void space occupied by PCM, geometry of the structures, use of heat transfer fluid (e.g., type, speed of fluid through system, etc.), materials used in the system, among others.

In particular, PCM may be used to occupy a portion of the pores in the supporting structure. For example, in some instances a least 5% of the pores in the supporting structure may be filled with PCM. In particular, PCM may occupy about 5% to about 95% of the void space of the pores in the supporting structure when the PCM is in the solid phase. The amount of void space occupied by PCM may be determined by the amount of potential heat transfer desired. In some instances, it may be desirable for at least about 25% of the void space of the pores to be occupied by PCM when in the solid phase. Some examples may include at least 40% of the void space of the pores to be occupied by PCM when in the solid phase.

Another element that may affect an amount of potential heat transfer in the system is the melt temperature of the PCM. In some instances, the PCM has a melt temperature in a range from about 25° C. to about 80° C. Alternately, a selected PCM may have a melt temperature in a range from about 30° C. to about 50° C.

The composite structure may include a support element on a surface of the PCM composite structure. In some instances, support elements may be positioned on multiple surfaces of the PCM composite structure. For example, the PCM composite structure may include a support element on a surface and its opposing surface. Further, an isolation material may be positioned between the support elements to isolate the PCM between the support elements. For example, the isolation element may be positioned at an outer edge of the PCM composite structure between the first and second support.

The composite structure may include a coating to prevent PCM leakage. For example, the coating may cover an exterior surface of the composite structure. The coating materials may be formed from many coating formulations known in art such as acrylic or silicone based compounds. Alternatively, single-side or double-side pressure sensitive adhesive tape can be glued to the multilayer PCM composite material to prevent PCM leakage.

In some instances, the supporting structure and PCM are coupled together and the resulting material may have a thickness in a range from about 10 micron to about 1 mm.

A thermal management system for a heat generating device may include a heat sink positioned near the heat generating device having heat sinks designed to transfer heat at a heat transfer rate sufficient to maintain the temperature of the heat generating device below a predetermined value. At least one of the heat sinks includes a supporting structure that includes pores occupied by a phase change material to form a phase change material composite structure.

In some instances, a heat sink may have zones that are designed such that each zone transfers, absorbs, and/or sequesters heat at a different rate. These zones may be designed such that areas of the heat sink capable of absorbing, transferring and/or sequestering the most heat are positioned proximate areas of the heat generating device that generate the most heat. In other words, the heat transfer and/or heat capacity of the heat sinks may be designed based on the needs of the heat generating system, device, or component.

The supporting structure of the heat sink may include flame-retardant material and/or fire-retardant material. In some instances, the phase change material may include water, wax, and/or paraffin. The phase change material may be at least partially encapsulated.

Based on the design and the required heat capacity for a thermal management system, the phase change material may occupy between about 25% to about 95% of a porosity of the supporting structure prior to use.

In some instances, the phase change material is water and the supporting structure is a fire-retardant foam such that the phase change material composite structure is a water-infused fire-retardant foam.

A heat sink, may in certain instances, include a non-porous thermally conducting material.

An example of a thermal management system may include at least one heat sink having at least one channel. The channel may allow fluid to flow through the thermal management system during use at a predetermined rate. Fluids used in the system may include air, water, oil such as silicone oil, transformer oil, or mineral oil, freeze depressant additives like propylene glycol and/or ethylene glycol, and/or liquid refrigerant.

In some instances, a coating may be positioned on a surface of the phase change material composite structure. Thermal interface materials may be positioned between a phase change material composite structure and a heat source.

The phase change material composite structure may have a geometry designed to enhance thermal transfer. For example, the phase change material composite structure may be designed to correspond to the structure and/or heat generation of the exothermic system, device, and/or component. In some instances, the phase change material composite structure may include fins or other geometries that increase heat transfer. The phase change material composite structure may, in some instances, be in direct contact with at least a portion of the heat source.

The heat sink element and the heat source are in thermal communication. For example, the heat source may be in thermal communication with the heat sink element and the phase change material.

In some instances, a thermal management system for exothermic devices may include a phase change material composite structure, a thermal interface material, and a heat sink. At least one of the phase change material composite structure, the thermal interface material, and the heat sink are in thermal communication with the exothermic device, such as a heat generating device or a heat source.

A thermal management system may include energy storage devices, a housing structure that includes an external casing, a heat sink element positioned within the external casing, that includes a flame-retardant material and a liquid phase change material. In some instances, the housing structure includes openings to house energy storage devices. The liquid phase change material may be water.

The heat sink may include a channel traversing the external casing with at least one inlet and at least one outlet. The channel may allow for the passage of a fluid through it and the fluid may be driven by a pump or blower.

In some instances, the flame-retardant material includes an open cell foam with an interconnected network structure having pores. The porosity of the network structure may be at least 70%. The flame-retardant material may include a hydrophilic material. In an embodiment, the flame-retardant material may be a fire-retardant material.

Various elements of the thermal management system may be in thermal communication with the exothermic device in order to facilitate heat transfer, heat absorption and/or sequestration of heat from the exothermic device and the area surrounding it. For example, an energy storage device may be in thermal communication with a heat sink element.

In some instances, a heat sink element surrounds at least part of an opening for a heat generating device, such as a battery. For example, the opening may be defined in part or completely by a heat sink element. In particular, the heat sink element may have openings into which an energy storage device may be positioned. In some instances, the openings may be lined. An internal casing element of the housing structure may line an opening. For example, the internal casing element of the housing structure may be positioned proximate to the energy storage device.

The housing structure may include a heat sink element positioned between an internal casing element and an external casing element. The heat sink element may be positioned such that it is in thermal communication with an energy storage device.

An energy storage system may include multiple groups of energy storage devices. Groups of energy storage devices may be separated from each other by interior divider walls, in some instances, a divider wall may include one or more heat sink elements.

In some embodiments, an energy storage system may include an internal casing element in the housing structure. A heat sink element is positioned between the internal casing element and the external casing and wherein the at least one energy storage device is in thermal communication with the first and second heat sink elements.

Such a system may have a heat removal capacity per unit mass (or per unit volume) of at least 20 J/g/cc. In some energy storage system, a pressure release may be positioned on the housing structure.

In some instances of an energy storage system, an aperture may be positioned in the housing structure through which the liquid phase change material can be replenished.

Further, an energy storage system may include a simple condensation mechanism coupled to the housing structure. In some instances, the energy storage system may include a water vapor condensation cap in the housing structure configured to capture water vapor and condense the water vapor during use such that liquid water is distributed throughout the flame-retardant material.

An energy storage system may include a hydrophilic flame-retardant material that includes pores.

In some instances, the liquid phase change material may be water distributed throughout the flame-retardant material.

A thermal management system for exothermic devices may include a housing structure configured to surround a device that generates heat, formed from a heat sink material that includes a porous flame-retardant material having a porosity greater than about 50% and a liquid phase change material distributed throughout the porous material prior to use.

A battery pack may include a battery whose surface is positioned near a battery enclosure wall of an internal battery holder. An outer surface of the battery holder may be coupled to the battery enclosure wall, thereby forming an internal reservoir. This construction inhibits and/or prevents direct contact between the internal reservoir and the battery.

The internal reservoir may include flame-retardant material and water. The flame-retardant material may be porous. In some instances, the flame-retardant material may be a fire-retardant foam.

For example, the flame-retardant foam may be a hydrophilic foam and/or have pore sizes in the range from about 0.001 microns to 1 mm.

The flame-retardant material may be a water-absorbing flame-retardant material such as melamine resin foam.

In some instances, the flame-retardant material used in the battery pack may be a foam, such as a metal foam, a carbon foam, a graphite foam, a carbon-graphite foam, and/or combinations thereof.

In some instances, the battery pack may include a battery enclosure wall that includes a vapor condensation cap, an addition port, a pressure valve, and/or a combination thereof.

A thermal management system may be used to manage the temperature of an energy storage device. An internal energy storage device holder forming an internal reservoir and wherein the first inner surface of the internal energy storage device holder is coupled to the first outer surface of at least one said energy storage device, thereby inhibiting and/or preventing direct contact between the internal reservoir and the at least one energy storage device; wherein said internal reservoir contains a fire-retardant material and water.

The fire-retardant material may be porous. In some instances, the fire-retardant material may be a fire-retardant foam made with melamine resin, a metal foam, a carbon foam, graphite foam, a carbon-graphite foam and/or a combination thereof. In some instances, the fire-retardant foam is a hydrophilic foam having pore sizes in a range between about 0.001 microns to 1 mm.

The fire-retardant material may be a water-absorbing flame-retardant material.

The enclosure wall may include one of more of a vapor condensation cap, an addition port, a pressure valve.

The thermal management system may be used with an energy storage device such as a battery, in particular a lithium-ion battery.

A method for reducing the thermal aging or reduced power output of an energy storage device may include using a thermal management system. For example, a thermal management system may be used to reduce thermal aging of a battery, such as a lithium-ion battery. These thermal management systems may also be used to reduce and/or inhibit thermal runaway.

In some embodiments, a battery pack may include a lithium-ion battery, a battery enclosure, and a battery holder. The outer surface of the battery holder may be positioned proximate to and/or coupled to a battery enclosure wall thereby forming an internal reservoir. The battery holder may be positioned such that it inhibits and/or prevents direct contact between the internal reservoir and the battery. In some instances, this internal reservoir may include a hydrophilic flame-retardant material that includes pores that occupied in part by water.

A method for thermal management of an energy storage device comprising a phase change material layer, the improvement which comprises including water encapsulated in pores of a material hydrophilic fire-retardant material.

A thermal management system may include at least one energy storage device and a housing structure. The housing structure may include an external casing, a heat sink element positioned proximate to the external casing, and one or more openings in the housing structure to house cells. The heat sink element may include a flame-retardant material, fire-retardant material and/or a liquid phase change material. In some instances, the phase change material is water.

Phase change material ("PCM") for use in heat sink elements may be selected to have a melt temperature in a range from about 25° C. to 80° C. for heat removal applications. For example, in some thermal management systems for devices, such as electronic devices and/or batteries, PCMs may be selected that have a melt temperature in a range from about 30° C. to about 50° C.

Heat sink materials may include an open cell foam with an interconnected network structure. For example, a fire-retardant material used in a heat sink may include pores. In some instances, the fire retardant material may have a porosity of at least 70%. The fire-retardant material may include a hydrophilic material in some instances. Heat sink materials used may include flame-retardant materials in some embodiments.

Energy storage devices may be in thermal communication with materials in the heat sink element. For example, at least a portion of a heat sink element may surround at least part of an opening in the housing structure that houses or is designed to house an energy storage device. In some instances, the heat sink element may have openings that correspond to the shape of the energy storage devices. Between the wall of the opening of the heat sink element and the energy storage device there may be an internal casing element of the housing in some instances. For example, the internal casing element of the housing structure may define the opening in the heat sink element such that the energy storage device is positioned between the internal casing element and the external casing of the housing structure. Thus, an energy storage device may be in thermal communication with the heat sink element. In particular, in some instances, the energy storage device may be in thermal communication with the heat sink element without being in direct contact with the heat sink element. In some instances, the internal casing element may be shaped to complement the shape of an energy storage device. For example, the internal casing element may be sized such that an energy storage device is direct contact with the internal casing element. In some instances, this direct contact may enhance thermal communication between the energy storage device and the heat sink.

In some instances, portions of a housing structure may be shaped to house one or more energy storage devices. For example, groupings of energy storage devices may be separated from each other by interior divider walls that include heat sink elements, in some cases.

An internal casing element of the housing structure may separate energy storage devices from heat sink elements that are positioned between the internal casing element and the external casing. The internal casing element may be configured to allow thermal communication between the energy storage devices and the heat sink elements. In some instances, materials of the internal casing element may be selected to promote thermal transfer from the energy storage devices to the heat sink elements.

Materials for the heat sink elements may be selected to enhance heat removal from the energy storage devices. For example, materials used in the heat sink elements may have a heat removal capacity per unit mass of energy storage cell per unit volume of heat sink material of at least 20 J/g/cc. In some instances, the heat sink element is designed such that the heat removal capacity per unit mass of energy storage cell per unit volume of heat sink material is greater than 20 J/g/cc.

The housing structure may include a pressure release on the housing structure. Further, in some instances the housing structure may include an aperture through which the phase change material can be replenished. For example, a liquid phase change material may be poured into the aperture in the housing. The liquid phase change material may then flow through the network of the heat sink. In some instances, a simple condensation mechanism may be coupled to the housing structure. The condensation mechanism may be used to recover phase change material after a phase change has occurred. For example, the housing structure may include a water vapor condensation cap configured to capture water vapor and condense the water vapor during use such that liquid water is distributed throughout the porous material of the heat sink, for example a fire-retardant and/or flame-retardant porous material.

The heat sink material may be hydrophilic and include a network of pores such that the liquid phase change material is distributed throughout the flame-retardant material.

In some embodiments, a thermal management system for exothermic devices may include a housing structure configured to surround a device that generates heat formed from a heat sink material. The heat sink material may include a porous flame-retardant or fire-retardant material having a porosity in a range from about 15 to 90% and may further include a liquid phase change material. The liquid phase change material may be distributed throughout the porous material prior to use.

As described herein, a battery pack may house one or more batteries and/or cells in a housing or enclosure that has both inner and outer surfaces. Further, the housing may include an internal battery holder having a first outer surface and a first inner surface, wherein the first outer surface of the battery holder is coupled to the first inner surface of the battery enclosure wall, thereby forming an internal reservoir and wherein the first inner surface of the internal battery holder is coupled to the first outer surface of at least one said battery, thereby inhibiting and/or preventing direct contact between the internal reservoir and the at least one battery; and wherein said internal reservoir contains flame-retardant material and water. The flame-retardant material may be porous. In some instances, the flame-retardant material may be a flame-retardant and/or a fire-retardant foam. Further, in some instances the flame-retardant material has a pore size in a range from about 0.001 microns to about 1 mm.

In some instances, the flame-retardant material may be hydrophilic. For example, the flame-retardant material may be a foam capable of absorbing water. In some instances, the fire-retardant material may include but is not limited to a metal foam, carbon foam, melamine foam, melamine fibers and/or a graphite foam.

Battery enclosures may include a vapor condensation cap in the wall of the enclosure. In some instances, the battery enclosure wall further may include a port and/or a pressure valve.

A thermal management system for managing the temperature of an energy storage device includes an enclosure wall and an internal energy storage device holder having a first outer surface and a first inner surface, wherein the first outer surface of the internal device holder is coupled to the first inner surface of the enclosure wall, thereby forming an internal reservoir and wherein the first inner surface of the internal energy storage device holder is coupled to the first outer surface of at least one said energy storage device, thereby inhibiting and/or preventing direct contact between the internal reservoir and the at least one energy storage device. In some instances, the internal reservoir contains a flame-retardant material and water. Further, the flame-retardant material may a flame-retardant foam, for example, a fire-retardant foam.

The flame-retardant material may be porous. For example, a hydrophilic flame-retardant foam with pore sizes in range from about 0.001 microns to about 1 mm may be used. In some instances, the average pore size of the flame-retardant foam may be in the range from about 0.001 microns to about 1 mm. Further, the flame-retardant material may be water-absorbing.

In some instances, the fire-retardant material is a melamine foam, melamine fibers metal foam, a carbon graphite foam and/or combinations thereof.

A wall of the enclosure may include at least one of a vapor condensation cap, an addition port, and/or a pressure valve.

As described herein, the energy storage device may be a battery, for example, a lithium-ion battery.

In order to reduce thermal aging and/or reduced power output of an energy storage device, such as a battery, a thermal management system may be used. For example, the thermal management system may be used to control temperature within an energy storage device during use.

In some instances, a battery pack may include at least one lithium-ion battery, a battery enclosure, and an internal battery holder. An outer surface of the battery holder is coupled to a battery enclosure wall such that an internal reservoir is formed. An inner surface of the internal battery holder is coupled to an outer surface of a battery to inhibit and/or prevent direct contact between the internal reservoir and the battery. This internal reservoir may include a hydrophilic flame-retardant material include pores which may contain water.

Using a phase change material layer in a method for thermal management of an energy storage device which includes the improvement of including water encapsulated in pores of a hydrophilic flame-retardant and/or fire-retardant material is described.

These and other embodiments are disclosed or are obvious from and encompassed by, the following Detailed Description.

BRIEF DESCRIPTION OF THE DRAWINGS

FIG. 23A depicts a traditional metal heat sink attached to heat source.

FIG. 23B depicts a traditional heat sink material coupled to a heat source where a multilayer PCM Composite material is used.

FIG. 23C depicts a traditional heat sink material coupled to a heat source where a multilayer PCM Composite material is used and the PCM composite material is proximate to finned structures of the heat sink.

FIG. 23D depicts a traditional heat sink material coupled to a heat source where a multilayer PCM Composite material is used as a finned heat sink.

FIGS. 29a-29b depict various embodiments of a multilayer PCM Composite Material.

FIGS. 31a-31b depict various embodiments of a multilayer PCM Composite Material.

FIGS. 32a-32b depict various embodiments of a multilayer PCM Composite Material.

FIG. 34 depicts a schematic of a multilayer PCM Composite material attached to a heat source.

FIGS. 41a-41d depict multiple embodiments of finned heat sinks that include multilayer PCM composite materials.

The following detailed description, given by way of example, but not intended to limit the invention solely to the specific embodiments described, may best be understood in conjunction with the accompanying drawings.

DETAILED DESCRIPTION OF THE INVENTION

Embodiments of the current invention attempt to address thermal energy management problems and to mitigate disadvantages of the current-state of art technologies. The systems described herein are applicable to all heat generating systems including, but not limited electronic systems, electronic devices, electronic components, and/or energy storage devices, for example, batteries. Although useful for all battery types, the system may be particularly beneficial for lithium-ion batteries where the thermal runaway mechanism is very exothermic and violent compared to other commercial battery chemistries.

As described herein, thermal management systems may include passive elements, that is a completely passive thermal management system, or a hybrid thermal management system employing both passive and active cooling components. For example, a thermal management system for a battery can be designed to be a completely passive thermal management system or a hybrid thermal management employing both passive and active cooling components.

Systems that utilize thermal management systems may have a housing that encompasses both the heat generating elements and the thermal management systems. For example, in general, housings for energy storage systems may be designed to accommodate the shapes and numbers of individual energy storage devices needed during use for the desired application.

Figure 1:
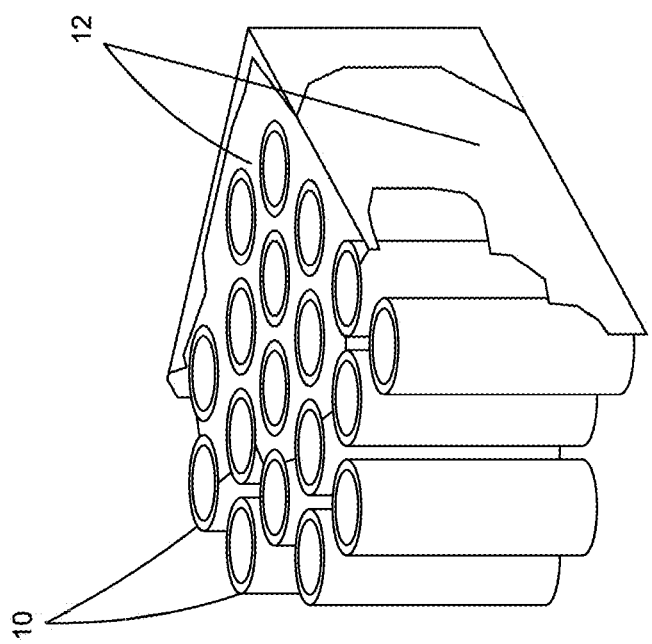
FIG. 1 depicts an example of the current state of the art for passive thermal management systems.
Figure 2:
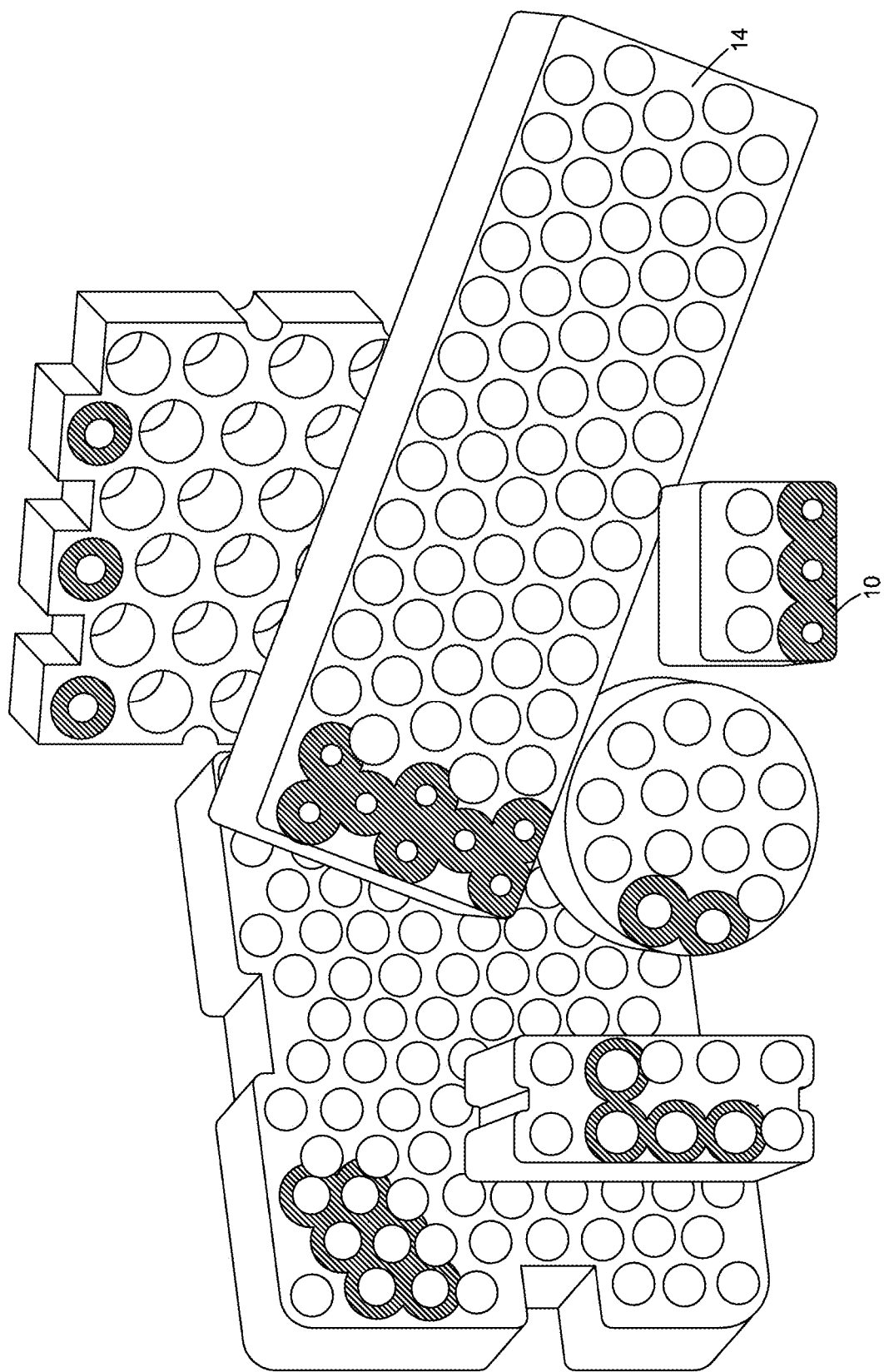
FIG. 2 depicts an example of the current state of the art for passive thermal management systems.
Figure 3:
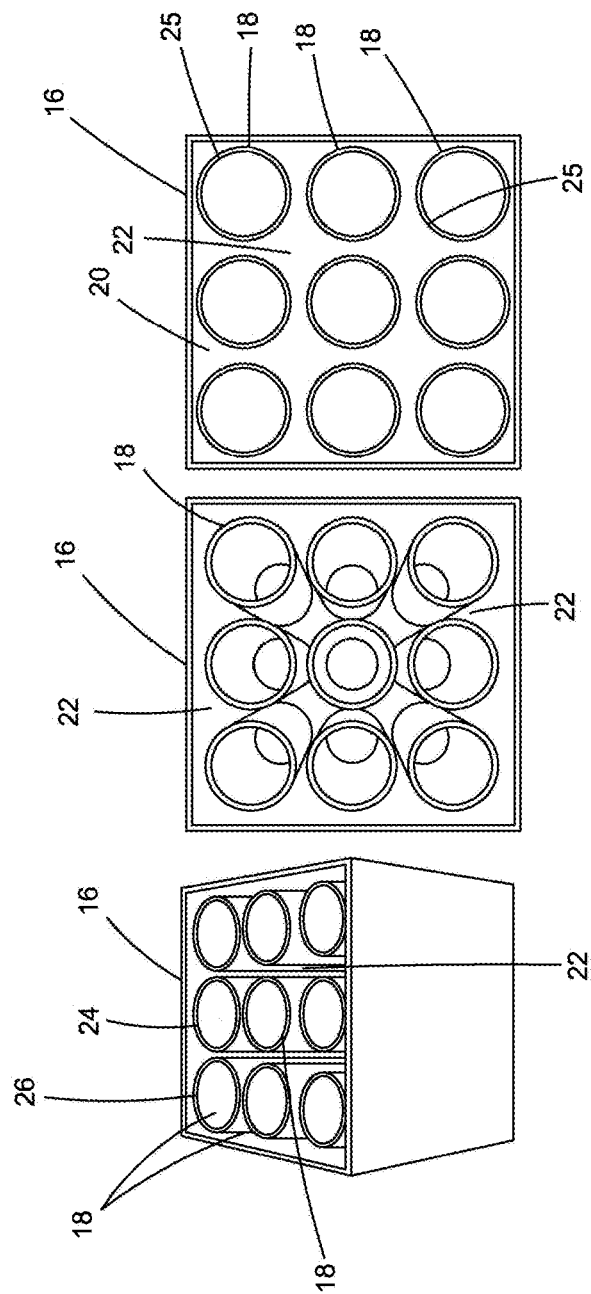
FIG. 3A depicts a perspective view of an embodiment of the battery pack enclosure.
FIG. 3B depicts a top perspective view of an embodiment of the battery pack enclosure.
FIG. 3C depicts a top view of an embodiment of the battery pack enclosure.
Figure 4:
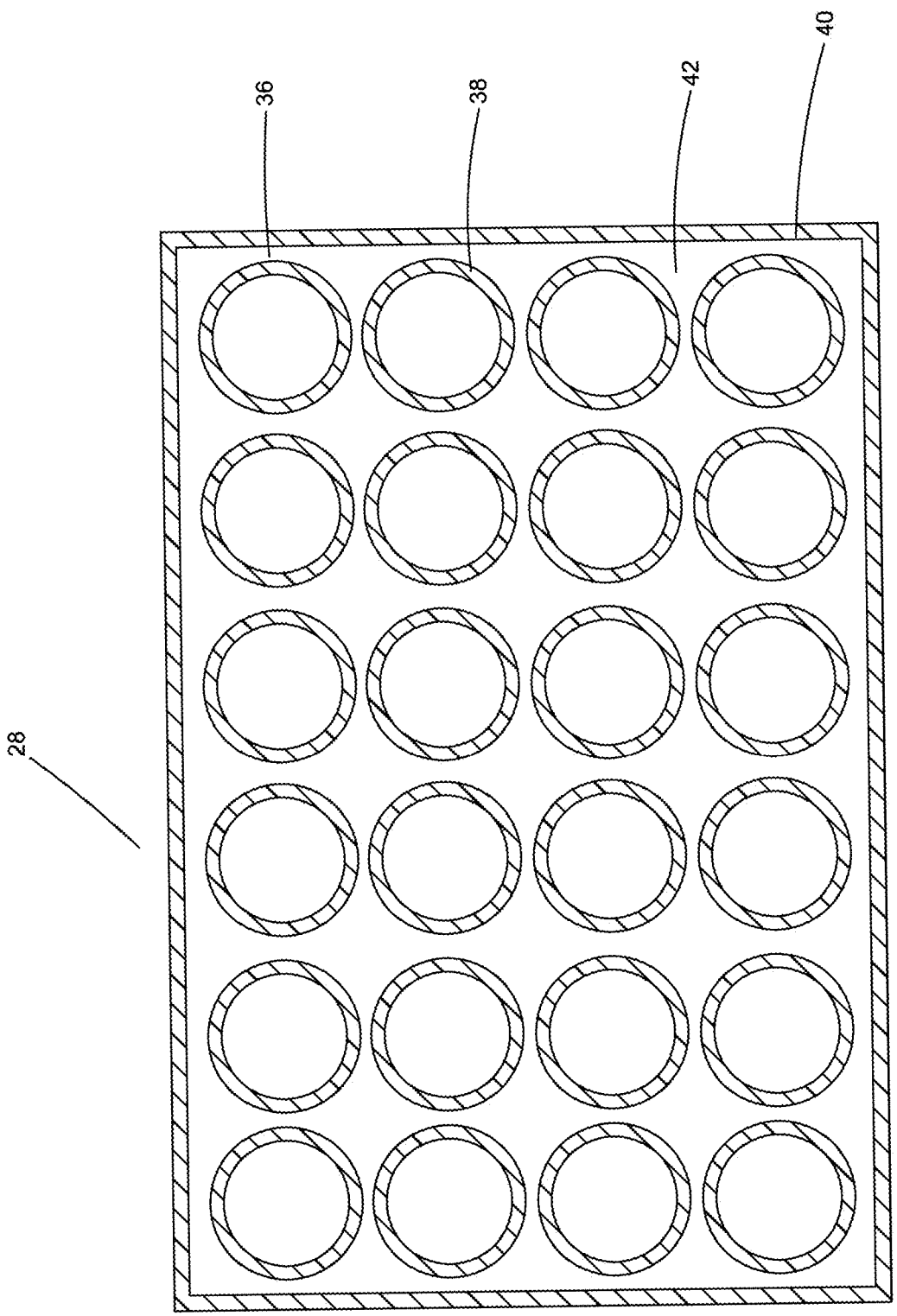
FIG. 4 depicts a top view of an embodiment of the battery pack enclosure.
Figure 5:
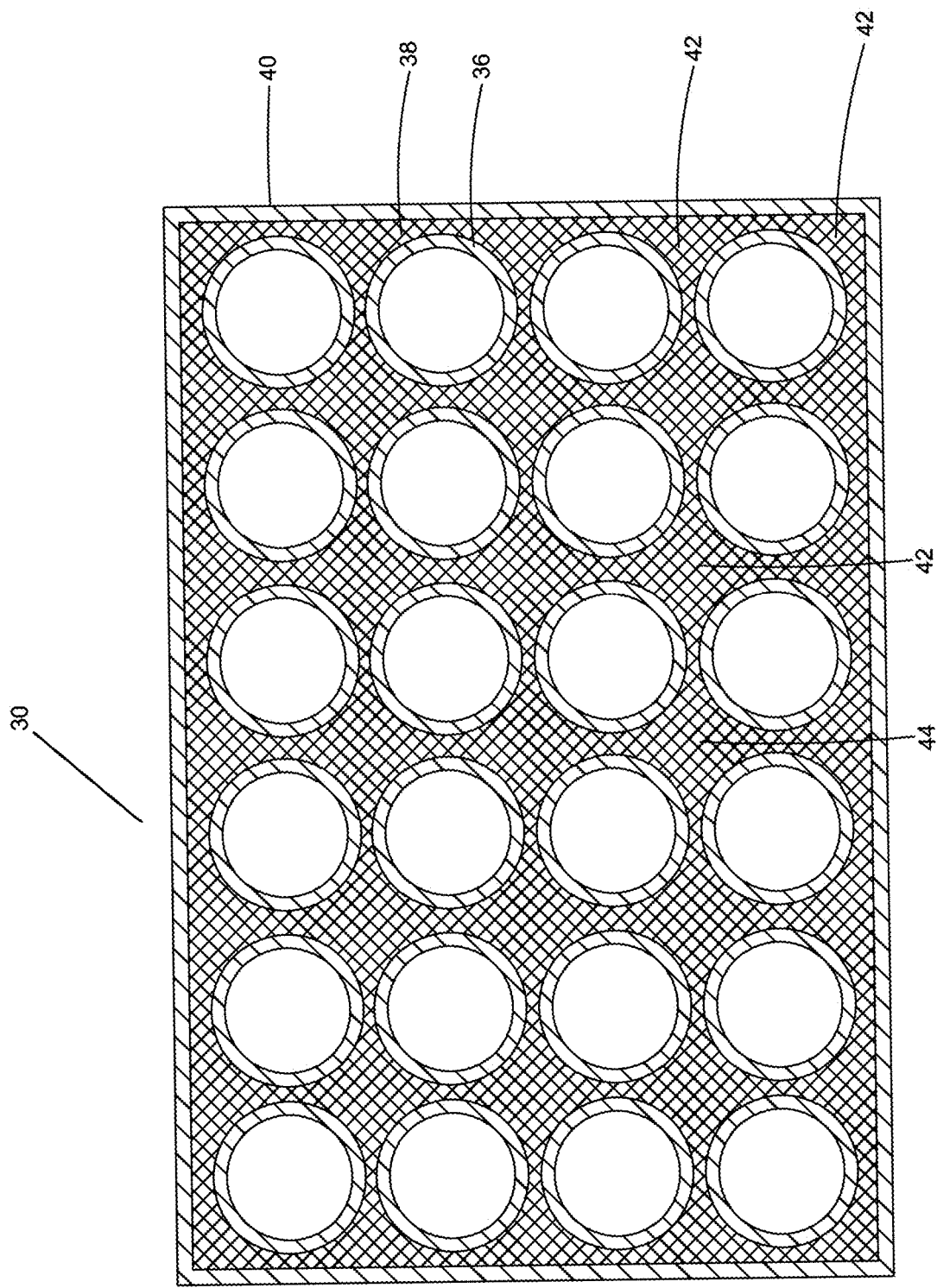
FIG. 5 depicts a top down view an embodiment of the battery pack enclosure with fire retardant foam.
Figure 6:
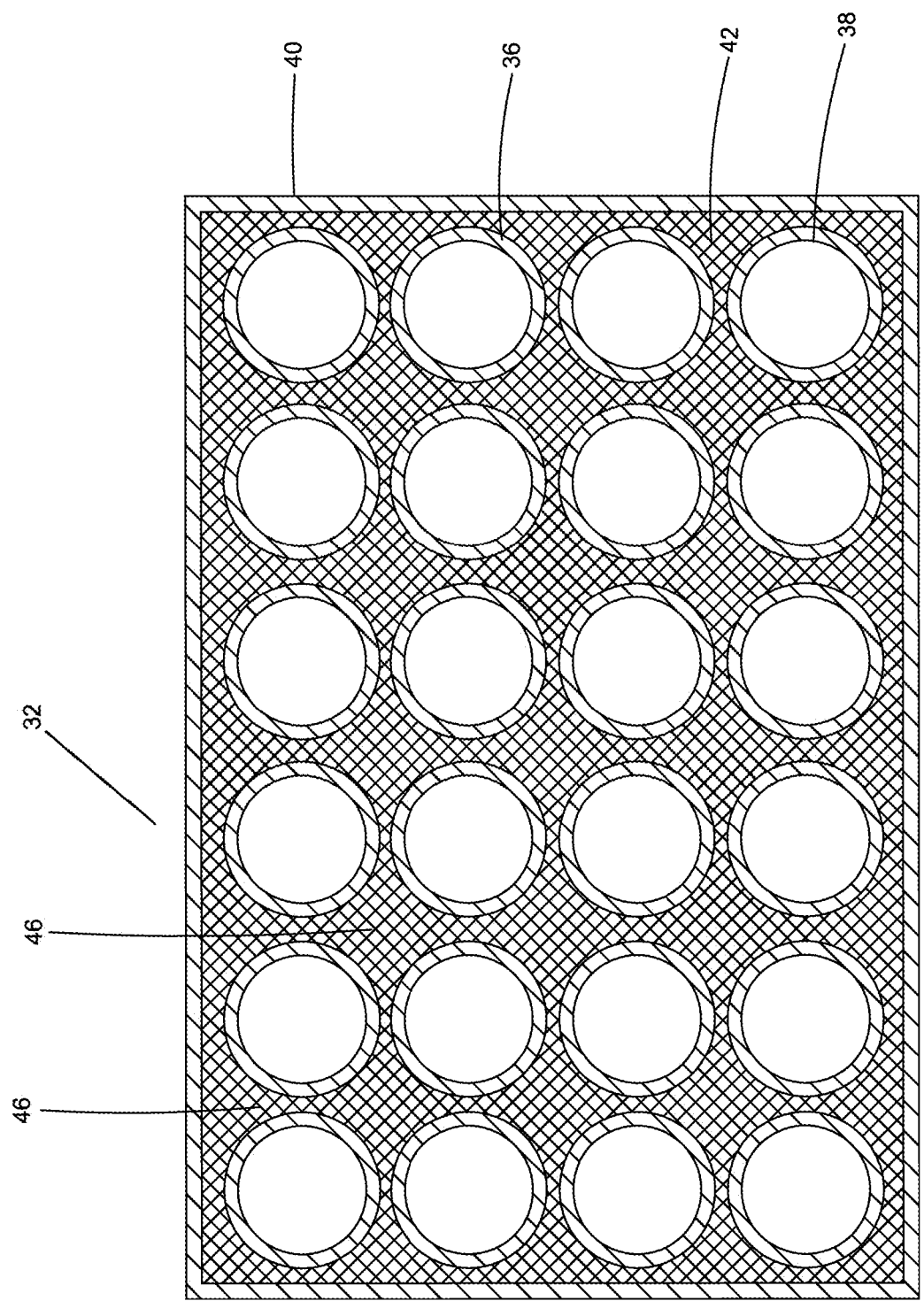
FIG. 6 depicts a top down view an embodiment of the battery pack enclosure with water filled fire retardant foam.

FIGS. 3A-3C depict three views of an example of housing 16, which may also be referred to as a battery enclosure. As depicted, there are nine cell holders 18 for cylindrical batteries. Cell holders need not be cylindrical but may be manufactured to fit any battery shape. As shown in FIGS. 3A-3C, the tubes defining cell holders 18 may be thin walled and spaced apart from each other in order to provide space between the cell holders. An inner wall 20 of housing 16 may define an open volume, separating portion 22 as shown in FIGS. 3A-3C between inner wall 20 of housing 16 and outer wall 25 of cell holders 18. Separating portions 22 may be open (as shown) or in some embodiments contain flame-retardant material, fire-retardant material, and/or water (not shown). Walls 24, 25, 26 may be made of any material with sufficient strength, electrical resistivity, and thermal conductivity. Cell holder walls 24, 25 and housing walls 26 may be a single unit made of the same material as shown FIG. 3A.

In some instances, cell holder walls 24, 25 and housing walls 26 may each be made of different materials based on requirements for various battery cell types. In particular, the interior cell holder wall 24 may include a material selected for electrical resistivity, and/or thermal conductivity. For example, interior cell holder walls may include a layer of a material that promotes heat transfer from the energy storage devices to the open volume between the cell holders. The outer cell holder wall 25 material, may be selected, for example, due to one of more properties including strength, electrical resistivity, and thermal conductivity. Cell holder materials may include polymers such as common plastics including but not limited to acrylonitrile butadiene styrene (ABS), polycarbonate, polyamides, such as aliphatic or semi-aromatic polyamides for example, nylon, polyethylene, polypropylene, elastomers such as rubbers, silicone, etc., and/or mixtures thereof. Further, the materials of the cell holders 18 should be electrically insulating.

In general, the walls of the cell holder should act as an interface between the energy storage devices and the separating portion 22 shown in FIGS. 3A-3C. For example, the cell holder walls should be electrically insulating but have a high thermal diffusivity to ensure maximum heat transfer from the energy storage devices to the separating portion which may act as a heat sink. Further, the separating portion may include flame-retardant, fire-retardant material and/or phase change materials for example, water to increase the capabilities of the separating portion to act as a heat sink.

FIGS. 4-7A show embodiments of housing structures 28, 30, 32, 34 designed to accommodate twenty-four battery cells with cell holders 36, as shown. Each cell (not shown) is held in place by a portion of the cell holder wall 38, a housing wall 40 that at least partially surrounds individual cell holders.

As shown in FIGS. 4-7A, the housing wall may encompass and couple individual cell holders 36 together. There is a space, defined as separating portion 42 between individual cell holders 36. In some instances, separating portion 42 acts as a heat sink.

In some embodiments, heat sink 44 may include various combinations of materials including but not limited to phase change materials, flame-retardant materials, fire-retardant materials and/or combinations thereof.

For example, as shown in FIGS. 5-7A, separating portions 42 acting as a heat sink include porous fire-retardant foam 44. To increase the capability of the energy storage system to absorb heat, a phase change material, in this case water is added to the porous fire-retardant foam to form a water infused fire-retardant foam as heat sink 46. Thus, water may fill at least some of the space between the cell holder walls 38 and the housing walls 40 acting as heat sink material 46, as the water infused fire-retardant foam. In some embodiments, the phase change material may occupy between about 5% to about 95% of the porosity of the fire-retardant foam. For example, the phase change material occupying the porous areas of the fire-retardant foam may occupy between 40% to 80% of the pore space.

Figure 7A:
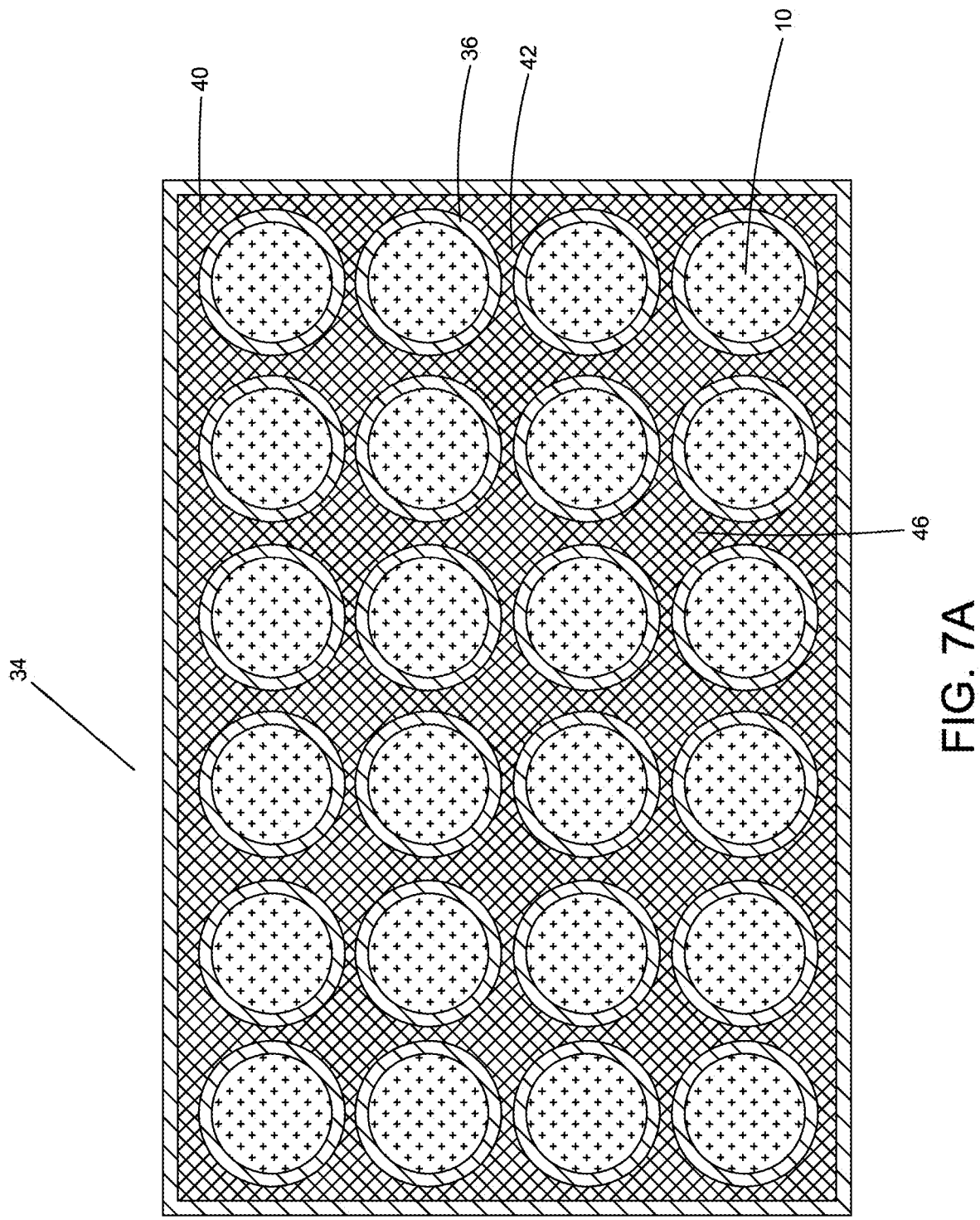
FIG. 7A depicts a top down view an embodiment of the battery pack enclosure with water filled fire retardant foam and batteries installed.
Figure 7B:
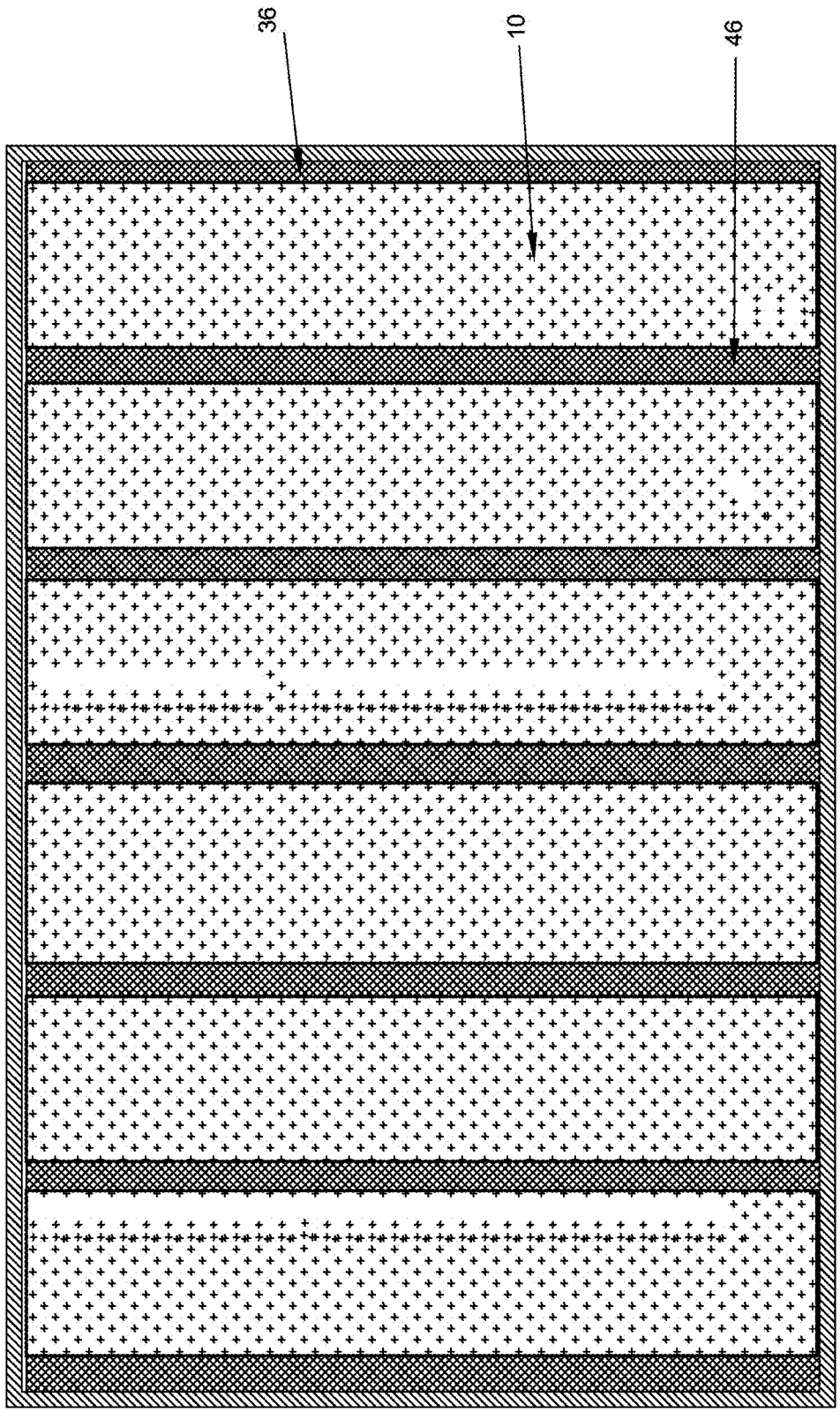
FIG. 7B depicts a side cross-sectional view of the embodiment of the battery pack shown in FIG. 7A.

As shown in FIG. 7B, a side cross-sectional view of the battery pack shown in FIG. 7A, indicates that the heat sink material 46, in this case, the water infused fire-retardant foam, is positioned between the cell holders 36 such that it substantially surrounds the batteries 10.

In some embodiments, the separating portion 42 between cell holders 36 may include heat sink materials 46, such as porous fire-retardant materials and/or non-porous thermally conducting material to conduct the heat away from the cells to outer housing walls 40.

Heat sink materials may also be a combination of porous fire-retardant material and non-porous thermally conducting material or a porous fire-retardant material and another porous material containing phase change material. In some instances, the phase change material may be selected that has melting temperature close to desired temperature range of battery (in between 25° C. to 50° C.) as shown in FIG. 7C.

Figure 7C:
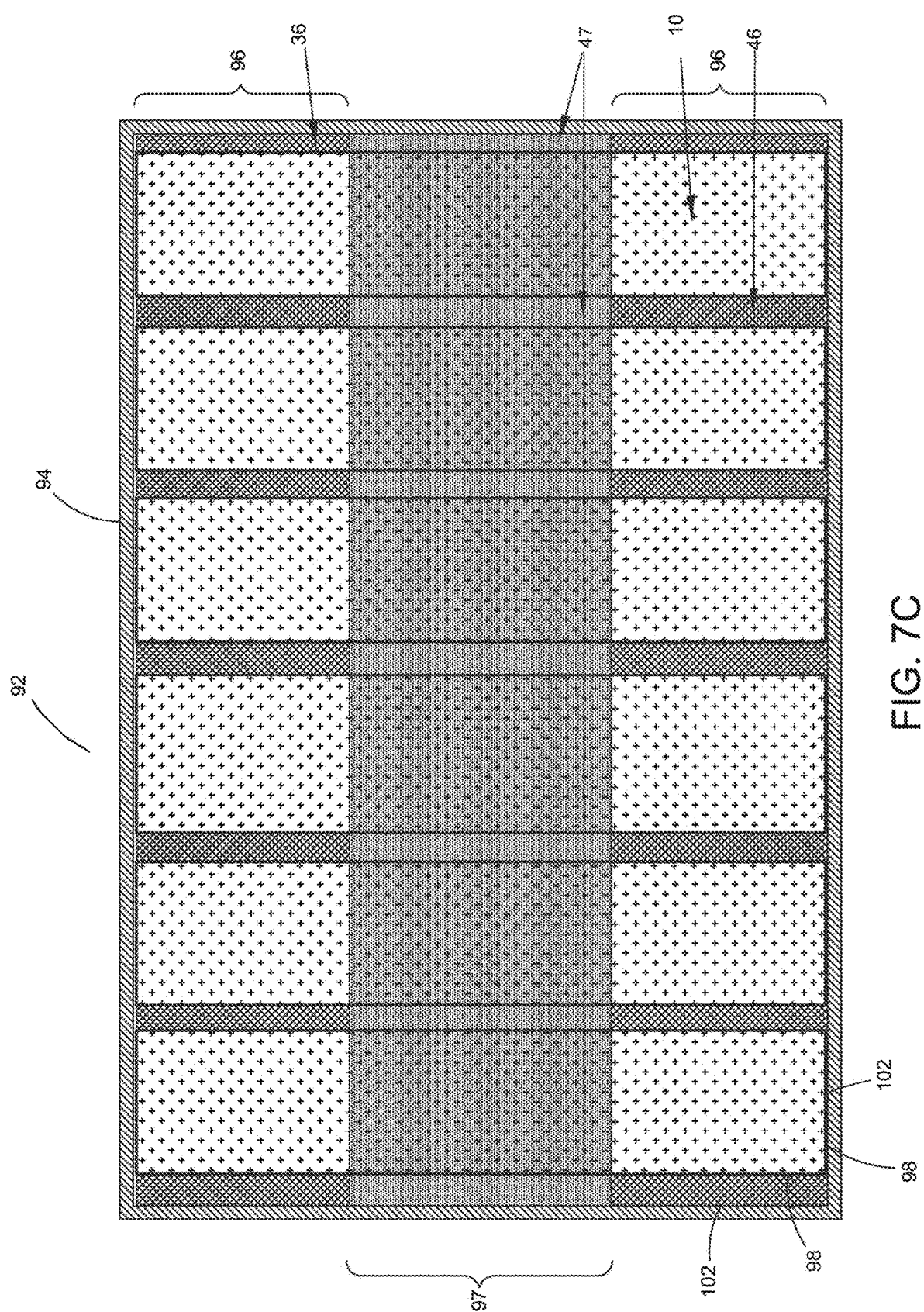
FIG. 7C depicts a side cross-sectional view of an embodiment a battery pack having a layer of heat sink material.

FIG. 7C depicts a side cross-sectional view of an embodiment of a battery pack 92 having zones of differing heat sink materials 46, 47 positioned within housing 94. As shown, heat sink material 46 of zone 96 includes a water-infused fire-retardant foam. In contrast, zone 97 may include a heat sink material having different thermal properties, for example, a higher heat capacity or a higher thermal conductivity than the materials used in zone 96. Further, the heat sink material may include PCM having a melt temperature in a predetermined range based on the needs of the system. For example, a PCM may be a material other than water. Within zones 96, 97 heat sink materials 46, 47 may occupy the space between cell holder wall 98 and interior housing wall 102, respectively. In some embodiments, heat sink materials substantially surround cell holders 36 and the batteries within them.

In some embodiments, the system may be designed to be reusable and/or capable of being replenished. For example, energy storage devices such as batteries or electronic devices, components, and/or systems could be accessible via a portal, for example, through an opening having a removable, detachable, and/or self-sealing cover. Such a cover may be secured to the rest of the thermal management system using any coupling system known in the art that, for example, fasteners such as screws, bolts, nut assemblies, adhesive tape, gasket cover etc. For applications, where any portion of the thermal management system is reusable, it may be desired that the coupling system be capable of being removed and repositioned. In some instances, a cover may include a heat sink material positioned on a surface to increase at least one of the heat storage capacity and/or the heat dissipation rate.

In particular as depicted in FIG. 7C, zone 97 may include heat sink material 47 such as a porous material with a phase change material and/or a material having high thermal conductivity. For example, heat sink material 47 may include porous material filled at least in part with a PCM selected to have a melt temperature in range between about 25° C. to 50° C. In some instances, between about 20 to about 80% of the pore space within the porous material may be filled with phase change material.

Depending on the configuration of the system, multiple zones of differing materials may be used throughout the thermal management system to effectively absorb and/or remove heat. Further, some embodiments may include open space, for example, air gaps and/or channels in the thermal management system. For example, air-gaps in the housing may be utilized as well.

Channels and/or air gaps may be used to facilitate heat removal from the PCM via natural convection. For example, in an energy storage device channels and/or air gaps may increase heat transfer from the central cell holders to outer cell walls. In particular, channels and/or air gaps having a thickness ranging from about 0.5 mm to about 2 mm in between the zones can facilitate heat removal from the PCM via natural convection from the central cell holders to outer cell walls. Without the gaps and/or channels, heat removal from central portion of a battery may be limited to conduction.

Channels may be used to extract heat from the system using a heat transfer fluid, for example, a gas or liquid. Channels may have various configurations designed to maximize heat transfer in the system as needed. For example, channels may differ in diameter, shape, path through the system, wall thickness, and/or material depending upon the use and design of the system. For complicated designs, use of additive manufacturing may allow for complex designs for channels, heat sinks (including customized porous structures), cell holders and/or housings. Thus, truly customized thermal management systems may be developed for heat generating devices such as batteries, electrical components, electrical devices, and/or systems.

Figure 7D:
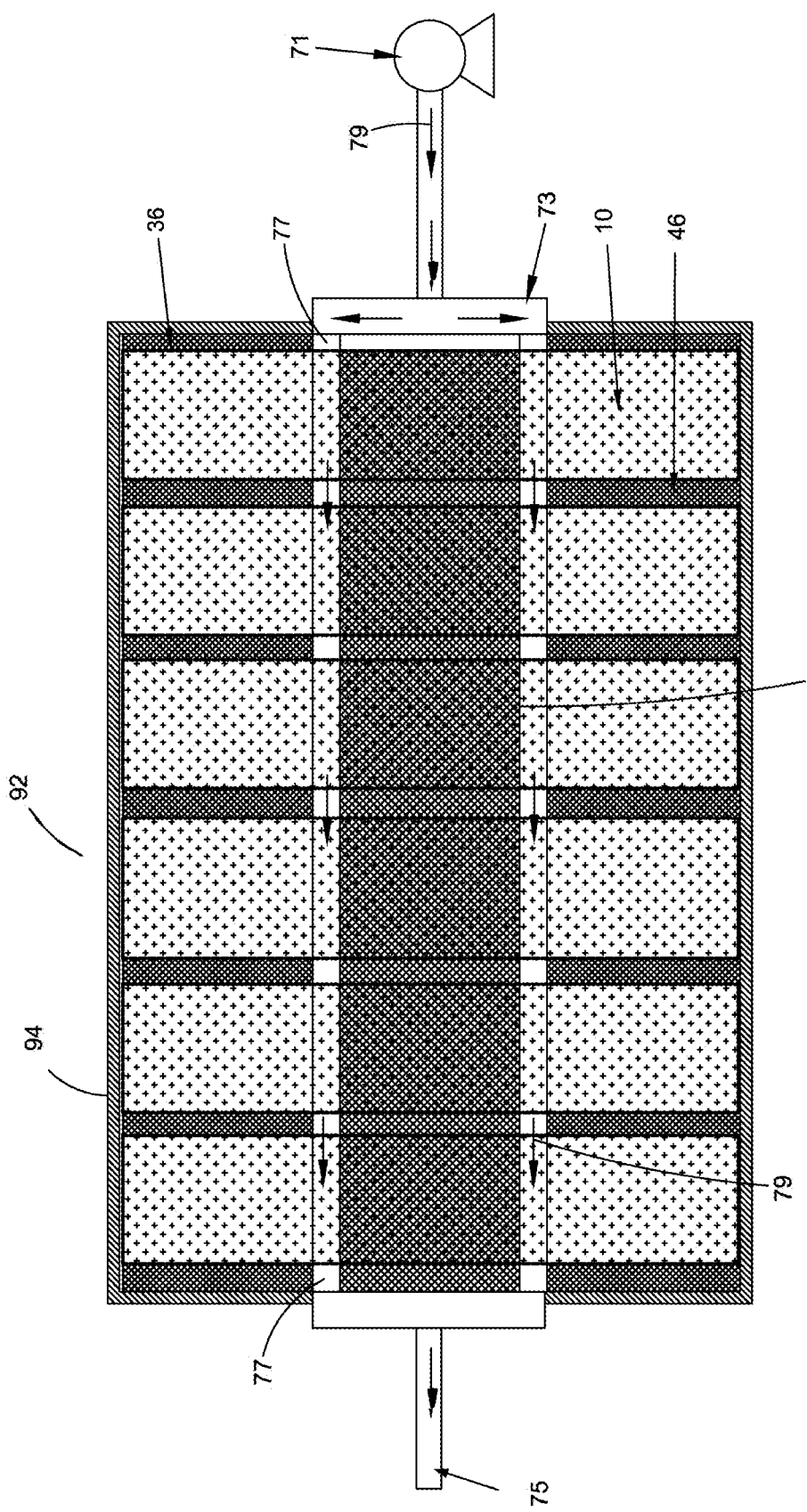
FIG. 7D depicts a schematic of a side cross-sectional view of an embodiment of the battery pack having channels.

In an embodiment shown in FIG. 7D, channels 77 positioned within heat sink material 46 allow air or liquid to be pumped into the battery enclosure to dissipate heat much faster in additional to heat storage in the heat sink materials. As depicted channels 77 run through battery pack 92 allowing for fluid flow from inlet 73 to outlet 75 as depicted by directional arrows 79. A fluid driver 71 may direct a heat transfer fluid to an inlet 73 into channels 77 of housing 94 to an outlet 75. The heat transfer fluid may be a gas, such as air, or a liquid such as water, oil such as mineral oil, silicone oil, etc, additives like ethylene glycol, propylene glycol, or the like and/or any type of liquid refrigerant. Suitable fluid drivers may include pumps, blowers, or the like.

Such a combination of active and passive cooling systems described herein offers advantages over current cooling strategies such as forced air/liquid cooling and PCM cooling methods. The advantages of the systems described herein over existing systems may include a reduction in the size of the fluid driver needed (i.e., reduced pump or blower size), increased efficiency of the driver (i.e., pump efficiency), removal of stored heat from PCM material or water inside pores of fire-retardant material.

Figure 8:
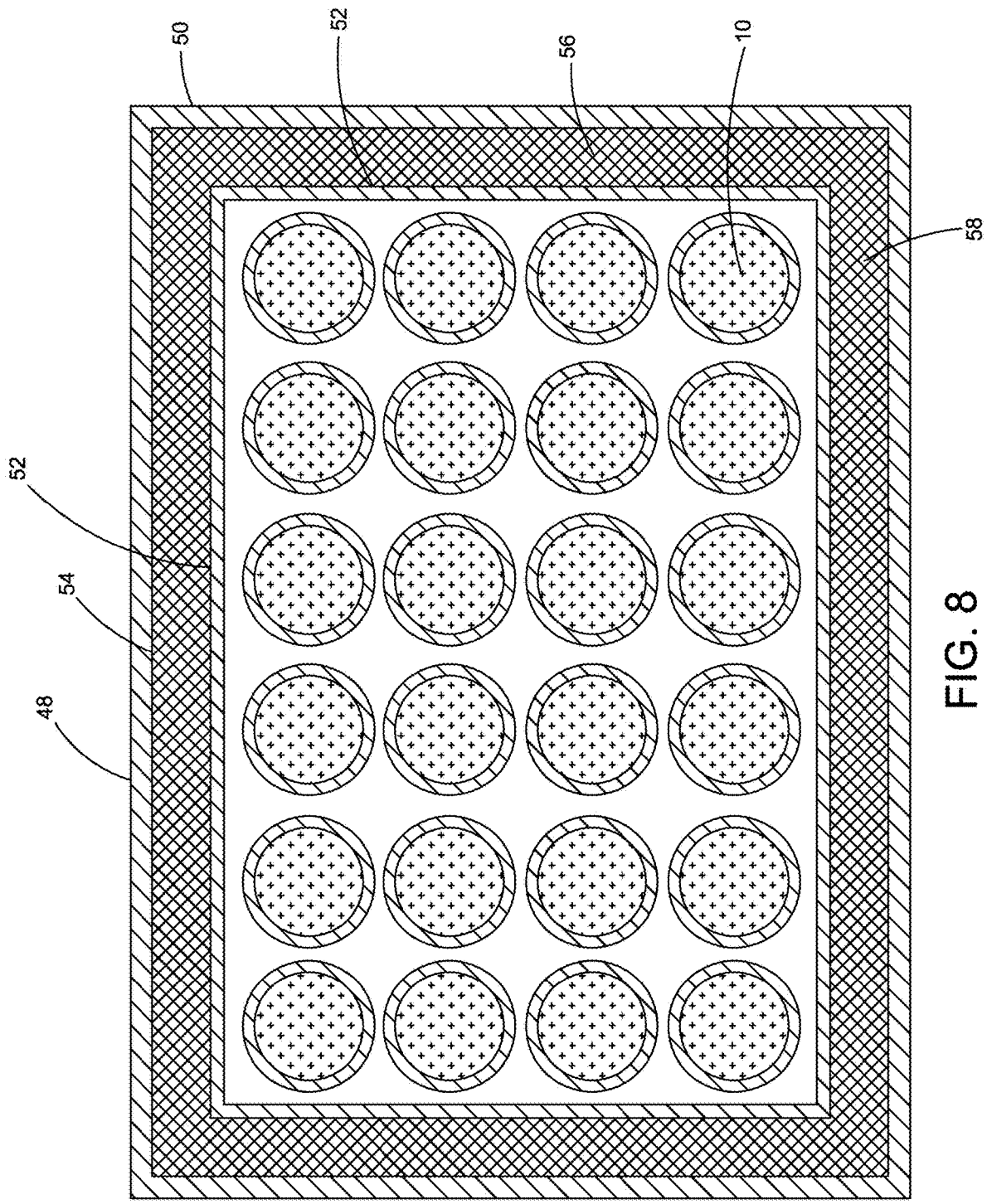
FIG. 8 depicts a top down view an embodiment of the battery pack enclosure with water filled fire retardant foam and batteries installed.
Figure 9:
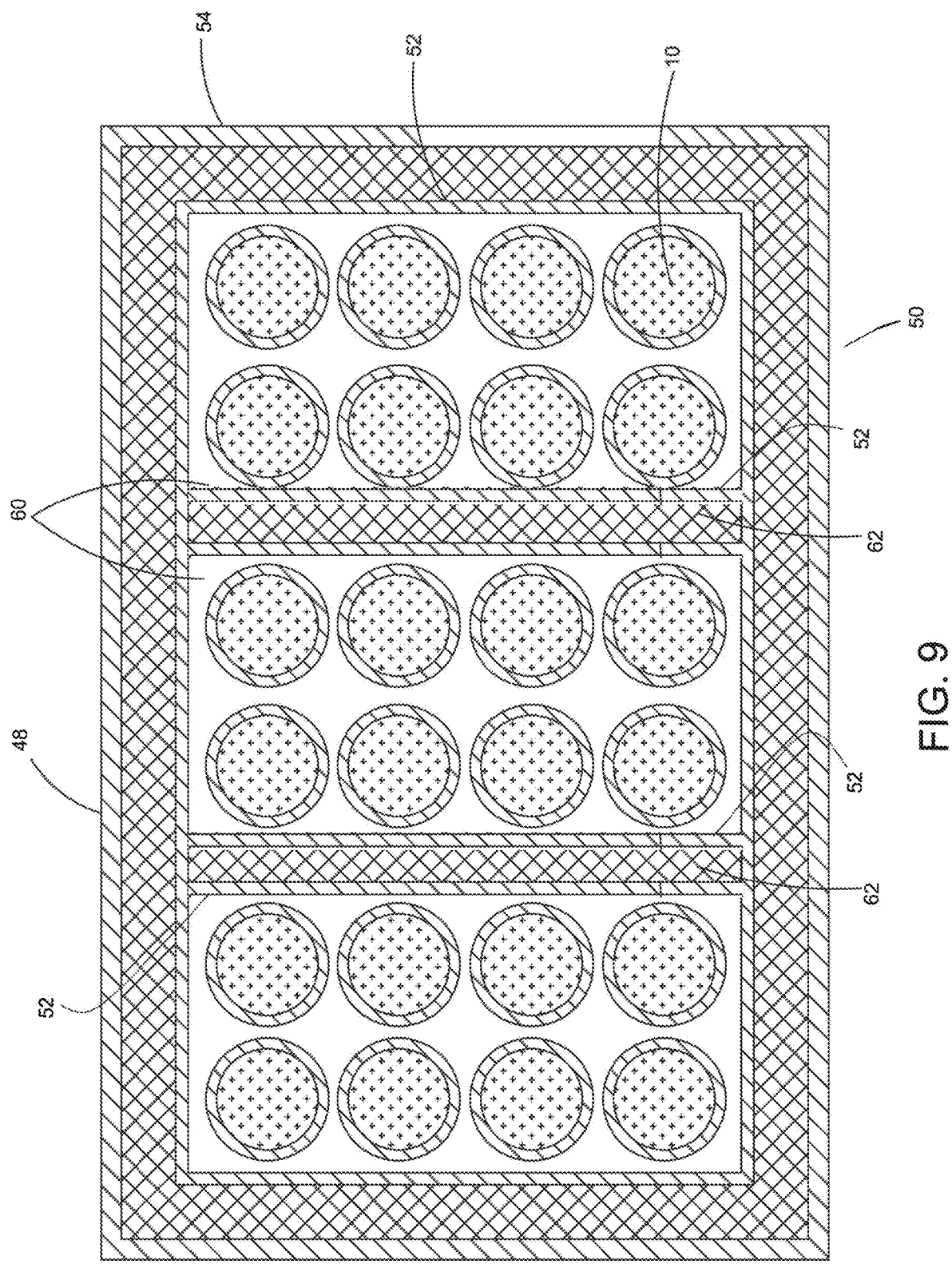
FIG. 9 depicts a top down view of another embodiment of the battery pack enclosure with water filled fire retardant foam and batteries installed.

FIGS. 8 and 9 show additional embodiments of energy storage systems 48 and in particular a housing or enclosure construction, which seeks to reduce and/or minimize the use of fire retardant material. Housing 50 may have an exterior housing wall 54 and an interior housing walls 52. As depicted in FIGS. 8-9, heat sink material 56 may be positioned between exterior housing wall 52 and an interior housing walls 54. Heat sink material may include flame- or fire-retardant materials such as foams, fibers, textiles, epoxy, graphite, melamine etc., in combination with a phase change material such as water, wax, and/or paraffin. As depicted in FIGS. 8-9, heat sink material 56 includes a porous fire-retardant foam with water 58 distributed across the foam. The amount of heat sink material such as porous fire-retardant foam necessary to provide thermal runaway protection for an individual energy storage device, for example a lithium-ion cell, may be calculated based on the volume of the individual energy storage device. For example, a volume of heat sink material necessary to inhibit and/or prevent thermal runaway of an individual energy storage device may be in a range of about 5 to 30% by volume of the energy storage device. In some instances, it will be desirable to provide a volume of heat sink material that is equivalent to 10 to 30% by volume of the energy storage device. As shown in FIG. 8, a thickness of heat sink material provided between exterior housing wall 52 and an interior housing walls 54 may be in the range from about 0.1 to about 2 mm. In particular, for example, a thickness of the heat sink material may be in a range from about 0.5 to about 1 mm to provide adequate thermal runaway protection for energy storage system 48 as depicted in FIGS. 8-9.

As shown in FIGS. 8-9, the inner wall of the housing may be surrounded by a layer of porous fire retardant material and water. The layer of porous material may be surrounded by an outer enclosure wall. The outer enclosure wall may be used to hold the porous fire retardant material in place. In some instances, additional heat sink material may be provided in areas vulnerable to thermal runaway. For example, groups 60 of individual energy storage devices 10 may be divided by interior heat sink walls 62 as shown in FIG. 9 such that housing 50 surrounds interior heat sink walls 62 and groups of energy storage devices with additional heat sink material.

In some embodiments, it may be useful to provide additional heat sink materials especially in the center most portions of the energy storage systems where there is potential for heat accumulation. Further, in the corners of the energy storage devices where there is potentially less thermal mass to absorb heat an amount of heat sink material may be increased. For example, if a greater amount of heat removal is required for a battery pack system, divider walls can be placed in between groups of batteries to ensure each battery has a heat sink to which it can preferentially dump heat instead of heating another battery.

Figure 10:
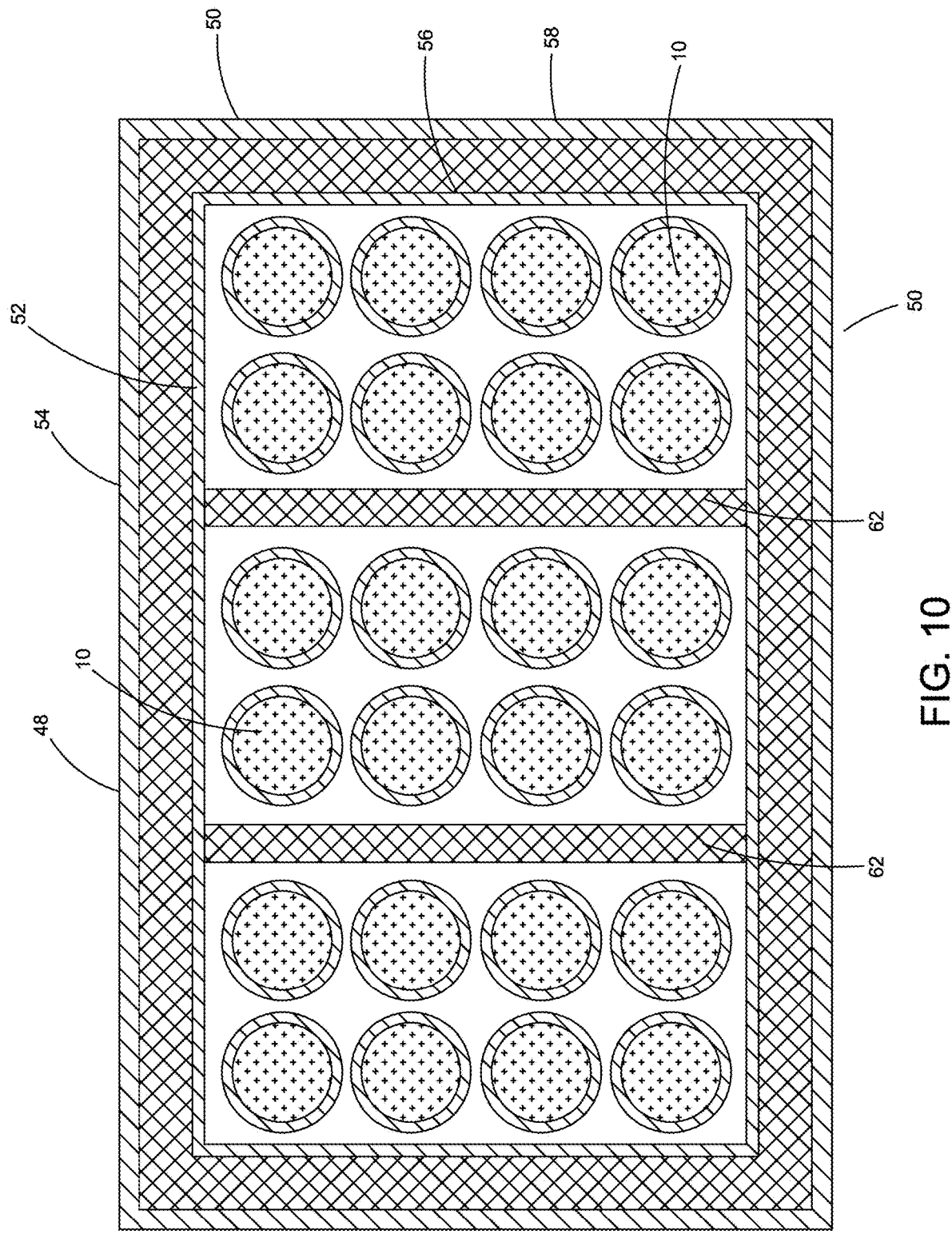
FIG. 10 depicts a top down view of another embodiment of the battery pack enclosure with water filled fire retardant foam and batteries installed.

Some embodiments of battery pack may include enclosures having two walls separated by a mix of flame-retardant and/or fire-retardant material and water. In such a construction the thickness of the heat sink material provided may vary depending on the requirements of the system and/or use. For example, in some instances, the heat sink material in the battery enclosure and divider walls may be as thick as shown in FIGS. 8 and 9, or as thin as shown in FIG. 10. Walls of the enclosure or housing may in some instances be made of the same material as casing material or cell holder material. It can be any polymer and electrically insulate the cells and the heat sink material.

During normal discharge operation, heat is generated by an energy storage device such as Li-ion battery batteries. The heat is absorbed by water contained in small pores of the porous "Fire-retardant" material in direct or indirect contact with battery cells and is stored as sensible heat.

Figure 11:
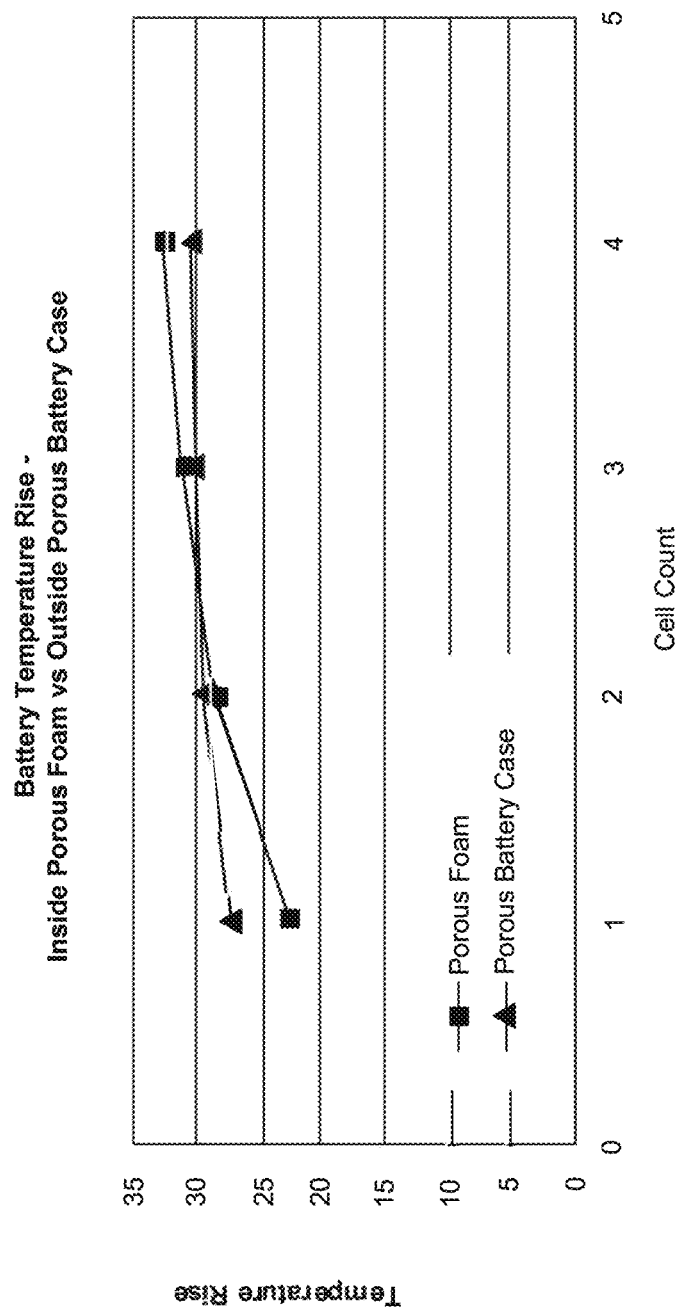
FIG. 11 is a graph plotting the increase of sensible heat storage for the storage case embodiments.

FIG. 11 graphically show the increase of sensible heat storage for the storage case embodiments. The porous foam line corresponds to the examples of an energy storage system as shown in FIGS. 4-7. The line identified as the porous battery case corresponds to the examples of an energy storage system that includes walls of heat sink material as shown in FIGS. 8-10.

Figure 12:
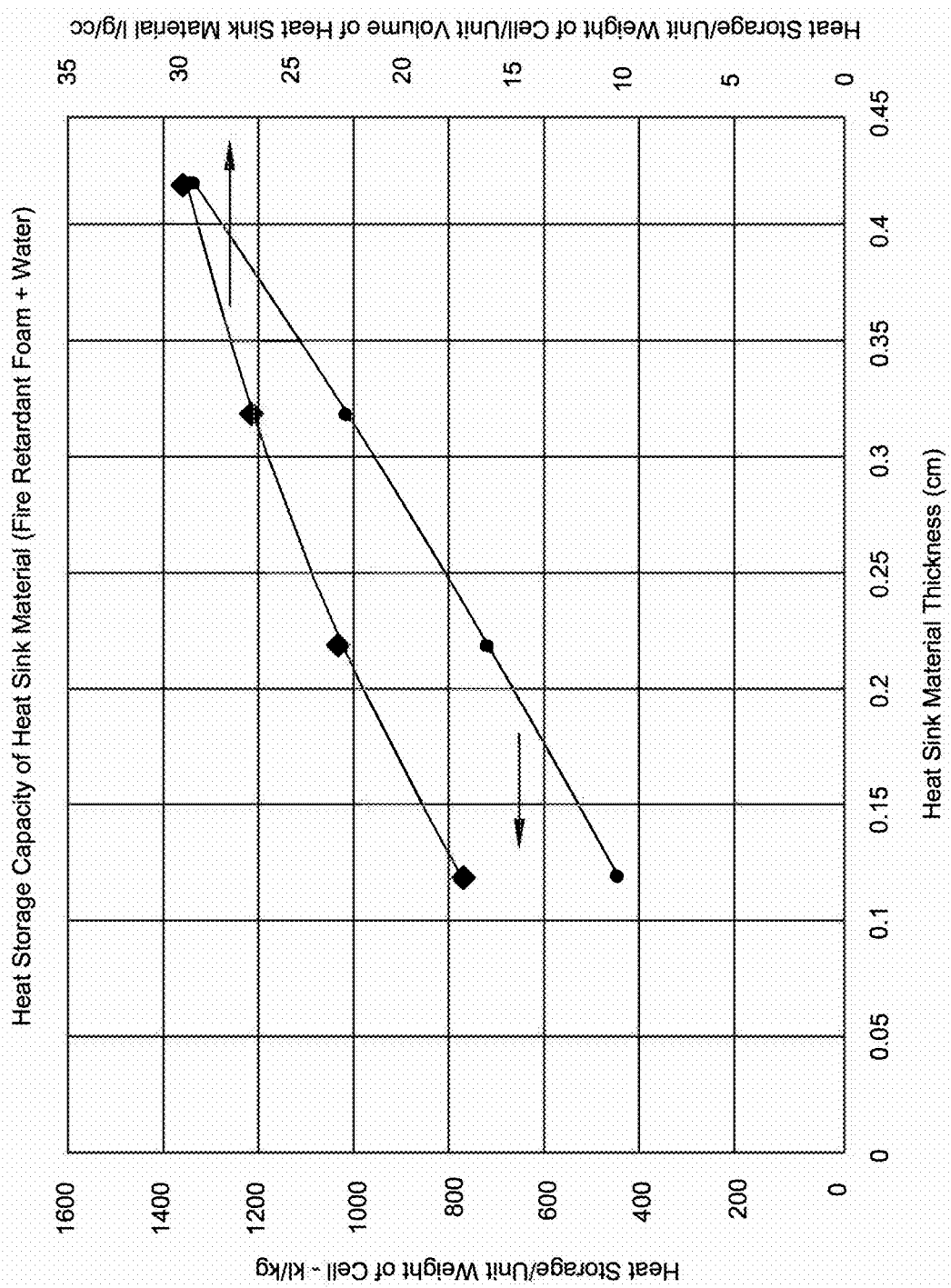
FIG. 12 is a graph plotting heat storage per unit weight of cell, as well as heat storage per unit weight of cell per unit volume of heat sink material, versus the thickness of the heat sink material.

FIG. 12 is a graph plotting heat storage per unit weight of cell, as well as heat storage per unit weight of cell per unit volume of heat sink material, against the thickness of the heat sink material.

Figure 13:
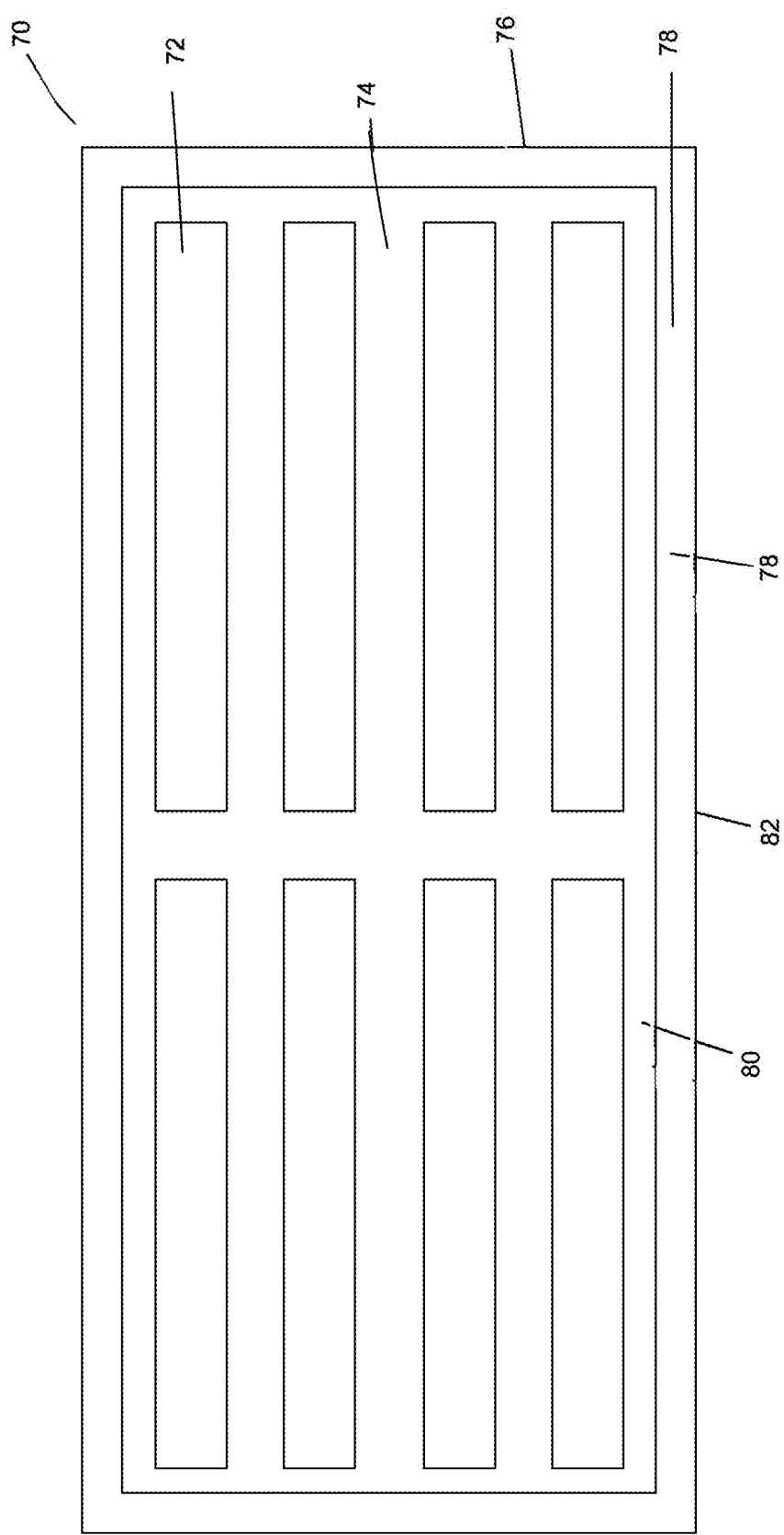
FIG. 13 depicts an embodiment of the case housing multiple battery cells, in particular prismatic Li-ion cells.

FIG. 13 shows an embodiment of a heat management system 70 designed to be used with prismatic Li-ion cells 72. Porous heat sink matrix 74 is in direct contact with the cells 72. Generally, heat sink matrix in direct physical contact with energy storage devices, such as Li-ion cells would not include water. As depicted in FIG. 13, enclosure wall 76 has an integrated heat sink matrix 78 within the interior and exterior surfaces 80, 82 of wall 76. In some instances, the interior surface of wall 76 ensures that the integrated heat sink matrix 78 is physically separated, for example electrically isolated, from the Li-ion cells 72 so that the integrated heat sink matrix may include water.

Figure 14:
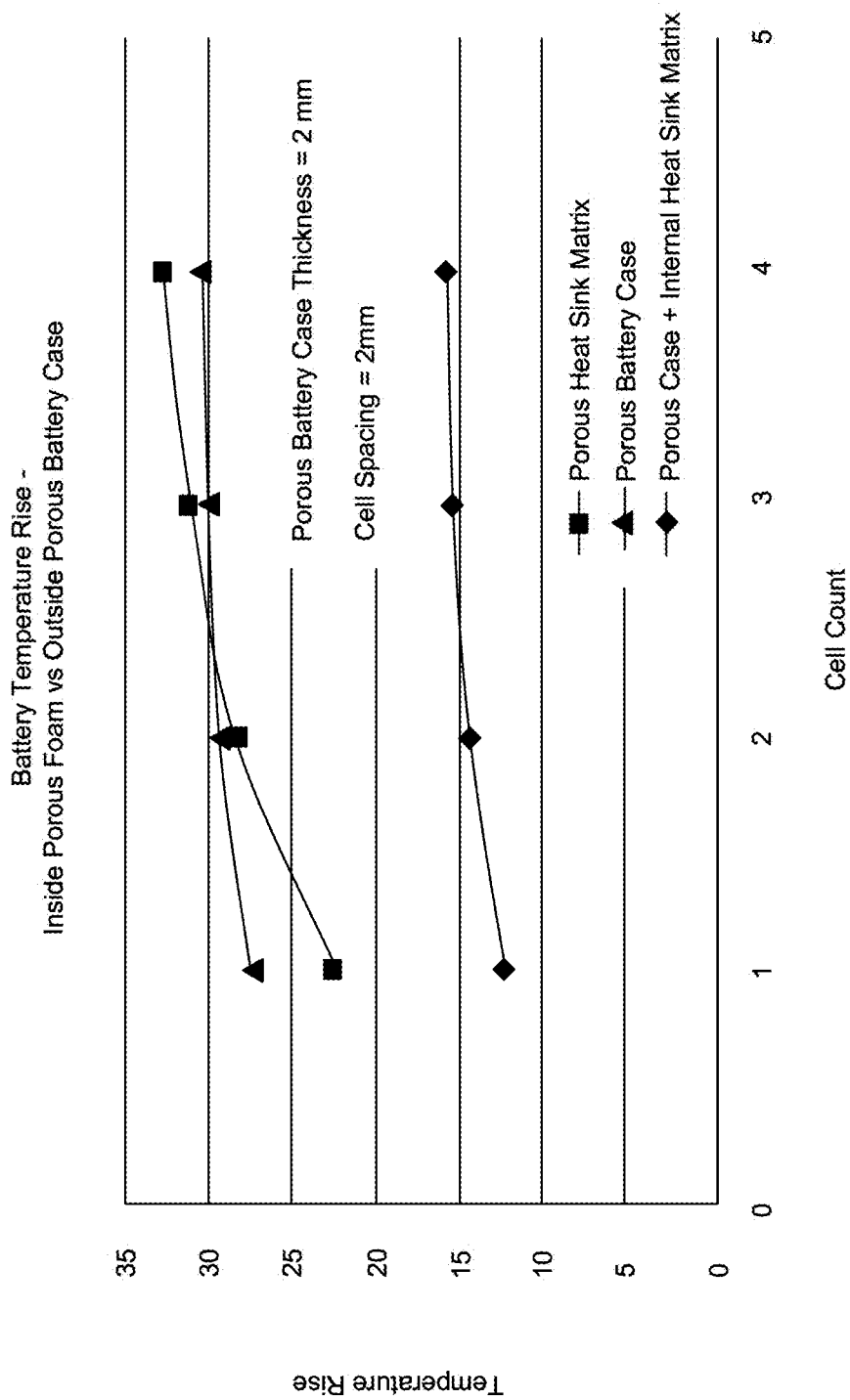
FIG. 14 depicts temperature rise as result of cell count for various embodiments.

FIG. 14 compares the increase of sensible heat storage for the storage case embodiments. The porous foam line corresponding to the embodiments shown in FIGS. 4-7 and the porous battery case corresponding to the embodiments shown in FIG. 8-10, while the porous case and internal heat sink matrix line corresponds to the embodiment of FIG. 13.

The heat storage capacity is 80-100 J/g for a temperature difference of 20-30° C. During the normal charge operation of Li-ion battery, the stored heat is slowly dissipated to the ambient via the battery enclosure.

Figure 15:
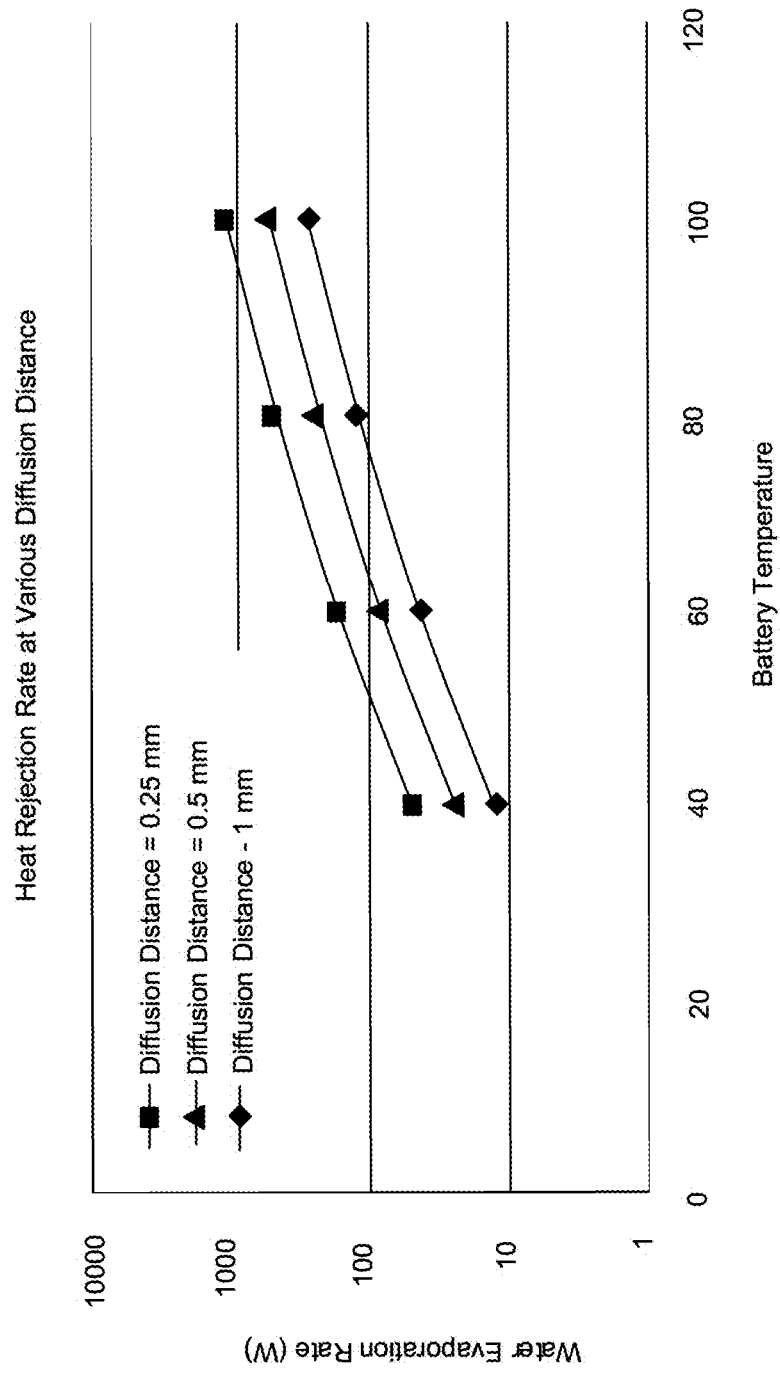
FIG. 15 depicts heat ejection rate as result of cell temperature for various diffusion distances.

FIG. 15 compares heat rejection rate base on water evaporation at various diffusion distance based on battery temperature. As the diffusion distance increases the evaporation rate decreases.

The amount of water turning into vapor phase is dependent on temperature and surrounding pressure. The water vapor produced increases exponentially with increase of temperature. The amount of water stored inside the pores of the porous material is dependent on the porosity, pore diameter, pore volume of the porous medium. Thus, the temperature of the energy storage device, such as batteries can be controlled in the range of 40 to 80° C. depending on the requirement.

Figure 16:
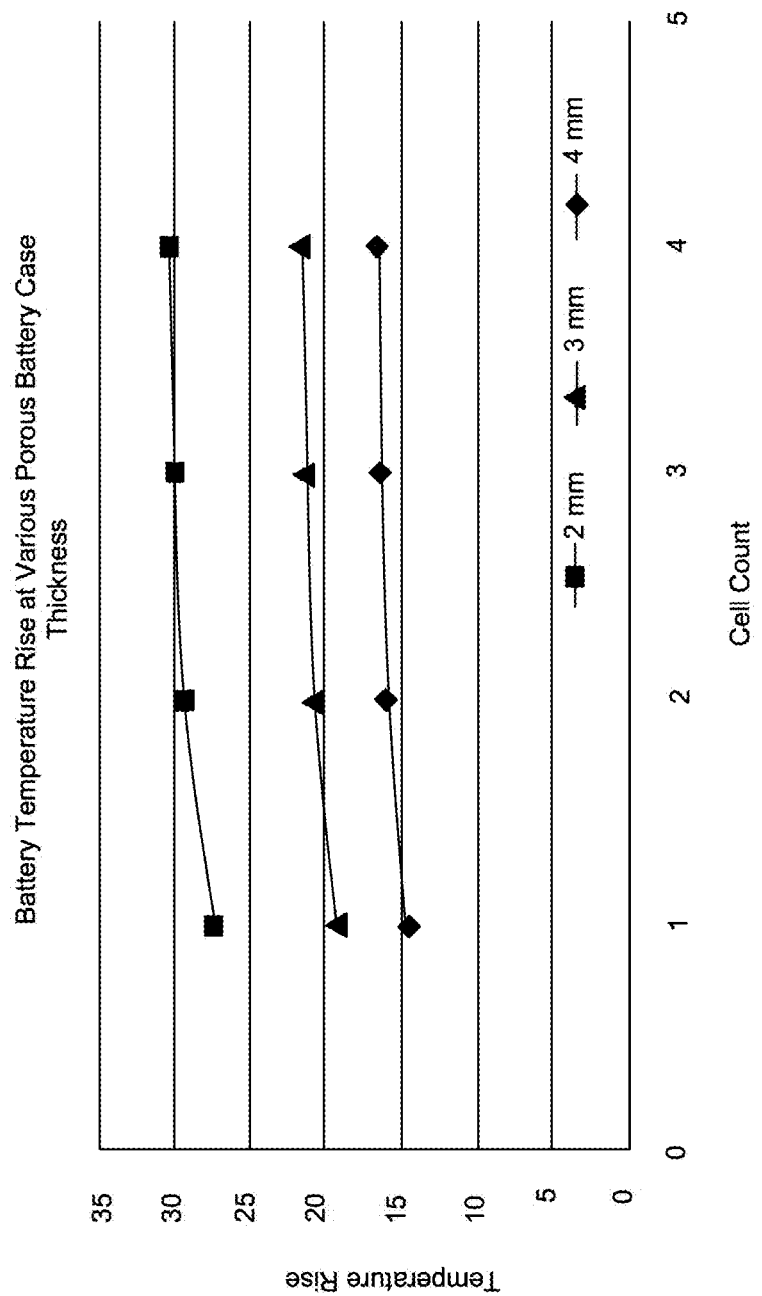
FIG. 16 depicts temperature rise with respect to various porous battery cases thicknesses and at multiple cell counts.

FIG. 16 compares the battery temperature rise based on the porous case thickness. As would be expected the thicker case would act as a larger heat sink, and would have a lower overall temperature and a lower temperature rise than the thinner case.

Thermal runaway can potentially be mitigated or prevented due to the large heat of vaporization of water used to absorb the large heat released from the Li-ion cells. During an event of unsafe battery conditions that could result in a thermal runaway hazard (typically a temperature greater than 120° C.), the water stored in the porous fire-retardant material will start to evaporate at faster rate absorbing large quantities of heat as latent heat of vaporization (~2200 J/g) and will maintain the battery temperature below 100° C. Thus, reducing, if not preventing the thermal runaway hazard. The large heat of vaporization of water (approximately 2200 J/g) is sufficient such that the temperature of energy storage devices, such as batteries, can be easily regulated with a small amount of water.

In addition, when the temperature reaches below zero degree Celsius, the enthalpy of fusion (~330 kJ/kg) released when liquid water transforms into ice could keep the cells warm. In some instances, adding small amount of anti-freeze agents like propylene glycol to the water of the heat sink offers freeze protection.

In the event there is localized fire if all the water has vaporized and/or a rate of heat release is greater than rate of heat absorption, a fire-retardant foam will consume the fire at a much faster rate and provide an additional layer of protection from the fire spreading to neighboring cells.

The ratio of heat sink material to battery may be chosen based on operational requirements, but in general, the lower the better so that it does not lower the battery's overall energy density per unit weight or volume. Currently, it is desirable to have it less than about 10% by weight of battery. In some instances, the heat sink material may account for up to 30% by weight of the battery.

Fire-retardant porous materials may include one or more materials including, but not limited to foam for example, carbon foam, graphite foam, melamine foam, melamine fibers, metal foam, flame retardant foam, etc. Thus, some embodiments may include a flame retardant foam that is commercially available. For example, a highly open cell foam made from a fire-retardant foam may include an interconnected network structure. The structure may be super-hydrophilic to water and readily absorbs water. Typically, hydrophilic materials have low contact angle when water makes contact and they instantly absorb water typically few seconds or less than second.

The foam pore size may be very small such that it holds water inside the pores like a sponge. When this material is used with the battery, the heat released by the battery is absorbed by water inside the pores. Thus, water evaporation regulates the battery temperature.

The pore size of the fire-retardant material may be as large as 1 mm. An embodiment may include fire retardant material having pore sizes in a range from about 0.1 micron to 100 micron (for effective condensation rate of water into foam). Further, the pore sizes may be in range from about 0.1 mm to about 1 mm. In some instances, pore sizes may range from about 0.001 micron to 0.1 micron (nano-pore range). However, pore sizes in the nano-pore ranged will fill slowly at ambient pressure. Thus, a pressure gradient may be necessary to drive water into nano-pores.

It has been determined that the housing using a heat sink that includes fire-retardant material having a porosity of about 10% and that includes water would have a thermal storage capacity similar to a conventional thermal management system that uses a conventional PCM, for example, a paraffin wax. By increasing the porosity of the fire-retardant material to above 10%, it is possible to increase the amount of heat that the system can sequester and/or increase the thermal storage capacity of the thermal management system. As the thermal runaway phenomenon is a series of exothermic reactions, controlling and/or inhibiting thermal runaway depends on the thermal storage capacity available in the thermal management system. In some instances, a porosity of greater than 25% in the fire-retardant material of the heat sink may provide the thermal storage capacity required. Porosities greater than 50% may provide the desired for thermal storage capacity to inhibit and/or prevent thermal runaway for a configuration of energy storage devices such as batteries. In some constructions, a porosity of greater than 70% may be desirable to maximize the water storage capacity of the fire-retardant material. The desired porosity of any construction may be determined based on the type and number of energy storage devices, the end-use of the energy storage system, the construction of the thermal management system, and/or the desired properties of the thermal management system. For example, a desired property may be what would the maximum allowable temperature for the thermal management system be, at what temperature should the thermal management system engage, etc. In some instances, it may be possible to exert more control over the temperature profile of an energy storage system by increasing the thermal storage capacity of the system, for example by increasing porosity. For example, in some instances a porosity greater than 75% may be desired.

The porous medium may be a continuous matrix or discontinuous. An even distribution of water inside the porous flame-retardant or fire-retardant material is highly preferred. But water may also be concentrated in certain locations more prone to fire or have low heat dissipation rate. A material which is highly porous and very hydrophilic in nature may be very suitable for enabling water evaporative cooling strategy. Most preferably it may be continuous, connected structure. Water and flame-retardant material can perform their function simultaneously or separately depending on the temperature or presence of flame/fire.

In the event of complete water depletion, the foam will protect against fire or flame propagation because of its flame- and fire-retardant properties. If a fire-retardant material is used in direct contact (or capable of conduction an electrical current) with the energy storage devices such as cells or batteries, no water or liquid phase change material (PCM) should be distributed in the fire-regard material.

Heat removal capacity of the fire-retardant foam and water may be at least 20 J/g/cc (per unit cell mass/unit volume of heat sink material). The capacity provided by water alone is: Specific Heat+Latent Heat=336+2200=2536 J/g (80° C. temperature rise). The fire-retardant foam, may have a specific heat capacity to of approx. 1.2 kJ/kg·K. This leads to a heat removal capacity of 100 J/g (sensible heat only). As the fire-retardant material extinguishes fire, it will be endothermic and the heat dissipation needs to be estimated.

For example, a typical 18650 cylindrical Li-ion cell that is most commonly used in electronics and Tesla electric cars, the heat removal capacity required per unit volume of the heat sink material (fire-retardant foam+water) may be ~22.5 J/g/cc. This value can change depending on the cell capacity, cell type. On the other hand, other phase currently used change material (PCM) may only achieve 1-4 J/g/cc.

Protection can be designed for best case to worst case scenario. For worst-case scenario where entire lithium-ion cell goes into thermal runaway, then the full protection can be designed with 10-30% by volume of the cell. For nominal case, adequate thermal runaway protection can be designed with 5-10% by volume of the cell. Current manufacturing and assembling constraints may limit the ability to produce heat sink material (such as fire-retardant foams) that are thinner than 0.5 mm. Thicknesses of heat sink material available as fire-retardant foams for use in energy storage systems may be in a range from about 0.5 mm to about 5 mm. In most energy storage systems in use at the time of the instant application, heat sink material that includes a 0.5 to 1 mm fire-retardant foam will provide adequate protection.

The fire-retardant material may be foam, graphite foam, ceramic, may also be carbon/graphite porous paper which is commonly used in fuel cell applications called 'Gas diffusion layer'. The fire retardant material may also be a flame-retardant material like melamine foam or melamine fibers which has self-extinguishing feature in presence of fire. Melamine foam may be the primary choice because the entire material consumes fire unlike flame-retardant additives which is added in small quantities which is added in small quantities.

Melamine fibers may also be used and then filled with water. It might not be a continuous connected network like foam but can serve the purpose. Expandable graphite (not expanded graphite) may also be used. This is electrically conducting unlike melamine foam but since it is contained inside the insulating cell wall it may suffice. Also, it may need to be modified to improve wetting with water for quick absorption because graphite is not very hydrophilic. Above all whatever material used must have an ability to contain the fire or slow down the fire propagation, intumescent (like expandable graphite), dissipate heat quick (if possible), and be hydrophilic (absorb water).

Typically, battery enclosures only house the battery cells and protect the battery pack from the outside environment.

In this invention, the battery enclosure can be designed to be multi-functional. As discussed previously in this invention, the porous medium surrounding the cells can be filled with water or not filled with water. If it is not filled with water, then the battery enclosure case will hold the water. This can be in certain battery or cell module designs that cannot be in direct contact with water for assembly reasons or difficult to water proof the cells and safety circuit.

In this multifunctional battery enclosure invention, the battery enclosure will have special internal and external wall design features to hold the porous "fire-retardant" medium and the water. In this design, the battery cells will not be in direct contact with the porous medium but rather through the battery enclosure internal and external walls. The enclosure walls may be made of any polymer and electrically insulate the cells and the heat sink material.

Traditional casings tend to use plastic or metal, this casing will be integrated with heat sink material that can store and dissipate heat. Some constructions of the housing or casing may also have fins protruding outside for enhanced heat dissipation. The external casing can be in direct and indirect contact with the internal heat sink matrix or internal cell holder wall.

A lithium battery is a primary cell, in which lithium is used as the active material in the negative electrode. It is not configured to be rechargeable, in contrast with the lithium ion battery. The latter are frequently also referred to as lithium batteries. Examples of lithium batteries include the lithium-thionyl chloride battery, the lithium-manganese dioxide battery, the lithium-sulfur dioxide battery, the lithium-carbon monofluoride battery, the lithium-iodine battery, the lithium-iron sulfide battery.

Examples of other batteries include the alkali-manganese battery, the nickel-oxyhydroxide battery, the mercury-oxide-zinc battery, the silver oxide-zinc cells, the zinc-manganese dioxide cell, the zinc chloride battery, the zinc-air battery.

A rechargeable battery is a repeatedly reusable storage device for electrical energy, usually based on an electrochemical system, and is thus a special type of battery. In contrast with a nonrechargeable battery containing primary cells, a rechargeable battery has one or multiple rechargeable secondary cells. Rechargeable batteries are used as the starter battery in vehicles to generate electricity for light, for the on-board electronic systems and for the starter for starting the internal combustion engine. Rechargeable batteries supply electricity until the engine is running, then the rechargeable battery is recharged again via the alternator, which operates as a generator. Similarly, rechargeable batteries may be used in motorcycles, boats and aircraft.

Examples of rechargeable batteries include the NiCd (nickel-cadmium) battery, the $NiH_2$ (nickel-hydrogen) battery, the NiMH (nickel-metal hydride) battery, the NiFe (nickel-iron) battery, the Li ion (lithium ion) battery, the LiPo (lithium-polymer) battery, the LiFe (lithium-metal) battery, the LMP (lithium-metal-polymer) battery, the Li—Mn (lithium-manganese) battery, the $LiFePO_4$ (lithium-iron-phosphate) battery, the LiTi (lithium-titanate) battery, the LiS (lithium-sulfur) battery, the RAM (rechargeable alkaline manganese) battery, the PTMA (2,2,6,6-tetramethylpiperidineoxy-4-yl methacrylate) battery, the Na/NiCl (high-temperature sodium-nickel chloride) battery, the SCiB battery (super charge ion battery), the $SnC/Li_2S$ (tin-sulfur-lithium) battery, the silver-zinc battery, the vanadium-redox battery, the zinc-bromine battery.

This invention can be designed for normal battery heat removal and for "thermal runaway" heat removal in the same volume as the current state-of-art passive thermal management system. This invention may improve heat removal capacity compared to currently available passive thermal management systems. For example, the energy storage systems described herein may show an increase of heat removal capacity in a range of 5 to 10 times the systems limited to known phase change materials, such as wax or paraffin, currently available. This proposed thermal management solution can be designed to be very simple in operation, highly energy efficient, most cost effective etc. The proposed thermal management system can be designed to have very high heat removal capacity per unit mass (or per unit volume) of thermal management system. The material used in proposed thermal management system can be easily replenished or reused unlike other phase change material which cannot be replenished. The proposed invention uses water and it can be easily replenished via simple condensation mechanism within the system or external to system.

A few different options are available for designing condensation mechanisms. For example, fin structures may be positioned on the case to facilitate condensation. By adding extended fin structures at different locations on top of the case allows the heat from the water vapor to be dissipated and the water to condense back into liquid droplets. Heat-pipe condensation mechanism can also be applied. (https://www.electronics-cooling.com/2016/08/design-considerations-when-using-heat-pipes/). A few layers of porous hydrophobic layers may be sandwiched in between the flame-retardant or fire-retardant material in the heat sink matrix such that the water vapor can escape into the hydrophobic pores and later condense back into the flame-retardant or fire-retardant material matrix. A water vapor condensation cap may be used in the battery enclosure that can capture the water vapor and condense the liquid water into the porous medium. The flame resistant porous material may prevent fire and flame propagation in the event of thermal runaway of batteries when all the water is vaporized. The porous flame resistant material may store water easily and enable continuous water evaporation, condensation, refilling of water.

Thermal management systems for devices and/or systems that generate heat are often designed to manage and/or remove heat from specific locations. For example, it may be necessary to manage heat near heat sources in devices or systems. Thus, it may be desirable to be able to customize components of thermal management systems to meet the needs of any given application. Further, in order to reduce size of such thermal management systems while still maintaining the necessary functionality a phase change material composite structure may be used. The phase change material composite structure may include a supporting structure that includes pores in which phase change material may be positioned. Elements of the PCM composite structure, for example, a supporting structure and/or a support element each may be formed in part or as a unitary component. Further, such components may be formed using one or more manufacturing methods including, but not limited to additive manufacturing, sintering such as laser sintering, selective laser sintering, selective heat sintering, electron beam melting, direct metal laser melting, direct metal laser sintering, vat polymerization, printing, molding, extrusion, deposition, jetting, knitting, braiding, and/or weaving. These methods may allow for the formation of components having forms customized to the applications. For example, the phase change material composite structure may be designed to allow for additional PCM in areas where the highest heat transfer should occur. In some embodiments, the composite structure may be designed to have improved strength in areas where desired. Further, the methods described herein, in particular additive manufacturing methods allow for an increased ability to design and control the pore shape and size within, for example, a phase change material composite structure, and in particular in supporting structures and/or support elements.

Components of the PCM composite structure such as supporting structures and/or support elements may include graphite, carbon, thermoplastics and/or metals provided as fiber, powder, filament, cloth, paper, and/or sheet materials.

In some embodiments of a thermal management system multiple PCM composite structures may be arranged to provide sufficient heat absorption, dissipation and/or transfer opportunities to ensure that the heat devices and/or the systems in which they reside are protected.

PCM composite materials may have a thickness in a range from about 0.02 mm to about 2 mm. In some instances a PCM composite material formed as a coating, paste, or the like may have a thickness of about 0.05 mm.

When a PCM composite is used, it may be possible to reduce the need for and/or eliminate the use of thermal interface materials. This may depend on the thickness of the PCM composite material and/or structure. For example, a PCM composite material having a thickness of about 5 microns may be used in place of thermal interface material in some embodiments. In an embodiment, a PCM composite material having a thickness in a range from about 5 microns to about 250 microns may be used in place of thermal interface material. In some instances, the PCM composite material may be applied as a coating and/or a paste directly to a source of heat.

Figure 17:
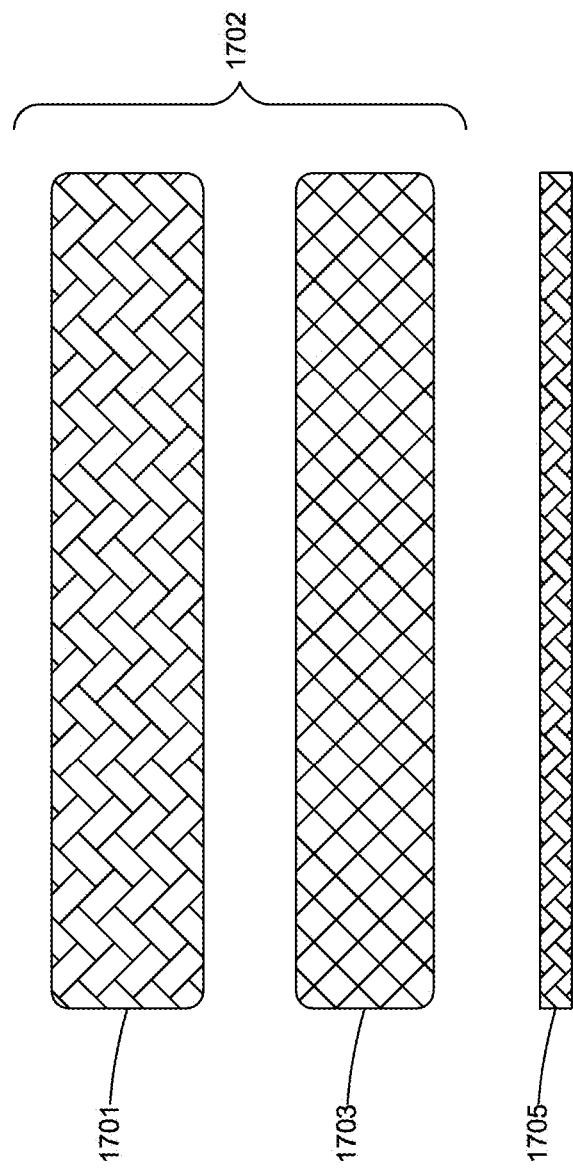
FIG. 17 is a schematic depicting materials for use in a multilayer PCM Composite Material.

FIG. 17 depicts materials used to fabricate an embodiment of a PCM composite structure. Various materials are used in the fabrication of the PCM composite structure to ensure that it meets the requirements of the application. Further, the properties and function of the various materials used need to be taken into account. The PCM composite structure may include at least two or three different materials to serve the key functions of heat storage, heat dissipation and inhibit and/or prevent PCM leakage.

The material shown in FIG. 17 as PCM 1703 absorbs the heat released by the heat source. PCM 1703 may be used as a liquid, powder, slurry, paste and/or a combination thereof. For example, the PCM could be chosen from organic and inorganic materials with melting temperatures ranging from 20° C. to 100° C. depending on the application. The PCM material could be used as is, as a microencapsulated PCM (fine PCM powder including a polymer coating to prevent PCM leakage), and/or macro-encapsulated PCM powder/flakes where PCM is filled inside very small microcapillary pores of a porous medium.

For example, PCM may be macro-encapsulated with porous materials like graphite powder, expanded graphite flakes, carbon black, carbon nanotubes or combinations thereof.

The PCM can also be made in form of paste of slurry by mixing with a high thermal conductivity filler material in liquid state. A suitable solvent can be used if PCM is in powder form initially or PCM is not in liquid state or to lower viscosity of PCM mixture. The filler materials that can be used include graphene, graphite powder, metal powder such aluminum, copper, graphene, boron nitride, alumina, aluminum oxide, aluminum nitride, magnesium oxide, zinc oxide in composition ranging from 0.1% upto 50% preferably 0.1% to 30%).

For example, in an embodiment in which the PCM is a microencapsulated, a fine PCM powder that includes a polymer coating to prevent PCM leakage may be used. In any of the embodiments described herein, sometimes, additives or fillers are mixed with PCM to improve thermal conductivity for faster conduction to the PCM. Additives and/or fillers may include, but are not limited to expanded graphite, graphite, carbon, and/or metallic powder, metallic, carbon, and/or graphite fibers, or combinations thereof. Alternatively, embodiments may consist of PCM without the presence of fillers and/or additives.

Material 1701 in the composite may be added to PCM to increase the thermal conductivity of the composite. These include the additives or fillers such as expanded graphite, graphite, carbon, and/or metallic powder, metallic, carbon, and/or graphite fibers, or combinations thereof. Alternatively, if needed such materials may also be formed into a continuous support using methods like compression molding, additive manufacturing etc. For example, expanded graphite fibers can be pressed to form a 3-D porous structure with high porosity ranging from 5% to 95%. These pores would then be filled with PCM 1703. This new composite structure (material 1701 and 1703) will be called 1702. Material 1702 may have a thickness in a range from about less than 2 mm. In some embodiments, the thickness of Material 1701 will be in a range from about 0.05 mm to about 1 mm. For example, in certain instances Material 1701 will have a thickness in a range from about 0.05 mm to about 0.5 mm. But it is very difficult or time consuming or expensive process to manufacture very thin structure using powder or fibers as starting material. Also, they lack sufficient mechanical strength to be handled easily or when subject to mechanical stresses. Alternatively, polymer powder or thermoplastic material can also be included in material 1702 to give some mechanical strength for handling purpose or increase mechanical strength.

In some embodiments, a supporting structure having a high porosity may be used to house PCM in the pores of the structure. The continuous porous structure may include a supporting structure formed, for example, by additive manufacturing, sintering, printing, molding, extrusion, deposition, jetting, knitting, braiding, and/or weaving.

As shown in FIG. 17, a porous supporting structure comprising material 1702 may include a metal, carbon, thermoplastics, and/or graphite. In some embodiments, the supporting structure may include a foam having an open pore network. For example, the porous supporting structure may be a porous carbon foam, or a carbon and graphite foam. In some embodiments, a porous supporting structure may have a fine micro-capillary network of pores with porosity ranging from about 5% to about 95%. For example, a porous supporting structure having a fine micro-capillary network of pores may include a metal, carbon, and/or graphite porous structure. In some instances, a porous supporting structure may include a metal, carbon, and/or graphite porous structure, for example, carbon paper and/or graphite paper having fine micro-capillary network of pores with porosity ranging from 5% up to 95%.

In some embodiments, PCM material fills the pores of a porous supporting structure to form a porous matrix. Using such a configuration may allow for a uniform PCM phase transition having uniform heat distribution across the entire porous matrix.

Depending on the type of material used, the matrix material may not possess sufficient mechanical strength to maintain structural integrity when external mechanical load is applied. For example, an expanded graphite structure may have limited mechanical strength because the expanded graphite fibers are soft and not a continuous structure.

However, when the pores of such a graphite structure having a porosity in range from about 40% to about 95% (depending on density) are filled with PCM, the resulting composite structure has sufficient mechanical strength to be handled when PCM is in solid phase. When PCM is in liquid phase, the composite structure may lose more than 75% of its original strength as the expanded graphite structure is not rigid enough to maintain its structural integrity. Thus, when PCM material is in a liquid phase the composite structure may break easily, for example, under a small compression load. In some instances, the composite structure cannot be handled without breaking, especially when very thin (i.e., less than about 2 mm). For example, a thickness of a matrix, such as PCM composite material 1702 may be less than about 2 mm. Thus, in some embodiments composite structures may be encased in an external structure and/or laminated in a polymer film to inhibit or prevent disintegration and/or PCM loss.

Material 1705 is included in the multilayer PCM composite PCM material as additional support structural element. Such a support element may have a thickness in a range of about 0.01 mm to about 1 mm. In some embodiments, material 1705 may be a thin film support element. In some instances, material 1705 may provide additional mechanical strength, for example, if one or more materials described herein to hold the PCM and/or filler lack adequate mechanical strength. This thin film support element may be porous or non-porous but most preferably porous material. This material should preferably have high thermal conductivity.

Such a support element is particularly useful when very thin PCM composite material needs to be fabricated. For example, such a support element is useful when the PCM composite material 1702 (i.e., the combination of material 1701 and PCM 1703) used has thickness of less than about 1 mm. In some instances, support elements, such as support element 1705 of FIG. 17, may have a thickness less than or equal to that of PCM composite material 1702. There may be conditions that call for use of a support element 1705 having a thickness less than or equal to the thickness of PCM 1703.

For some uses, PCM 1703 may be applied to this support structure directly to fill pores of material 1705. PCM 1703 can completely fill or partially fill pores of material 1705 to form a microporous layer of PCM 1703 on top of the support material 1705. This support material 1705 preferably should have high thermal conductivity to transport heat into and away from the PCM 1703 or 1702. Material 1701 or material 1702 (i.e., the combination of material 1701 and PCM 1703) as described above may lack the mechanical strength necessary to maintain rigidity, especially if very thin (i.e., less than 1 mm). This may be important if material 1701 is made of carbon and/or graphite material. Thus, adding a support element having good thermal conductivity for heat dissipation may improve the mechanical strength.

For example, materials used in the support element may include, but are not limited to porous paper or cloth. In some instances, it may be useful to use a support element that is constructed from materials similar to the gas diffusion layer commonly used in fuel cell electrodes. In particular, paper and/or cloth made from carbon-based materials may be used, for example, graphite and/or carbon. For example, graphite paper may maintain the structural rigidity and strength in the PCM composite especially when the PCM undergoes phase transition from solid to liquid phase. When a porous carbon and/or graphite paper is used it may have a thickness in a range from about 10 microns to about 1 mm and a porosity in a range from about 10% to about 98%. If a non-porous graphite structure is used, then dense graphite sheets can be used. For example, in some instances graphite sheets having a density greater than about 1.5 g/cm$^3$ may be used.

In some embodiments, a metallic structure such as a copper and/or aluminum sheet may be used. Such a metallic structure may be porous or non-porous.

Below are described multiple ways to fabricate a thin PCM composite material. For example, embodiments are described that have a thin PCM composite material having high thermal conductivity for heat dissipation applications.

Two steps are commonly used to manufacture PCM composite structures using expanded graphite. In particular, these steps include formation of a porous supporting structure and filling the pores of the porous supporting structure using PCM. For example, as described above, the manufacture of the porous supporting structure for a PCM composite material may include using expanded graphite fibers. Expanded graphite fibers may be compressed to a known density to achieve a predetermined thermal conductivity (higher the density, higher the thermal conductivity). For example, at an initial graphite density of 200 g/L, the porosity may be typically around 78-80% and result in a thermal conductivity in a range from about 15 W/m-K to about 25 W/m-K in the in-plane direction of compressed graphite fibers.

Once the porous supporting structure is formed from expanded graphite, pores may be filled with PCM which includes organic and/or inorganic components. PCM may have a predetermined melting range, for example, the desired melting range needed to provide the necessary heat dissipation for the application. In devices, such as electronic devices and/or batteries, the range can be from about 25° C. to 60° C. for heat removal applications. Filling of the pores of the porous supporting structure is ideally done under ambient pressure and in a liquid bath of molten PCM. Thus, the molten PCM fills the pores of expanded graphite under capillary action. Vacuum pressure may be used to fill the pores at faster rate. Once all the pores are filled, an Expanded Graphite-PCM ("EG-PCM") composite material is formed. The EG-PCM composite material has a high thermal conductivity resulting from the graphite matrix and a high heat storage capacity due to the PCM.

Below various embodiments of fabrication methods are described that use EG-PCM composite material as one of the key starting materials in the formation of a thermal management system.

Figure 18A:
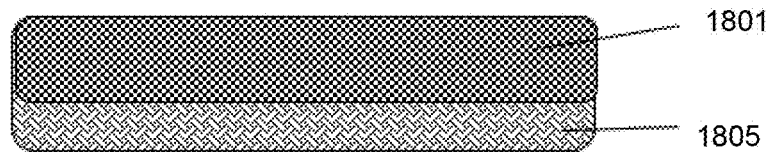
FIGS. 18A-E depict an embodiment of a schematic of a multilayer PCM Composite Material fabrication.

FIGS. 18A-E depict examples of steps in a method using a PCM, in particular, an EG-PCM composite material, as part of a thermal management system. As shown in FIG. 18A, EG-PCM composite material 1801 (material 1702 as shown in FIG. 17) is provided as a sheet having a thickness of less than about 2 mm. The thin sheet of EG-PCM composite material is positioned proximate support element 1805 (material 1705 shown in FIG. 17).

Figure 18B:
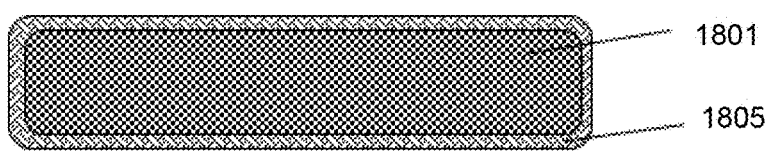

As shown in FIGS. 18A-B, the EG-PCM composite material 1801 is compressed into the pores of support element 1805 (e.g., a thin graphite/carbon paper or graphite/carbon cloth). Further, any materials that are commonly used in fuel cell applications as a gas diffusion layer may be used as support element 1805. It can also be a thin porous metallic sheet instead of graphite and/or carbon. Compression of the EG-PCM composite material into the support element may occur under an external compression load and heat, as required. For example, this operation can be done in a compression mold. In alternate embodiments, the EG-PCM composite material 1801 and support element 1805 as shown in FIG. 18A may be pressed together using a single roller or double roller press to form a structure similar to that shown in FIG. 18B. FIG. 18B depicts EG-PCM composite material 1801 surrounded by a layer of support element 1805. In some instances, PCM may be pre-heated prior to compression and/or during compression so that the PCM can be softened but not melted. This allows the softened EG-PCM composite material to be pressed into the pores of support element (e.g., graphite and/or carbon paper shown as support element 1805 in FIGS. 18A, 18B).

Alternatively, the EG-PCM composite material 1801 can be shredded into fiber or powder form and them compressed into the pores of the support element 1805 (i.e., Graphite/Carbon paper) as described above.

After fabricating PCM composite structure 1807, as shown in FIG. 18B, from EG-PCM composite 1801 and support element 1805 (i.e., graphite paper), the PCM composite structure can be used as a heat sink.

Figure 18C:
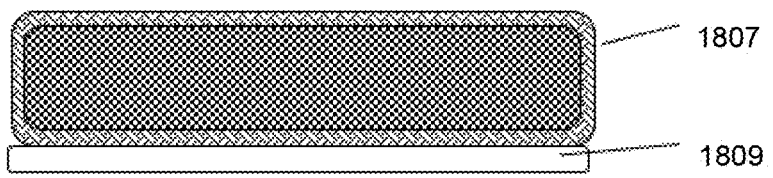

In some instances as shown in FIG. 18C, PCM composite structure 1807 can be coated with a Thermal Interface Material ("TIM") 1809 on a surface that is to be positioned proximate the interface with a heat dissipation device (not shown).

Figure 18D:
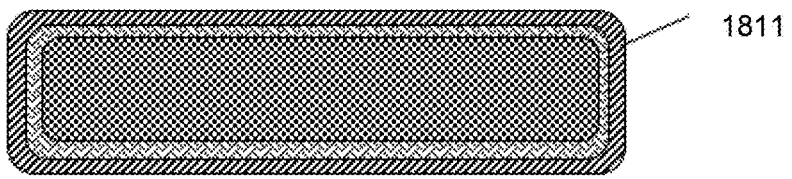
Figure 18E:
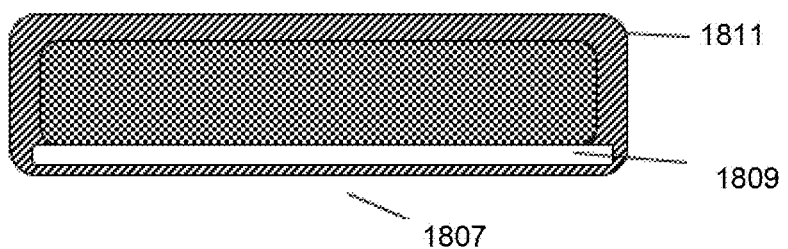

FIGS. 18D-E depict encapsulated PCM composite structures. In particular, PCM composite structure 1807 may include coating 1811 to inhibit and/or prevent PCM leakage. For example, PCM composite structures may be coated with a polymer coating, such as silicone, polyolefin, polyurethane, etc. In some embodiments, coating 1811 may be a dielectric coating. For example, dielectric coatings may be used in battery applications where it is necessary to inhibit and/or prevent electrical shorting between adjacent battery cells when PCM composite structures are used in between battery cells.

In some embodiments, EG-PCM composite material 1801 may be coated with a layer of polymer which inhibits and/or prevents PCM leakage.

Regarding the embodiments shown in FIGS. 18A-E any PCM may be used in place of the EG-PCM composite material described. Further, in some embodiments the PCM may be encapsulated. For example, an EG-PCM composite material may be encapsulated and used as the PCM.

FIGS. 19A-C show an embodiment of fabricating a PCM composite structure 1907 (shown in FIG. 19C) for use in a thermal management system. In this method to fabricate a PCM composite structure, a lamination technique is used to sandwich PCM 1901 between support elements 1905. PCM 1901 (i.e., similar to PCM 1703 or material 1702 as shown in Figure-17) may include, but is not limited encapsulated PCM, PCM having high thermal conductivity, encapsulated PCM having a predetermined thermal conductivity, EG-PCM composite material, encapsulated EG-PCM composite material, and/or combinations thereof. In some embodiments, PCM can also include various additives for enhancing thermal conductivity like graphite, carbon, metallic powders, fibers, etc.

Support elements 1905 (depicted as material 1705 in FIG. 17) may be formed from sheets of graphite and/or carbon paper and/or cloth. Thicknesses of the support elements may be in a range from about 0.01 to 1 mm. As shown in FIG. 19A, two support elements are positioned proximate opposing surfaces of PCM 1901. In order to inhibit and/or prevent the displacement of PCM beyond the edges of the support elements, support elements are sized to allow isolation element 1913 to form a seal proximate the edges of the support elements. Materials used in isolation element 1913 include, but are not limited to, epoxy glue, adhesive compounds, silicone, rubber, polyethylene, polypropylene, polytetrafluoroethene (e.g., Teflon™) and the like. For example, isolation element may include, but is not limited to a film, an o-ring, a gasket, a plug, or any geometry that will serve to isolate PCM from the surrounding system. Further, in some embodiments epoxy glue or an adhesive compound may be used on the edges to seal the PCM between the support elements.

In some instances, it may be desirable to select a material for the isolation element 1911 shown in FIGS. 19A-C that has a specific melt temperature. For example, this may be useful in situations where the heat load has approached and/or exceeded the capacity of the system. In these cases, a high temperature material used in the gasket may melt at a predetermined temperature allowing the PCM to come in closer contact to a heat source, and potentially help reduce the temperature in the system and/or heat source. In some instances, PCM may then directly contact the system providing additional capacity for removing heat. Such a material may be selected as a gasket and/or used in another manner surrounding the PCM and/or the PCM composite structure. This may allow the PCM or the PCM composite structure to function as a further protective measure to reduce the chance of a thermal runaway event.

As shown in FIG. 19B, support elements 1905, 1905' may be laminated to EG-PCM composite material 1901 using a compression mold or roller cylinders. In some instances, heat may be applied during lamination. Alternatively, support elements 1905, 1905' may be laminated to EG-PCM composite material 1901 without heat. The EG-PCM composite material is compacted between the two support elements as shown in FIG. 19B. In some instances, the compaction will cause PCM to penetrate into the pores of the support elements (e.g., graphite and/or carbon paper) thereby enhancing bonding between the layers.

In particular, FIGS. 19A-C can be used as an example of how to fabricate a PCM composite structure that includes EG-PCM composite material having a thickness of less than about 2 mm laminated between porous layers of graphite/carbon paper having a thickness in a range between 0.01 to 1 mm. A thin polymer film is used as a gasket to seal the EG-PCM between the layers of paper and to inhibit leakage of the EG-PCM.

Figure 19:
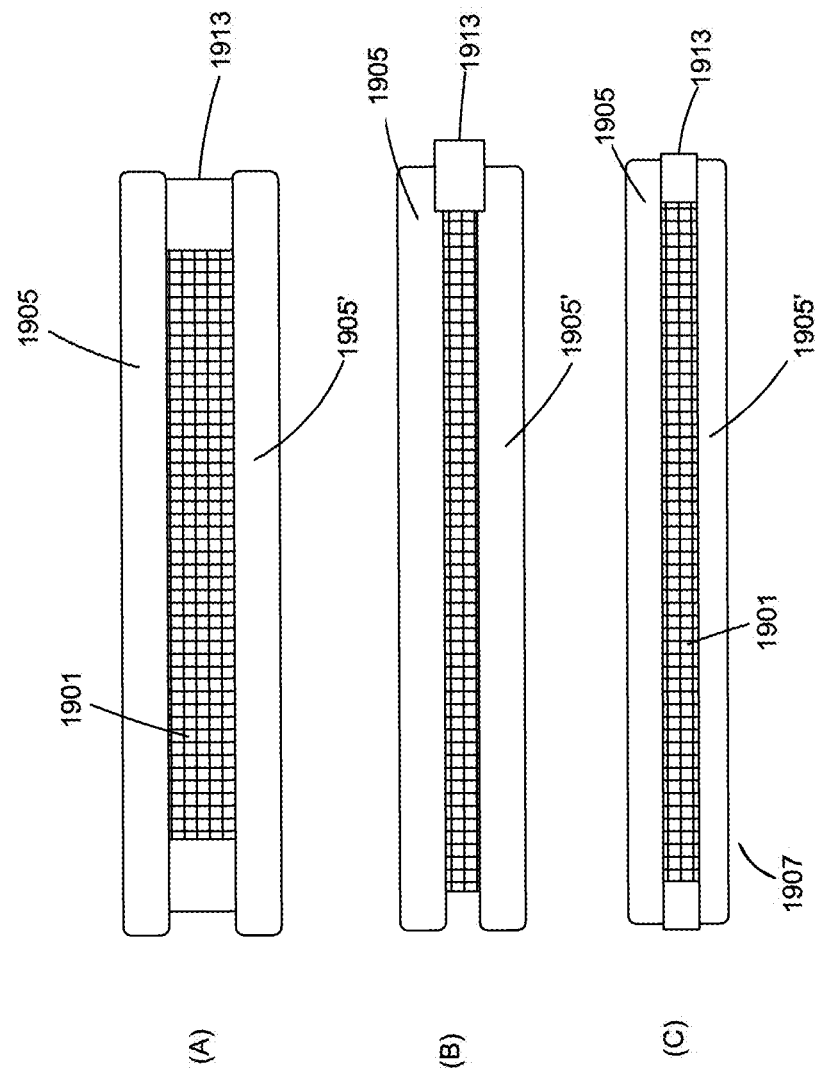
FIG. 19 depicts an embodiment of a schematic of a multilayer PCM Composite Material fabrication.
Figure 20:
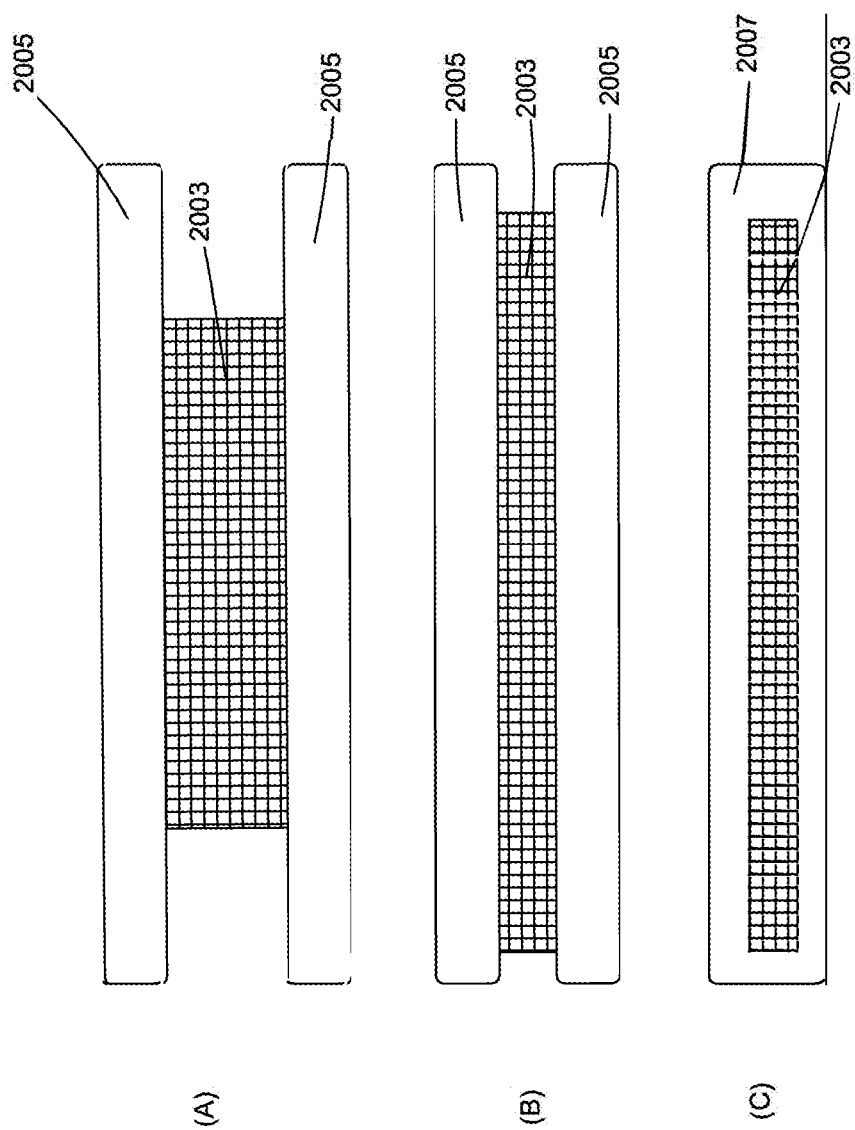
FIG. 20 depicts an embodiment of a schematic of a multilayer PCM Composite Material fabrication.

FIGS. 20A-C show another embodiment of using PCM in a PCM composite structure for a thermal management system. While PCM composite structure 2007 of FIG. 20 is similar to PCM composite structure 1907 of FIG. 19, there are some notable differences. In particular, PCM composite structure 2007 utilizes metal films (e.g., aluminum, copper, or the like) are used as support elements 2005 instead of paper support elements made from graphite and/or carbon. Such films can be heat sealed on edges to inhibit and/or prevent PCM leakage. The films may be vacuum sealed. The metal films may be formed into pouches in some embodiments. Such pouches may be vacuum sealed to reduce the air presence inside the pouch.

When PCM is used in a solid form as described above, it can be compression molded and/or formed using additive manufacturing techniques. For example, 3D printing of wax is known.

In an embodiment, a liquid PCM composition may be used instead of a solid or semi-solid PCM composition to form a PCM composite structure. The liquid PCM or PCM paste can be applied to fill pores of the structural elements (e.g., graphite/carbon paper or cloth) using any of the commonly used coating or spray techniques. Various PCM compositions are described in the following section. For example, PCM may be melted and applied in liquid form by spraying, applied using rod-coating, and/or by other spray techniques known in the art.

A liquid PCM composition may be made up of 10-100% liquid PCM by weight and 0% to 75% graphite and/or carbon powder by weight. In some embodiments, a liquid PCM composition has 40% to 90% liquid PCM by weight and 10% to 60% graphite and/or carbon powder by weight.

In order to coat the support elements using a liquid PCM composition, a slurry should be made of the liquid PCM composition. The slurry of should be applied into the pores of support elements using a suitable coating technique including, but not limited to rod-coating, pressurized spray coating, etc., and/or combinations thereof. In some instances where the viscosity of the PCM composition is high, for example, at high concentration of graphite/carbon powder, adding a small amount of alcohol, such as isopropyl alcohol (IPA), makes it easier to fill the pores of the support element (e.g., graphite paper).

Alternatively, in a liquid PCM composition the graphite and/or carbon powders may be replaced in whole or in part with graphite and/or carbon fibers or expanded graphite fibers of length ranging from 0.001 to 1 mm to enhance the thermal conductivity of the PCM composition at lower concentrations then when compared to graphite powder alone. For example, a liquid PCM composition may include both powder and fibers made from graphite and/or carbon.

After drying of solvent, use of a liquid PCM composition results in a PCM composite structure that includes graphite and/or carbon paper whose pores are filled with PCM blended with graphite/carbon powder. If only liquid PCM is used to fill the pores of the graphite and/or carbon paper then after PCM solidification, it will be necessary to apply a polymer coating of the resulting PCM-paper composite material to inhibit and/or prevent the PCM leakage.

Another PCM composition may be made up of 75-95% powdered EG-PCM composite powder and/or fibers and a solvent, such as IPA, in a range from about 5% to about 25%.

In an embodiment, a liquid PCM composition may be formed from a EG-PCM composite powder and/or fibers blended with an appropriate amount of solvent such as isopropyl alcohol (IPA). For example, the liquid PCM composition may include EG-PCM powder and/or fibers in a range from about 75 to about 95% by weight and a solvent such as IPA in a range from about 5% to 25% by weight. Suitable viscosities of such liquid PCM compositions may be based on the processing requirements of a coating procedure, for example, rod-coating, spray coating techniques, slurry coating, roller coating, etc., and/or combinations thereof and/or the size of pores of the item to be coated (e.g., graphite and/or carbon paper or cloth). After application of the liquid PCM composition and drying of solvent, the PCM composite structure includes a graphite and/or carbon paper whose pores are filled with EG-PCM powder. In some instances, an additional coating may be placed on surfaces to fill any void porosity after drying of the solvent.

Different design strategies may be used to combine PCM composite structures to create a complete thermal management systems that can be used as a stand-alone systems or be integrated with existing thermal management systems in various cooling applications for electronic devices, portable electronics, batteries etc.

Typically, with forced cooling strategies, fans and large cooling surfaces are employed to increase the heat dissipation area and/or heat removal rates. Many cooling strategies are over-designed for peak cooling load when the system or application is running at full power. However, most of the time, the system or application is run at normal power consumption rate which has a lower cooling demand.

By integrating a PCM composite structure with existing cooling strategies, the peak cooling demand can be reduced owing to the high thermal conductivity and high latent heat storage capacity of the PCM composite structure. In addition, the rate of heat removal depends on the usage of the application and also if any external cooling is available such as natural or forced convection cooling.

The PCM composite structure can be designed such that removes all heat generated by a device or system of interest. Alternatively, a PCM composite structure may be designed to remove a portion of the heat generated from the device or system, for example, it may be designed to remove a particular percentage of the generated heat or to keep the system or device below a specific predetermined temperature.

Further, in some embodiments the PCM composite structure may be designed to absorb only the peak heat released when a system is running at peak power. Thus, during normal operation the heat generated in such a system may be removed by existing cooling strategies. In this way, the cooling system need not be over-designed but rather by making use of the PCM composite structure's combined high latent heat and thermal conductivity, the cooling requirements for the cooling system can be reduced, thus reducing the size of the cooling system needed and helping to ensure that the heat-generating device or system remains small and compact.

In this cooling system design, the PCM composite structure described FIGS. 17-20 can be used to dissipate heat from portable electronics such as cell phones, tablets, processor chips in computers, battery cells such as pouch cells, prismatic cells etc. The thickness of the PCM composite structure for use in such portable electronics applications is typically between 0.02 mm to 2 mm. In some instances, the thickness of the PCM composite structure may be in a range from about 0.05 mm to about 1 mm when used for portable electronics. The desired thickness of the PCM composite structure may vary based on the requirements of the application and/or design of the system, device, and/or components.

A PCM composite structure may be in direct contact with the heat source, proximate the heat source and/or positioned such that there is a intervening layer between the PCM composite structure and the heat source. For example, a thermal interface material ("TIM") may be positioned between a heat source and the PCM composite structure.

Figure 21:
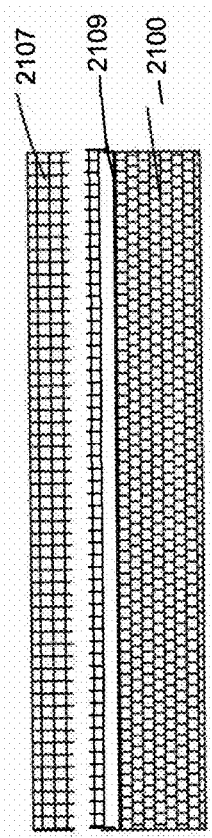
FIG. 21 depicts an embodiment of a multilayer PCM Composite Material attached to a heat source.

As shown in FIG. 21, the PCM composite structure 2107 is positioned proximate a surface of a layer of TIM. Alternatively, any of the PCM structures shown in FIG. 18B, 18C, 18D, 18E, 19C, or 20C could be used in this manner. Further, any combination of the features for the PCM composite structure used in FIGS. 18-21 could be combined and used.

In some instances, a very thin PCM composite structure, for example, a PCM composite structure having a thickness less than about 10 microns (0.001 mm) may be used. Thus, it may be possible to eliminate the TIM when using a PCM composite structure having a thickness less than 10 micros (0.001 mm).

As depicted in FIG. 21 an opposing surface of the TIM is positioned proximate a surface of a heat source. When the heat source produces heat it transfers to the PCM composite structure where the heat is quickly dissipated by the high thermal conductivity of the PCM composite structure. Further, heat is also absorbed by PCM inside the pores of the PCM composite structure. As the PCM starts to absorb the heat, it slowly starts to undergo phase transition, for example, from solid to liquid phase. Thus, the PCM can absorb a large amount of heat released by a heat source in a short period of time, as latent heat until all the PCM has transitioned. Once the PCM undergoes a complete phase transition, the rate of heat removal slows down until all the absorbed heat is released back to the environment.

PCM composite structures as described in FIGS. 17-20 may be used to dissipate heat from battery cells. In particular, battery cells such as prismatic or pouch cells, can be easily integrated in such systems easily. In the example shown in FIG. 22, PCM composite structure (shown as Green layer) is sandwiched in between the individual battery cells and a thermal interface material. The PCM composite structure is shown to be positioned proximate a battery cell on a first surface and a TIM on a second surface. Further, the PCM composite structure may be direct contact with a battery cell or in indirect contact with a battery cell through a thermal interface material (TIM).

The PCM composite structures depicted in FIGS. 17-20 form stronger PCM composite materials than currently known materials and/or structures. In addition, the PCM composite structures described herein have a higher thermal conductivity and a higher latent heat storage capacity than currently known materials. These PCM composite structures can be fabricated such that the structure is thin having a thickness in a range from about 0.01 to about 1 mm.

Figure 22:
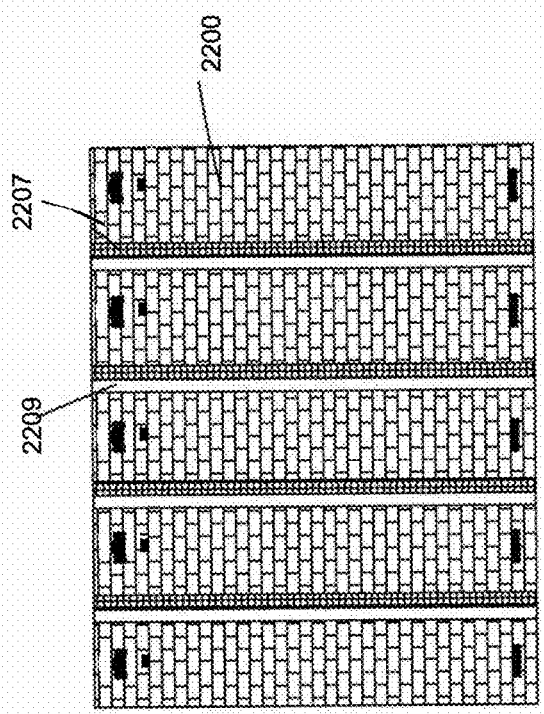
FIG. 22 depicts an embodiment in which a multilayer PCM Composite Material is sandwiched between battery cells and used to dissipate heat in a battery pack.

As shown in FIG. 22, the PCM composite structure (green layer) described in this invention can be sandwiched in between the lithium-ion pouch cells without any fear of material cracks or breakage. The PCM composite structures described in FIGS. 18, 19, 20 may include a rigid graphite and/or carbon paper that gives structural strength and integrity to the PCM composite structure. It has good compressive strength, compressibility, high thermal conductivity to dissipate the heat away from pouch cells and transfer to the PCM material, absorb the mechanical stresses due to constant expansion and contraction of the pouch cells.

Further, in some embodiments the thin PCM composite structures described in FIGS. 18, 19, 20 can be laminated in multiple layers to create a thicker PCM composite structure as needed in battery applications as the heat removal capacity is much greater than in electronic applications.

Currently, finned heat sinks are commonly used in many heat dissipation applications in portable and stationary applications. The finned structures are made of materials such as metals such including but not limited to aluminum, stainless steel, copper etc., having a thickness in a range from about 0.01 to about 2 mm. Typically, these finned elements enhance the heat surface area thereby conducting heat at faster rate and effectively. These finned structures rely solely only on thermal conductivity and surface area for heat dissipation. It is of great interest to incorporate PCM in such heat sinks to increase the heat storage capacity and heat transfer rates. However, limitations of using currently available PCM materials and structures in such applications include lower thermal conductivity, PCM leakage, and lower mechanical strength, especially in a liquid state of PCM, as well as a thickness restriction to thicknesses less than about 1 mm.

The PCM composite structures described herein for example, in FIGS. 18, 19, 20, address any limitations of currently known PCMs and the structures they are used in. In particular, the PCM composite structures described herein allows for the fabrication of thin PCM composite structures having high thermal conductivities, for example, greater than about 10 W/m-K, a minimum thickness of greater than about 10 microns, a heat storage capacity of greater than about 100 kJ/kg-K, and a good mechanical compressive strength. For example, the PCM composite structure may have a compressive strength greater than about 2 MPa.

The application of the PCM composite structure for use in finned heat sink applications is shown in FIG. 23. The traditional current state-of-art finned heat sink material is shown in FIG. 23A. It includes of a metallic finned heat sink 2320 attached to the heat source material 2300 via a layer of thermal interface material (TIM) 2302. Heat is removed from the source only by conduction via the TIM and finned heat sink and then dissipated via convection into the surroundings.

In FIG. 23B, the PCM composite structure 2301 is placed in between the finned heat sink 2320 and the heat source 2300. In this arrangement, the heat is dissipated by heat transfer, particularly, conduction from the heat source to the TIM to the PCM composite structure to the finned heat sink. In addition, to this conduction pathway, a large amount of heat is also stored as latent heat by the PCM material in the PCM composite structure when it undergoes phase transition.

FIG. 23C has similar arrangement to FIG. 23B with the addition of the PCM composite structure 2301 in between the fin structures of the heat sink 2320 thereby increasing the heat removal capacity of the heat sink above that of the heat sink configurations shown in FIGS. 23A-B.

FIG. 23D shows a heat sink material that is completely fabricated using the PCM composite structure 2301 including the fin elements of the heat sink.

The following examples depict different aspects of the invention.

Example 1: Materials for Fabrication of the Novel PCM Composite

Different materials were used to fabricate the novel PCM composite. A novel PCM composite may include at least two or three different materials to serve the key functions of heat storage, heat dissipation and prevent PCM leakage.

The first material of the PCM composite included PCM which is capable of absorbing heat released by a heat source. The PCM was chosen from organic and inorganic materials having a melting temperature in a range from about 20° C. to 100° C. depending on the application.

In some instances, the PCM was used in its unadulterated form, as a microencapsulated PCM (e.g., a fine PCM powder consisting of a polymer coating to prevent PCM leakage) or a macro-encapsulated PCM (e.g., encapsulated with porous materials like graphite powder, expanded graphite flakes, carbon black, carbon nanotubes).

PCMs were also made in the form of pastes or slurries by mixing with high thermal conductivity filler materials in a liquid state. Suitable solvents were used when PCM was in powder form initially, PCM is not in liquid state, or to lower viscosity of PCM mixture. The filler materials that were used included graphene, graphite powder, metal powders, for example, aluminum, copper, graphene, boron nitride, alumina, aluminum oxide, aluminum nitride, magnesium oxide, zinc oxide in composition ranging from about 0.1% about to 50% by weight percentage. In an embodiment, the filler materials may be controlled within a range from about 0.1% to about 30% by weight.

The second material in the composite was added in the form of additives or a continuous porous matrix structure which has high porosity. PCM was placed in the porosity of the second material. Additives included substances like metal/graphite powder, metal/graphite/carbon fibers and were typically added in range from about 0.5% upto 50% by weight percentage depending on thermal conductivity requirement. Porous matrix structures included porous supporting structures made from metal/carbon/graphite foam with open pore network and metal/carbon/graphite porous structures like carbon paper, graphite paper having fine micro-capillary network of pores with porosity ranging from 5% up to 95%. The PCM material filled the pores such that a PCM phase transition can be accomplished with uniform heat distribution across the entire porous matrix. Depending on the type of material used, this matrix material may not possess sufficient mechanical strength to maintain structural integrity when external mechanical load is applied. For example—when expanded graphite structure was used the resulting structure has poor mechanical strength because the expanded graphite fibers are soft and not continuous. When the pores (~40-95%, depending on density) were filled with PCM, the composite structure had sufficient mechanical strength to be handled, when the PCM was in solid phase. But when the PCM was in the liquid phase, the composite structure lost more than 75% of its original strength. Thus, the expanded graphite structure was not rigid enough to maintain structural integrity and broke easily with very little compression load. In particular, the porous structure could be handled without breaking the structure especially when it was very thin (<2 mm). Thus, the porous structure was encased in an external structure or laminated in a polymer film to prevent disintegration and PCM loss.

The third material included in the multilayer composite PCM material was a thin film support structure. The thin film support structure may be porous or non-porous. This support structure was particularly useful when a thin PCM composite material was fabricated, for example a material having a thickness in a range from about 10 micron to about 1 mm. When the second material described above lacked adequate mechanical strength to hold the PCM material or filler, the third material was used.

For example, the second material described above lacked the mechanical strength necessary to maintain rigidity especially when thin (i.e., less than 1 mm). It was found adding another thin support structure, in particular one having good thermal conductivity for heat dissipation application, was beneficial. The support structure materials used included porous graphite/carbon paper and cloth similar to the gas diffusion layer commonly used in fuel cell electrodes. Such graphite paper maintains the structural rigidity and strength in the PCM composite especially when the PCM undergoes phase transition from solid to liquid phase. Apart from graphite/carbon paper, metallic structure can also be used, for example copper or aluminum sheets which may be porous or non-porous. For example, when non-porous graphite structure are used, then dense graphite sheets may be used.

The fourth material, a high thermal conductivity material, that was considered optional in the novel composite PCM material, is a thin film support structure that has very high thermal conductivity when compared to the first, second and third materials that may have lower thermal conductivity. Depending on the use, this fourth material may be porous or non-porous; flexible or rigid structure to add flexibility or additional structural strength. Some examples of the 4th material are very thin graphite, copper, aluminum or any high thermal conductivity material (2 micron up to 500 micron) and thermal conductivity of in a range from about 100 W/mK to about 1500 W/mK (pyrolytic graphite sheet). Thin graphite/copper/aluminum adhesive films can also be used such that inner layer consists of graphite/copper/aluminum and outer layer consists of adhesive film with release layer that can be glued to the heat surface.

The fifth material that may or may not be included in the novel multilayer PCM composite material is a porous fire retardant foam material that may or may not include water in its pores. This porous fire-retardant foam material can be melamine foam or carbon foam or graphite foam or metal foam with porosity ranging from 10% to 95%, most preferred range being 50% to 95%. This fifth material helps to prevent fire or prevents fire propagation in the event of thermal runaway in batteries. This material may or may not be included in portable electronic devices because the risk of thermal runaway is less compared to large battery packs.

The sixth material that may or may not be included is a outer encapsulation layer as an extra protection layer to prevent PCM from leaking outside. This outer layer can be a polymer adhesive coating, adhesive film with release film or graphite/carbon coating or metal film coating. Alternatively, this outer layer can also be formed by expanded graphite flakes and compressing to form a dense film all around. This expanded graphite layer serves two purpose—physical barrier for leakage and porosity to store the excess PCM or leaked PCM. This outer layer can be formed covering the 3rd material described above or covering the 4th material described above.

The table below is a brief summary of the different materials that were or may be used to make the novel PCM Composite Thermal Management material. These materials can be configured in various configurations to achieved desired thicknesses in the final Multilayer PCM Composite material. In some instances, the materials may be stacked multiple times to achieve a thicker PCM Composite material for use in applications that have more heat dissipation.

TABLE 1

List of Materials used to Fabricate Multilayer PCM Composite Material

| Material # | Material Type | Examples | Role of Material in Multilayer PCM Composite Material |
|---|---|---|---|
| 1 | Phase Change Material (PCM) | Organic Paraffin based wax, Organic bio-based PCMs, salt hydrates etc. The choice of PCM depends on desired operating temperature. | Store large amount of transient or peak heat released by the heat source Latent Heat Range = 50 J/g up to 2000 J/g Wt % PCM = 30%-100% |
| 2 | PCM Encapsulation Material or Filler Material | Acrylic polymer resins, $SiO_2$, Titanium dioxide, Zinc Oxide etc to microencapsulate PCM. Porous material like compressed expanded graphite, carbon black etc holds PCM via capillary force in its micropores | Store the PCM material in its micro pores or within coating layer Prevent or slow down PCM leakage Conduct the heat to the PCM PCM Wt % = 10-99% (Preferred 50-99%) Filler Wt % = 1-50% (Preferred: 1-30%) Polymer resin wt % = 1-30% (Preferred: 1-20%) |
| 3 | Porous Structural Support Material | Carbon/Graphite foam/ Compressed Expanded Graphite flakes/Porous metals like copper, aluminum foam etc | Provide structural support when PCM is in liquid state Provide high thermal conductivity >10 W/mK upto 150 W/mK Thickness = 0.02 – 2mm Distribute heat uniformly |

TABLE 1-continued

List of Materials used to Fabricate Multilayer PCM Composite Material

| Material # | Material Type | Examples | Role of Material in Multilayer PCM Composite Material |
|---|---|---|---|
| | | | to the PCM stored in its micro-pores for uniform melting and solidification of PCM |
| 4 | Non-porous film, sheet | High density Pyrolytic graphite sheet/Highly compressed expanded graphite sheet/Metal coating film | Provide additional high thermal conductivity >100 W/mK upto 2000 W/mK to spread the heat faster and conduct heat to the inner PCM material. Thickness = 0.02 – 2 mm May also provide additional flexibility and structural support |
| 5 | Fire-Retardant Foam with or without water | Melamine foam, Carbon, Graphite Foam, Metal foam, Sintered porous metal, porous metal alloy | Mitigates the fire during thermal runaway Prevents fire propagation during Thermal Runaway Holds water inside the pores that vaporizes during thermal runaway absorbing large amount of heat Porosity = 20%-90% Water wt % = 10-90% (Preferred: 50-90%) |
| 6 | Coating or Sealant | Polymer adhesive coating material like acrylic, silicone based compounds. Coating can be applied by roller coating, dip coating, immersion coating, spray coating or any other coating method known in literature. Alternatively, a pressure sensitive adhesive tape can be used that a release film can be used as a sealant. | Prevents leakage of PCM material. Provide Dielectric insulation property to prevent electric short circuit inside electronic circuit board or electrical connections. Ease of handling and application to the heat source. |

Example 2. Fabrication Strategies of the Multilayer PCM Composite Material

There are few ways to fabricate the thin PCM composite material as described in the following section. The main objective is to create thin PCM composite material that has high thermal conductivity for heat dissipation applications.

The following two steps have been used to manufacture a PCM composite structure using expanded graphite. In particular, a thermally conductive porous structure was constructed from expanded graphite and filled with PCM.

Preparation of Thermally Conductive Porous Structure Using Expanded Graphite

Andrew Mills et al (Mills) describe in great detail the manufacture of PCM composite material using expanded graphite fibers. ("Thermal conductivity enhancement of phase change materials using a graphite matrix" Applied Thermal Engineering, Volume 26, Issues 14-15, October 2006, Pages 1652-1661). Expanded graphite fibers were used as a starting raw material and compressed to a known density to achieve a required thermal conductivity (e.g., higher the density, higher the thermal conductivity). Compression to initial graphite density in a range from about 50 to 350 g/L resulted in a porous structure having the desired thermal conductivity and porosity. For example, at an initial graphite density of 200 g/L, the porosity is typically around 78-80% with a thermal conductivity in range from about 15 to 25 W/m-K in the in-plane direction of compressed graphite fibers.

Filling Pores of Expanded Graphite Porous Structure with PCM

After the expanded graphite matrix is formed, the pores were filled with a PCM material. The PCM may be organic or inorganic. The PCM was selected to have a melting temperature in a range needed for the desired heat dissipation for a given application. For example, the melting temperature may be in a range from about 25° C. to 60° C. for heat removal applications in electronic devices, such as batteries. The filling of pores occurred under ambient pressure and in a liquid bath of the molten PCM. Generally, the PCM filled the pores of expanded graphite under capillary action, however, vacuum pressure may be used to fill the pores at faster rate. Once all the pores were filled, the resulting PCM composite material possessed a high thermal conductivity resulting from the graphite matrix and high heat storage capacity due to the PCM.

In the following sections, different fabrication concepts are described using the Expanded Graphite-PCM (EG-PCM) composite material as one of the key starting materials.

Figure 25:
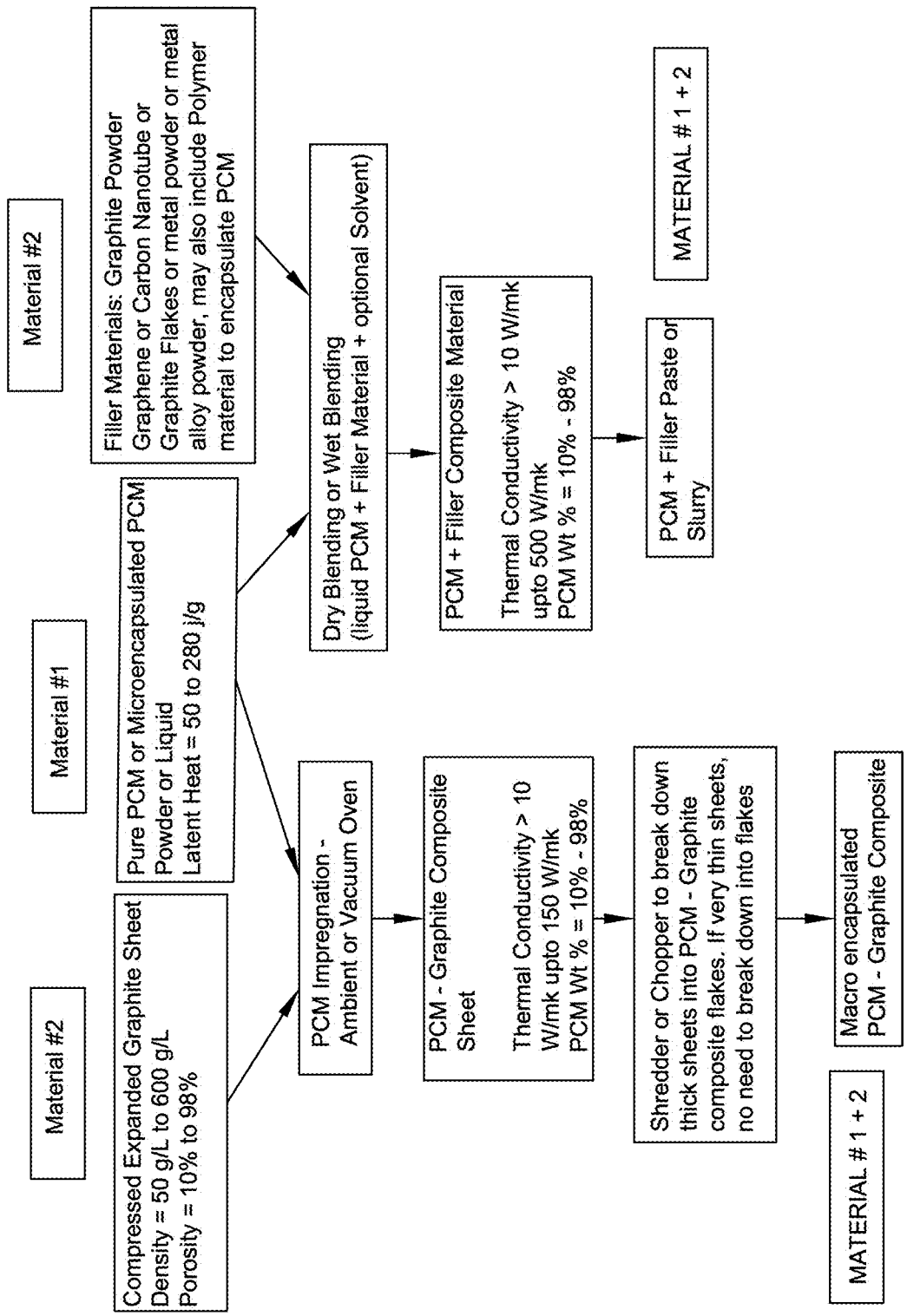
FIG. 25 depicts a flow chart showing the steps to fabricate PCM-Composite Material or PCM-Composite Paste/Slurry for use in the fabrication of a Multilayer PCM Composite Structure.

FIG. 25 outlines the various methods used to produce PCM composite materials from expanded graphite sheets, pure PCM, encapsulated PCM and/or filler materials such as graphite powder, graphene, carbon nanotubes, graphite flakes, metal powder, and/or metal allow powder. For example, the methods used to form EG-PCM composite material such as a macro-encapsulated PCM-graphite composite and/or a PMC in combination with a filler paste or slurry are shown in FIG. 25.

Figure 26:
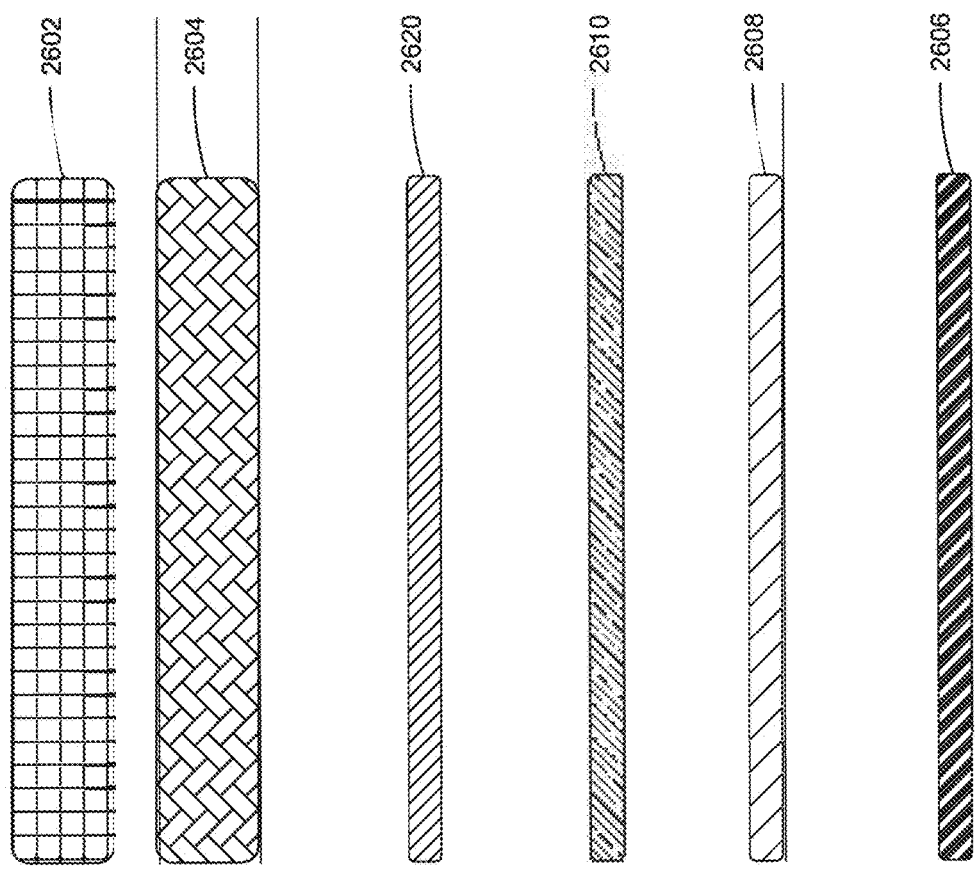
FIG. 26 depicts the materials used in the various fabrication methods described herein.

For the purposes of discussion, FIG. 26 illustrates various materials used in the various fabrication methods described herein including: PCM 2602 (i.e., PCM and/or PCM encapsulation material), porous structure 2604, thermal interface material ("TIM") 2606, coating 2608, fire retardant material 2610 and high thermal conductivity material 2620.

Example 3—Fabrication Method #1

Figure 27A:
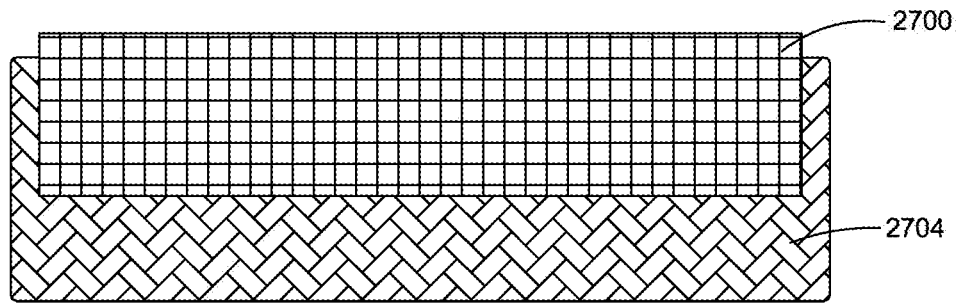
FIGS. 27a-27c depict various embodiments of a multilayer PCM Composite Material.
Figure 27B:
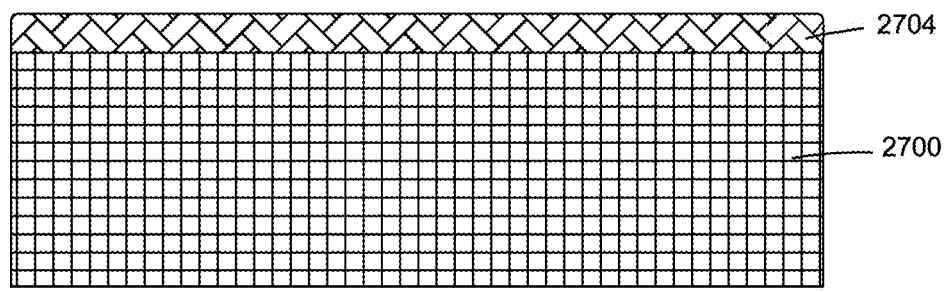

In the first invention concept, the EG-PCM composite material 2700 was cut into thin sheets with thickness of less than 2 mm. The thin sheet of EG-PCM composite material 2700 was compressed into the pores of support element 2704, for example, a thin graphite/carbon paper and/or graphite/carbon cloth (i.e., paper or cloth commonly used in fuel cell applications as gas diffusion layer) under external compression load and heat as required to form composite material 2715. This operation was done in a compression mold. Alternatively, a single roller or double roller may be used for the compression. A series of rollers may also be used similar to a paper making process to achieve the desired final thickness by varying the compaction or roller force on the composite material. The EG-PCM material was pre-heated to a softening point prior to compression. The EG-PCM may be heated prior to and/or during compression. Softened material may easily be pressed into the pores of the graphite/carbon paper. For example, FIGS. 27a and 27b depict an example of this. Alternatively, the EG-PCM composite material may be shredded into fiber or powder form and them compressed into the pores of the Graphite/Carbon paper as described above.

Figure 27C:
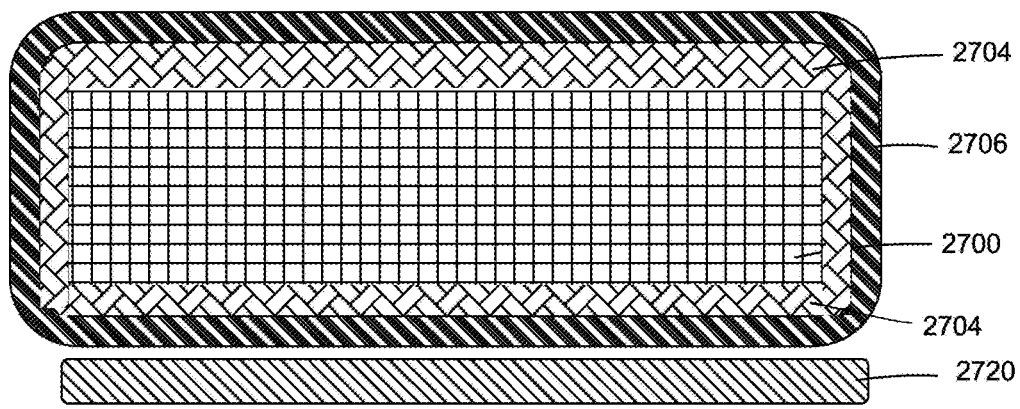

After formation of the novel EG-PCM composite with graphite paper supporting structure, it was used in a heat sink application. As shown in FIG. 27c, the EG-PCM composite material 2700 was coated with a thin layer of polymer coating 2706 to prevent any PCM leakage. Further, some embodiments may require a dielectric coating, if necessary, for example in a battery application where it is necessary to prevent electrical shorting between the adjacent battery cells. In particular, a dielectric coating may be necessary if the composite material is used in between battery cells. Alternatively, a pressure sensitive adhesive film may be glued to the EG-PCM composite material on top and bottom sides to prevent leakage. A commercially available Thermal Interface Material (TIM) such as Thermal Paste or Thermal Gel can also be applied on the inner side of the PCM Composite material which will be exposed to the heat source (such as a CPU board, a GPU board inside a portable electronic device or a battery cell) as shown in FIG. 26c.

In some embodiments, a high thermal conductivity may be necessary to spread the heat faster in the radial direction away from the heat source (such as a CPU board, a GPU board inside a portable electronic device or a battery cell). For example, a material with a high thermal conductivity may be used to transfer heat to a cooler location and/or to a heat sink where the heat can be dissipated. In such a case, a material with very high radial or in-plane thermal conductivity can be disposed on the inner side of the PCM Composite material (FIG. 27a). As shown in FIG. 27a, a high thermal conductivity material 2720 may include a thin graphite sheet, pyrolytic graphite, copper, aluminum and/or other materials. High thermal conductivity material 2720 was constructed by pressing PCM 2702 and porous structure 2704 in a compression press or single or double roller press under high pressure >50 psi. Alternatively, after preparing PCM Composite 2722 including PCM 2702 infused in porous structure 2704 as well as porous structure 2704 as shown in FIG. 27b. Further, a PCM composite 2822 can be sandwiched in between 2 layers of high thermal conductivity material 2820 on the top and bottom as shown in FIG. 28c.

Figure 28A:
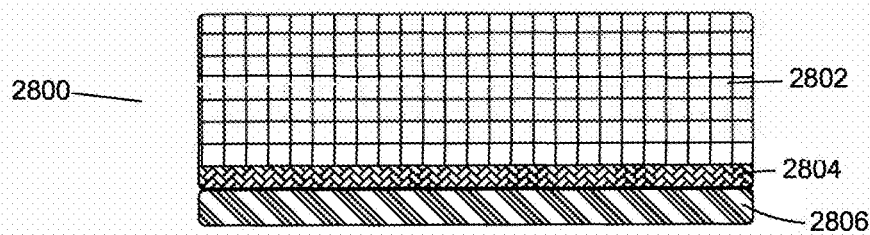
FIGS. 28a-28d depict various embodiments of a multilayer PCM Composite Material.
Figure 28B:
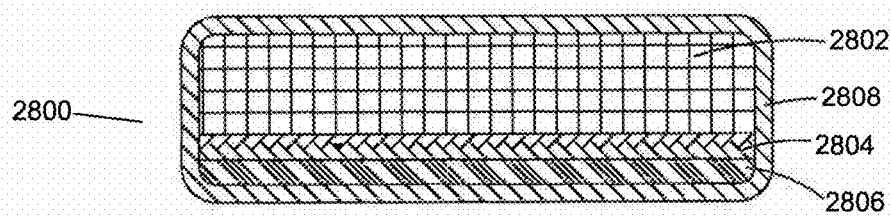
Figure 28C:
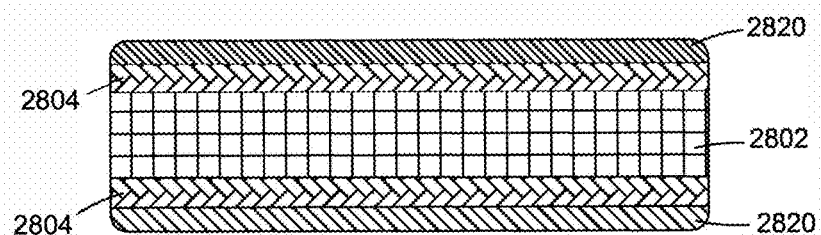
Figure 28D:
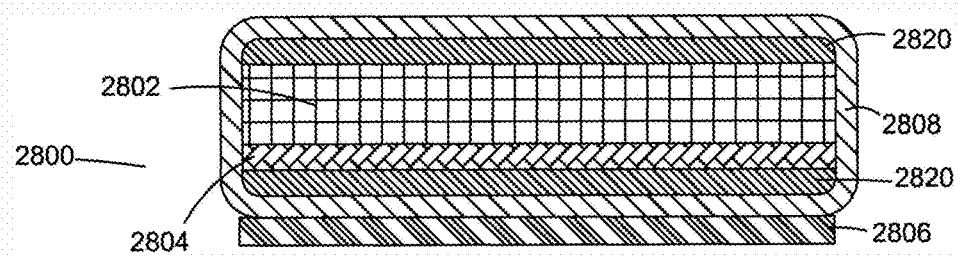

Additionally, a coating layer 2808 may include an acrylic based adhesive or any other adhesive known in art applied such that it surrounds PCM Composite 2800 shown in FIG. 28b and FIG. 28d. The coating was applied using well known coating techniques such as dip coating, roller coating, immersion coating, knife-blade coating or spray coating. Alternatively, a pressure sensitive adhesive tape (3M™ Adhesive Transfer Tape 467MP or 3M™ Adhesive Transfer Tape 9471LE) may be glued to the PCM Composite material 2800 instead of applying a coating. The adhesive transfer tape may be double sided such that one side is glued to the PCM Composite material and the other adhesive surface may be glued to a heat source surface source (e.g., a CPU board, a GPU board inside a portable electronic device or a battery cell).

FIGS. 29a and 29b depict PCM composite materials 2900 which are encapsulated by coatings 2908 and include PCM 2902, porous structure 2904, fire retardant material 2910, and high thermal conductivity material 2920.

Example 4—Fabrication Method #2

Figure 30A:
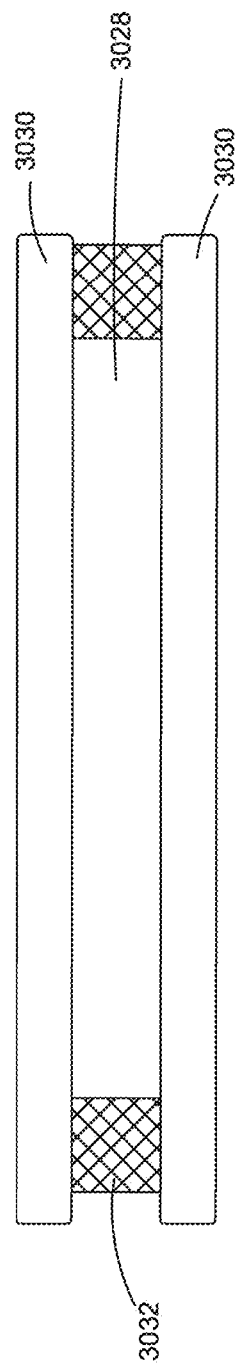
FIGS. 30a-30b depict a schematic of novel PCM Composite Material fabrication according to Method 2.

In this method to fabricate a high thermal conductivity PCM composite material, lamination techniques were used to sandwich the EG-PCM composite material 3028 described earlier in between two thin sheets of Graphite/Carbon paper or cloth 3030 as shown in FIG. 30a. The high thermal conductivity encapsulated PCM or EG-PCM composite material was used at thicknesses of less than about 2 mm. While the porous materials such as the paper or cloth 3030 may be used in thicknesses in a range from about 0.05 to about 1 mm.

Figure 30B:
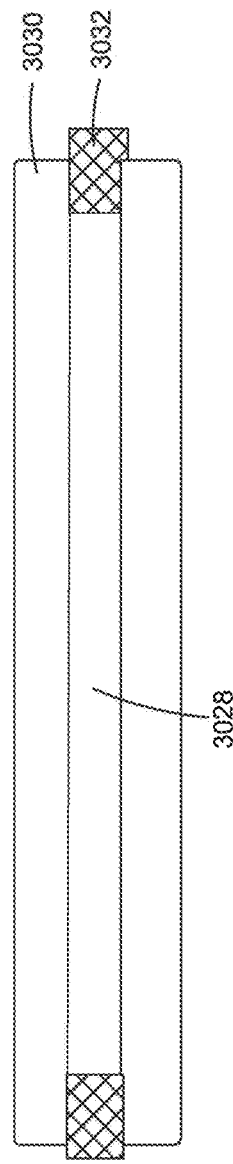

The lamination was performed in a compression mold. Alternatively, roller cylinders may be used. In some instances heat may be used during compression to facilitate compaction of the soft composite material in between two Graphite/Carbon sheets. The EG-Composite material penetrated into the pores of the Graphite/Carbon paper thereby creating a good bond. In order to prevent the extrusion of the PCM material along the edges, a thin gasket layer 3032 (e.g., polyethylene, polypropylene, or Teflon) was used to form a tight sealing around the edges. FIGS. 30a-30b show the schematic design of fabricating the novel PCM composite by laminating the EG-PCM composite material in between the Graphite/Carbon paper 3030.

FIGS. 31a and 31b depict embodiments of coated multilayer PCM composite materials 3100. For example, FIG. 31a depicts porous material 3130, PCM 3128 and gasket 3132. As shown in FIG. 31b, the coated multilayer PCM composite material 3100 includes a first multilayer PCM composite material layer 3150 and a second multilayer PCM composite material layer 3160 surrounded by coating 3140. The first multilayer PCM composite material layer 3150 included flame retardant material 3110, porous material 3130, PCM 3128, and gasket 3132. In the second multilayer PCM composite material layer 3160, porous material 3130, PCM 3128, and gasket 3132 were present.

FIGS. 32a and 32b depict embodiments of multilayer PCM composite materials 3200, 3200'. As shown in FIG. 32a, multilayer PCM composite material 3200 included porous material 3230, PCM 3228, and gasket 3232. As shown in FIG. 32b, multilayer PCM composite material 3201 included porous material 3230, PCM 3228, gasket 3232, high thermal conductivity material 3220 and coating 3206.

In some instances, after compaction or lamination, end sheets of thin metal are sealed to form a laminated composite material consisting of PCM composite sandwiched in between thin metal sheets.

Example 5—Fabrication Method #3

Figure 33A:
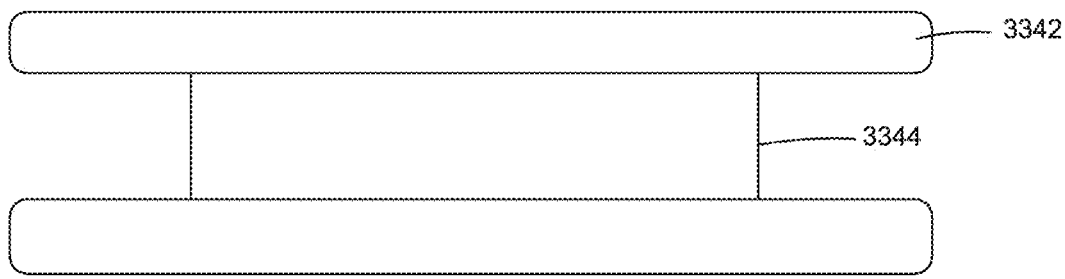
FIGS. 33a-33c depict a schematic of novel PCM Composite Material fabrication according to Method 3.
Figure 33B:
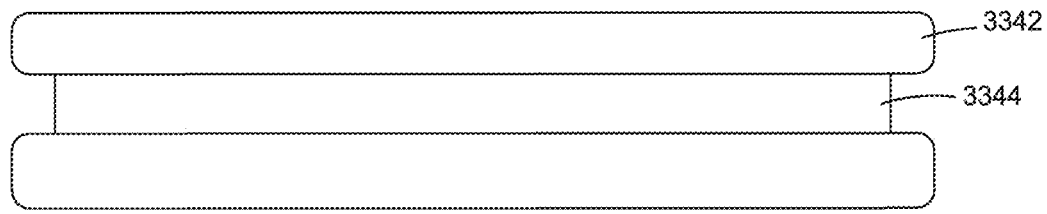
Figure 33C:
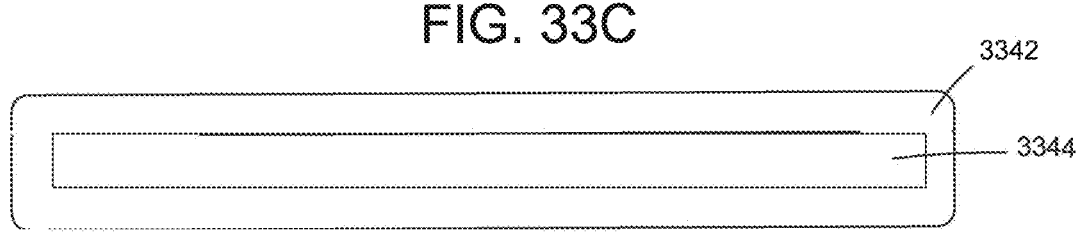

FIGS. 33a-33c depict a schematic of a PCM composite material fabrication. This method for fabrication is similar to Fabrication Method #2 except that thin metal pouch films 3342, for example, aluminum or copper, are used instead of Graphite/Carbon paper as laminating mediums. PCM and/or PCC Composite 3344 may be compacted and/or laminated in between thin sheets of metal like aluminum or copper under external pressure with or without heat as shown in FIGS. 33a-33b. The pouch films 3342 can be heat sealed on edges to prevent PCM leakage as shown in FIG. 33c. Pouch films 3342 may be used encapsulate PCM 3344 (e.g., high thermal conductivity encapsulated PCM and/or PCC composite) as shown in FIG. 33c. The pouch films can also be vacuum sealed. The pouch film can also be vacuum sealed to reduce the air presence inside the pouch.

Example 6—Fabrication Method #4

In this method, the novel high thermal conductivity PCM composite is fabricated using a liquid PCM composition instead of solid or semi-solid PCM composition as described in fabrication methods 1-3. The liquid PCM or PCM paste can be applied to fill the pores of graphite/carbon paper or cloth using any of the commonly used coating or spray techniques. Various PCM compositions are described in the following section.

Composition #4.1
  Liquid PCM=10-100% (most preferred is 40% to 90%)
  Graphite or Carbon Powder=0% to 75% (most preferred is 10% to 60%)
  Coating procedure—A slurry of the above composition was made and applied into the pores of the Graphite/Carbon paper or cloth using a suitable coating technique such a rod-coating, pressurized spray coating etc. If the viscosity of the PCM composition was very viscous at high concentration of graphite/carbon powder, then a small amount of alcohol, such as isopropyl alcohol (IPA), was added to make it easier to fill the pores of the graphite paper.

Alternatively, the graphite/carbon powder may be replaced with graphite/carbon fibers or expanded graphite fibers having a length in a range from about 0.001 to 1 mm to enhance the thermal conductivity of the PCM composition at lower concentrations than needed when using graphite powder. After drying of solvent, the final PCM composite consists of Graphite/Carbon paper whose pores are filled with PCM blended with graphite/carbon powder. If only liquid PCM was used to fill the pores of the Graphite/carbon paper then after PCM solidification, it will be necessary to apply a polymer coating to the resulting PCM-Graphite paper composite material to prevent the PCM leakage.

Composition #4.2
  Powdered EG-PCM composite powder/fibers=75-95%
  Solvent such as IPA=5-25%
  Blended the EG-PCM composite powder or fibers with an appropriate amount of solvent such a isopropyl alcohol (IPA) to achieve a suitable viscosity suitable for rod-coating or spray coating techniques into the pores of Graphite/Carbon paper or cloth. After drying of solvent, the final PCM composite included a Graphite/Carbon paper whose pores were filled with EG-PCM powder. Additional coating may be performed to fill the void porosity after drying of the solvent.

Examples of Application of the PCM Composite Material and Novel Design Strategies This invention allows for different design strategies to combine the individual PCM composite materials described herein to create a complete thermal management system that can be used as a stand-alone or integrated with existing thermal management systems in various cooling applications such as electronic devices, portable electronics, batteries etc. Typically, with forced cooling strategies, fans and large cooling surfaces are employed to increase the heat dissipation area, heat removal rate. Also, many cooling strategies are over-designed for peak cooling load when the system or application is running at full power. Whereas most of the time, the system or application is run at normal power consumption rate which has less cooling demand. By integrating the high thermal conductive PCM composite material, the peak cooling demand can be reduced owing to the high thermal conductivity and high latent heat storage capacity. The rate of heat removal depends on the usage of the application and also if any external cooling is available such as natural or forced convection cooling. The PCM composite material may be designed in such a way that it can remove the entire heat generated or at least some of the heat generated. In some instances, the PCM composite may be designed so that it absorbs only the peak heat released when the system is running at peak power and during normal operation the heat can be removed by existing cooling strategies. In this way, the cooling system need not be over-designed. By making use of the PCM composite material's combined high latent heat and thermal conductivity, the cooling requirements may be reduced making the system size small and compact.

Example 7—Portable Electronics

In this system design, the PCM composite material or a multilayer PCM composite material (i.e., that includes multiple layers of different materials, e.g., support structure, coating layer) described herein. These PCM composite materials were used to develop configurations capable of dissipating heat from portable electronics such as cell phones, tablets, processor chips in computers etc. The multilayer PCM composite material 3446 was used as a heat spreader when coupled to a heat source such as a CPU 3448 located on a printed circuit board (PCB) 3450 as shown in FIG. 34. As shown in FIG. 34, multilayer PCM composite material 3446 included a thermal interface material 3452 on its surface. In some instances, a standard TIM, such as thermal paste or thermal gel was used such that PCM composite material 3446 made direct contact with CPU 3448 to reduce the thermal resistance.

The thickness of the multilayer PCM composite material for such portable electronics application may be in a range from about 0.1 to about 1 mm. Using this configuration, when the heat source produces heat it was conducted into the PCM composite material where the heat was quickly dissipated by the high thermal conductivity PCM composite material. The heat was absorbed by the PCM inside the pores of the PCM composite material. As the PCM starts to absorb the heat, it slowly starts to undergo a phase transition for example a change from solid to liquid. Due to the phase change of the PCM composite material, the PCM composite material is capable of absorbing a large amount of the heat released by the heat sources in a short period as latent heat until all the PCM has melted completely. Once the PCM undergoes a phase transition, the rate of heat removal slows down until all the absorbed heat is released back to the environment. The multilayer PCM composite reduces the temperature rise in a CPU because of its ability to conduct heat quickly due to its high thermal conductivity as well as the multilayer PCM composite's ability to store heat temporarily in the phase change material when running power intensive applications in the device.

Example 8—Battery Systems Thermal Management

Figure 35A:
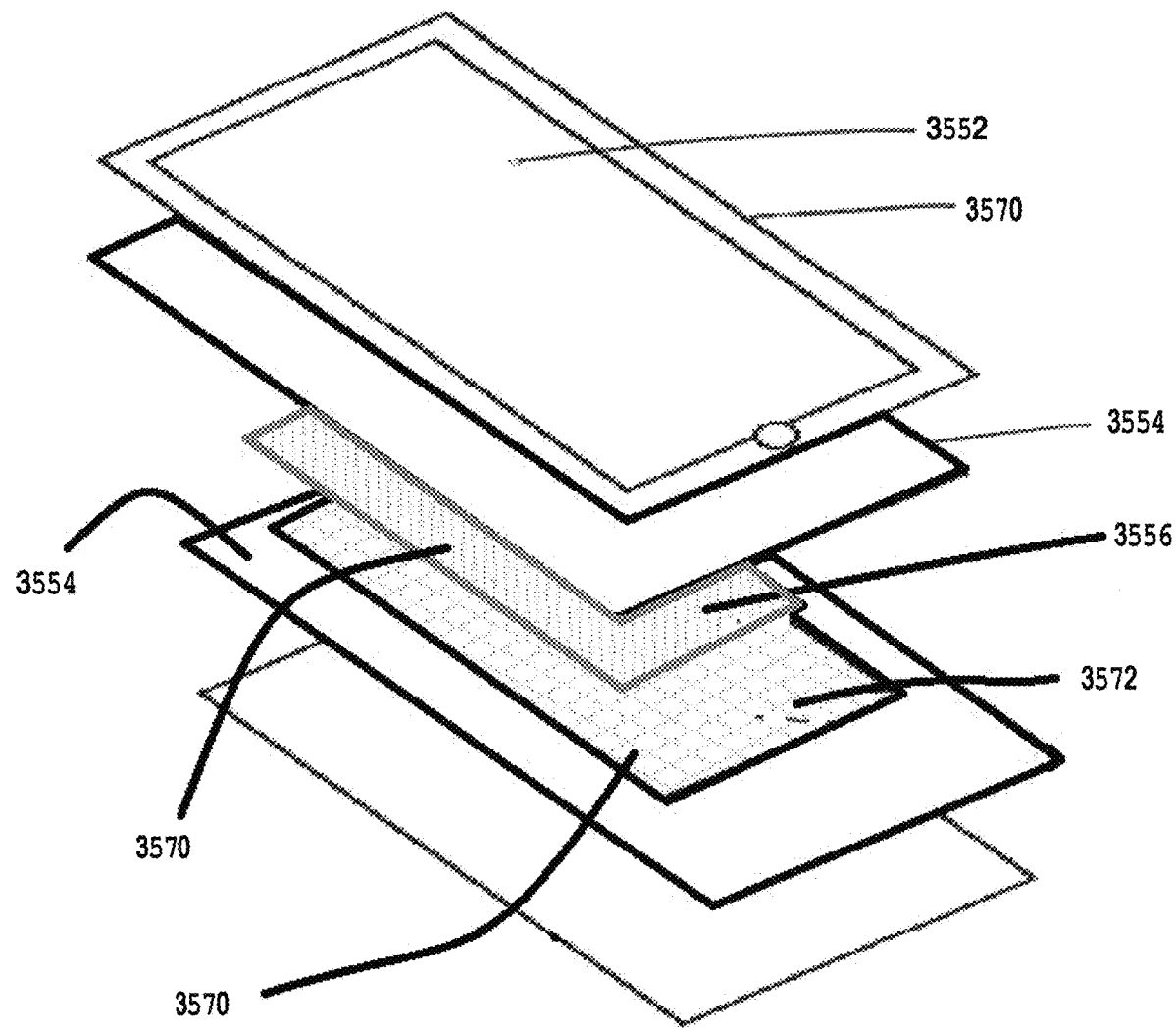
FIG. 35a depicts a schematic expanded view of a cell phone showing various key components and heat spreaders.
Figure 35B:
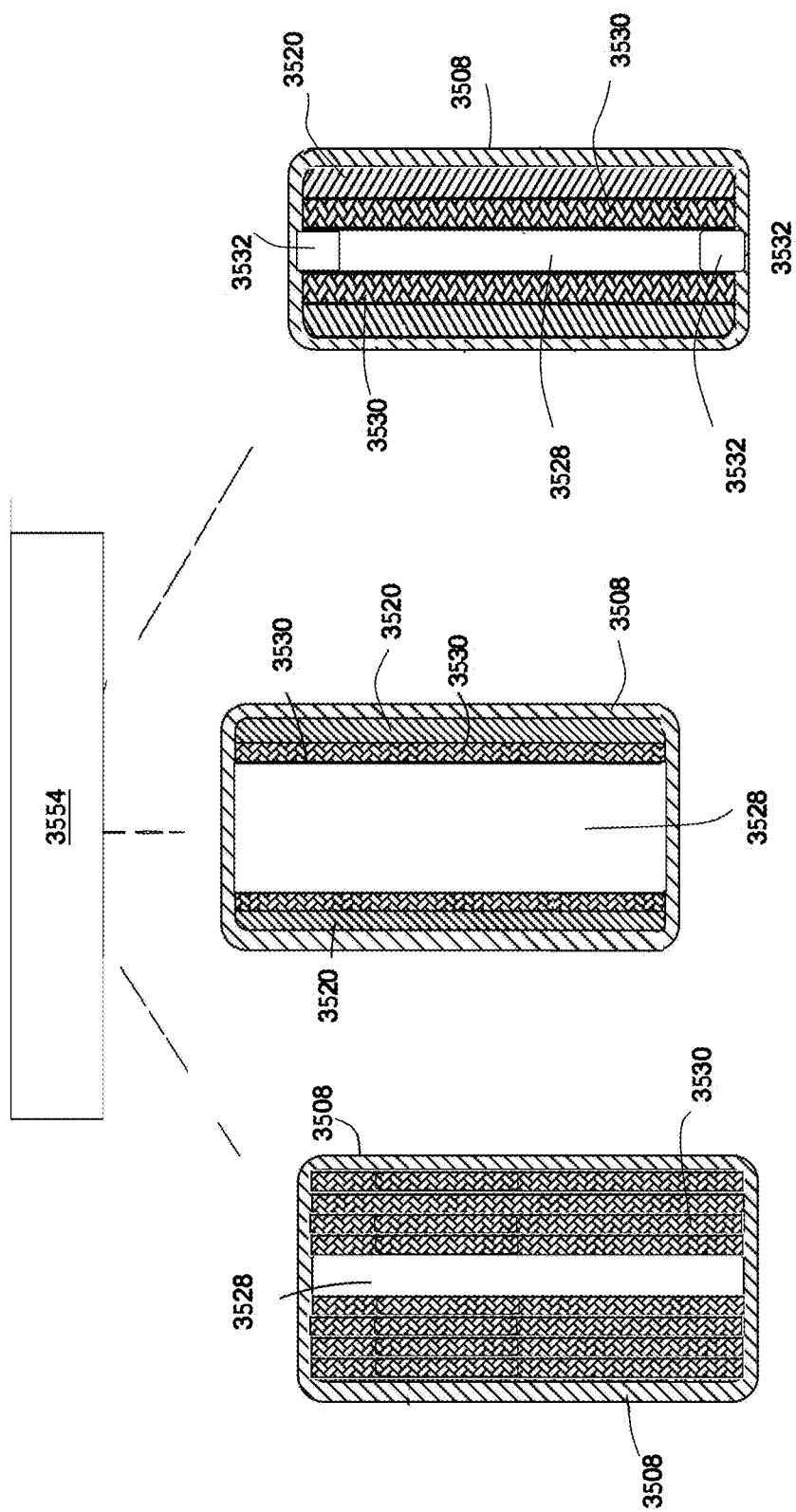
FIG. 35b depicts three cross-sectional views of different multilayer PCM composite materials for a cell phone showing alternative configurations of the various layers.

In this system design, the PCM composite described herein under Examples 1-6 are used to dissipate the heat from heat sources such as battery cells, especially from prismatic or pouch cells as the PCM composite can be easily integrated in these formats easily. In an example, shown in FIG. 35*a*, the PCM composite material 3554 is sandwiched between heat sources 3570. For example, PCM composite materials 3554 are positioned proximate heat sources such as an LCD touch screen 3552, a cell phone battery 3556, or a PCB 3572 (i.e., that includes heat sources such as various electronic components like CPU, GPU, transistors). In this instance, the multilayer PCM composite material 3554 included materials that allow it to act as a heat spreader and a thermal interface material. The multilayer PCM composite may be in direct contact or indirect contact with the heat sources through an thermal interface material. FIG. 35b depicts multiple embodiments of the multilayer PCM composite material 3554 that included porous material 3530, PCM 3528, gasket 3532, high thermal conductivity material 3520 and coating 3508.

Typically, the pouch cells such as Lithium-ion cells that are commonly used in portable electronics, electrical vehicle battery systems tend to expand and contract during the battery charge/discharge cycles owing to the electrochemical reactions inside the pouch cell. This exerts lot of mechanical stress on the cells and to mitigate this problem, compressible pad such as polyurethane material are sandwiched between the cells to absorb the mechanical stress.

Currently, forced liquid cooling or air cooling systems are used in thermal management of pouch cell battery systems. A thin aluminum plate with cooling channels are used in such systems. Another approach is to use a PCM based composite material instead of the cooling plate to design a passive thermal management system. The PCM material would absorb the heat and dissipate the heat away from the battery cells. The problem with such PCM composite materials is that they have a tendency to crack or break due to the mechanical stress exerted by the pouch cells. To overcome this issue, a polymer material is incorporated in the PCM composite material to make the material more resilient to the mechanical stresses (US Patent #US20160319174A1). Adding polymer lowers the latent heat capacity of the PCM composite and also lowers the thermal conductivity by 10 times but enables the PCM material to be flexible and thinner.

The multilayer PCM composite material described in this invention under Examples 1-6 address the limitations of the PCM composite described in US Patent #US20160319174A1 by creating a stronger PCM composite material with high thermal conductivity and high latent heat storage capacity and also can be fabricated thin with thickness ranging from 0.01 to 1 mm.

Figure 37A:
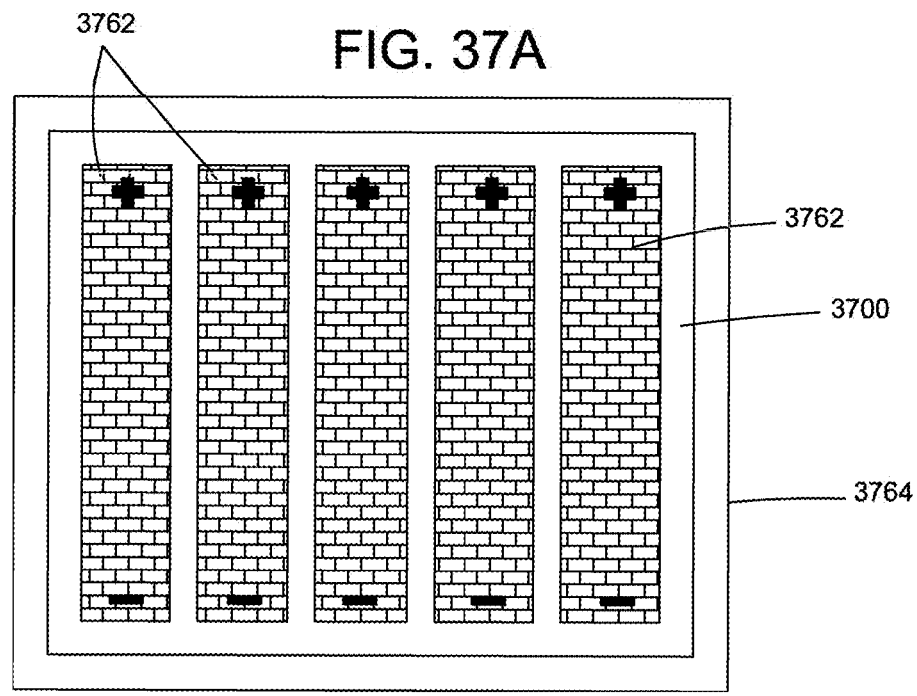
FIG. 37a depict use of multilayer PCM Composite material in a thermal management system for a battery system.

FIG. 37a depicts a top view of a battery pack assembly showing a multiple cell arrangement. Multilayer PCM composite material 3700 surrounded battery cells 3762 and in turn were surrounded by battery case 3764.

Multilayer PCM-Graphite composite materials may be used as a heat spreader, TIM, or both. The multilayer PCM-Graphite composite material was arranged within battery case 3764 such that the multilayer PCM composite material can remove heat under normal operating conditions and/or under thermal runaway conditions, for example, when fire retardant material is incorporated. In this example shown in FIG. 37a, Lithium-ion Battery pouch cells 3762 are shown for illustration purpose but cylindrical cells may also be used. The thickness of the multilayer PCM composite material may be in a range from about 0.1 mm to about 10 mm depending on the battery heat removal requirement and battery capacity. The multilayer PCM composite material can be made thicker if desired. Components that make up the stack or multiple repeating stacks may determine the thickness of the multilayer PCM composite material required to remove the desired amount of heat.

Figure 37B:
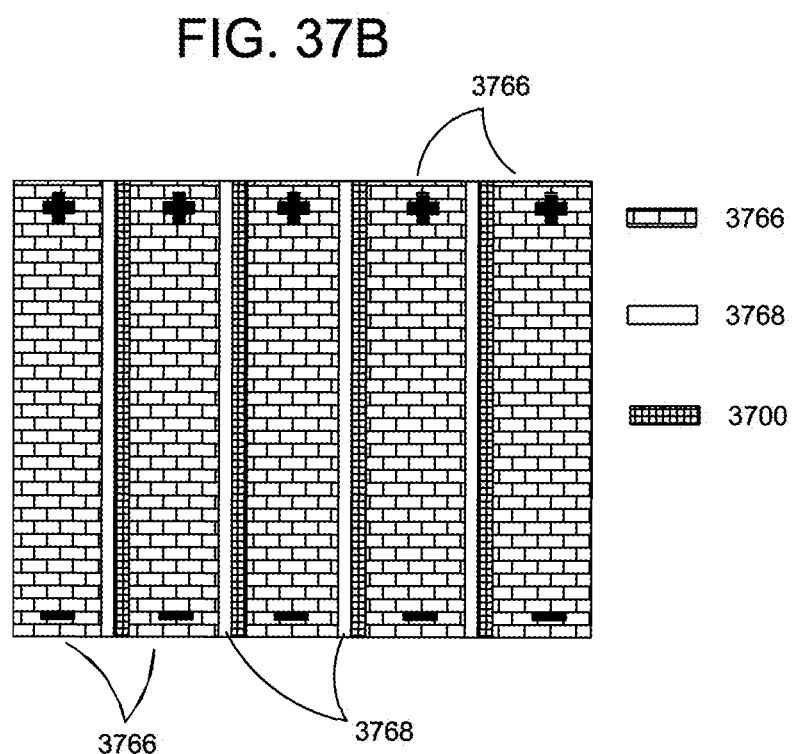
FIG. 37b depict use of multilayer PCM Composite material in a thermal management system for a battery system.

As shown in FIG. 37b, a multilayer PCM composite material 3700 was sandwiched in between heat sources 3766 (e.g., lithium-ion pouch cells or wrapped around Lithium-ion cylindrical cells) without any fear of material cracks or breakage. Thermal interface material 3768 was positioned proximate heat source 3766 and PCM composite material 3700. The PCM composite material 3700 included a rigid graphite/carbon paper that gives structural strength and integrity to the composite material. It had good compressive strength, compressibility, high thermal conductivity to dissipate the heat away from pouch cells and transfer to the PCM material, absorb the mechanical stresses due to constant expansion and contraction of the pouch cells.

Example 9—Finned Heat Sinks

Currently, finned heat sinks are commonly used in many heat dissipation applications in portable and stationary applications. The finned structures are made with mostly metals such as aluminum, stainless steel, copper, etc., with thickness ranging from 0.01 to 2 mm and typically these finned elements enhance the heat surface area thereby conducting heat at faster rate and effectively. These finned structures rely solely only on thermal conductivity and surface area for heat dissipation. It is of great interest to incorporate PCM in such heat sinks to increase the heat storage capacity and heat transfer rates. But the limitations/disadvantages of using PCM in such applications is poor thermal conductivity, PCM leakage, poor mechanical strength especially in liquid state of PCM and thickness restriction of less than 1 mm.

The novel PCM composite in this invention described under Concepts 1-4 addresses all the above mentioned limitations and disadvantages especially the ability to fabricate very thin PCM composite material with very high thermal conductivity >10 W/m-K, minimum thickness >10 micron, heat storage capacity >100 kJ/kg-K and very good mechanical compressive strength.

The application of the novel PCM composite material for use in finned heat sink applications is shown in FIGS. 41a-41d. The traditional current state-of-art finned heat sink material is shown in FIG. 41a and includes metallic finned heat sink 4170 coupled to heat source 4172 via a layer of thermal interface material (TIM) 4174. Heat is removed from the source 4172 by conduction via the TIM 4174 and finned heat sink 4170 and then dissipated via convection.

In FIG. 41b, the PCM composite material 4700 was placed in between the finned heat sink 4170 and the heat source 4172. In this arrangement, the heat was dissipated by conduction as follows—Heat Source 4172 >>TIM 4174 >>PCM Composite material 4100 >>finned heat sink 4170. In addition to the conduction pathway shown here, large amount of heat was also stored as latent heat by the PCM material when it underwent phase transition.

FIG. 41c has similar arrangement as FIG. 41b with the addition of the novel PCM composite material in between the fin structures of the heat sink thereby increasing the heat removal capacity of the heat sink further.

FIG. 41d shows PCM heat sink 4176 that is completely fabricated using the PCM composite material including the fin elements of the heat sink.

FIGS. 41a-d depict finned heat sink concepts. In particular, FIG. 41a depicts a traditional metal heat sink attached to heat source; FIG. 41b depicts a traditional heat sink material attached to heat source via PCM Composite material 4100; FIG. 41c is similar to FIG. 41b with the addition of PCM Composite material 4100 in between the finned structures 4170; and FIG. 41d depicts a system where the traditional metal fins were replaced by multilayer PCM Composite material 4100 to form a PCM heat sink 4176.

Example 10—Cross-Sectional Views of Multilayer PCM Composite Materials

Figure 24:
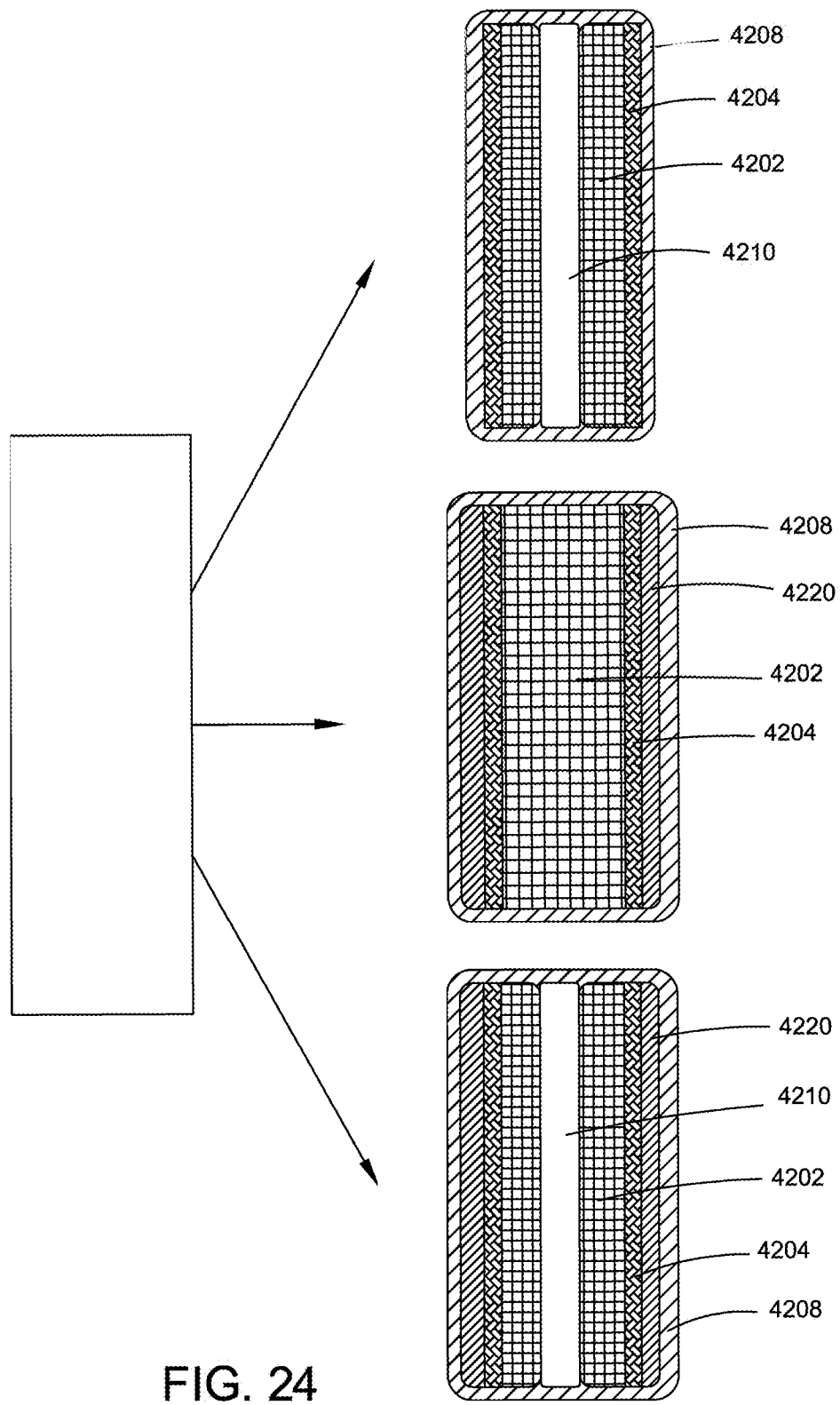
FIG. 24 depict multiple embodiments of cross-sectional views of a multilayer PCM comosite materials.
Figure 38:
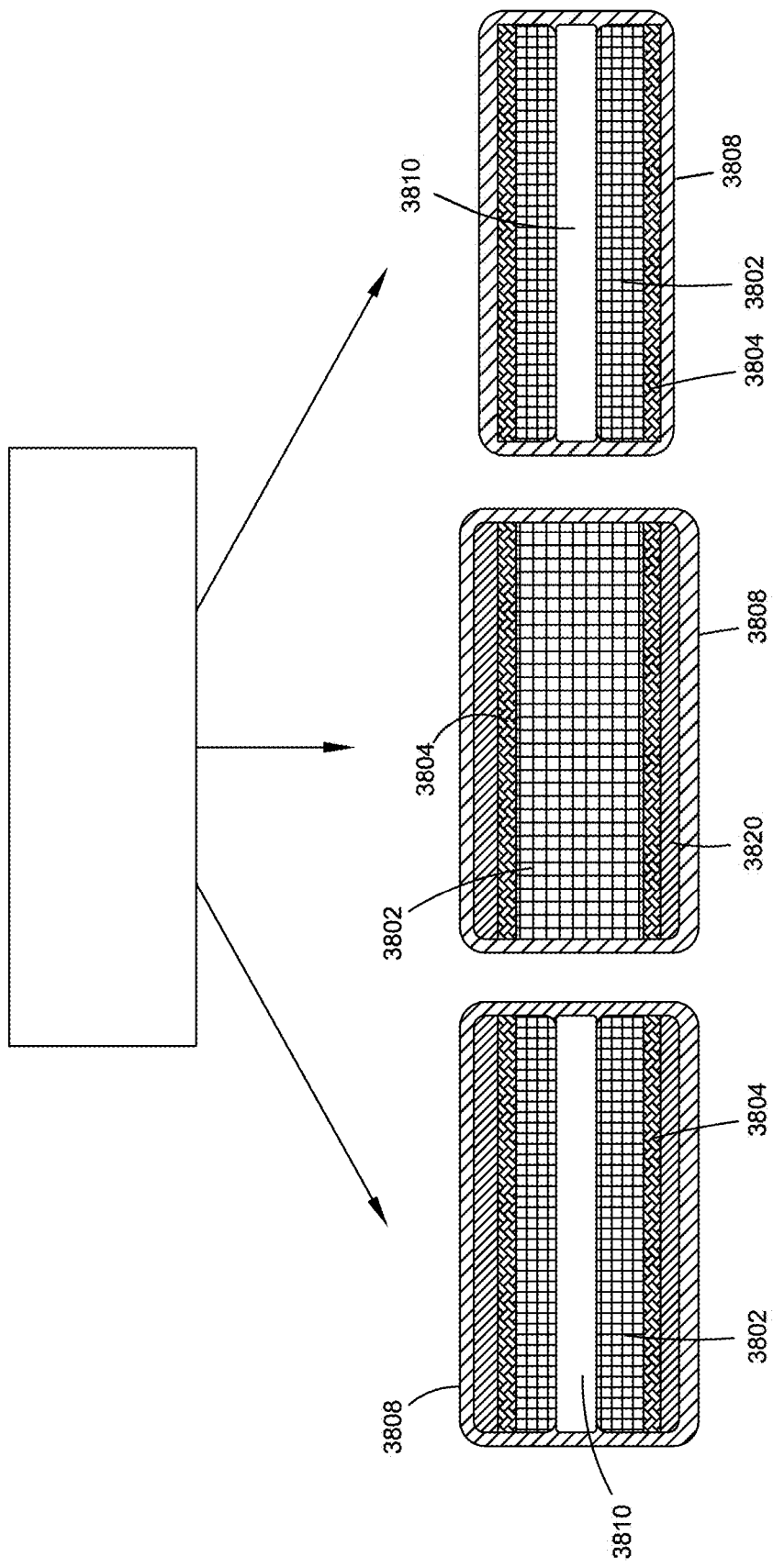
FIG. 38 depict use of multilayer PCM Composite material in a thermal management system for a battery system.

FIGS. 38 and 24 depict multiple cross-sectional views of multilayer PCM composite materials. FIG. 38 includes cross-sections of multilayer PCM composite materials that include PCM 3802 (i.e., PCM and/or PCM encapsulation material), porous structure 3804, coating 3808, fire retardant material 3810 and high thermal conductivity material 3820. FIG. 24 includes cross-sections of multilayer PCM composite materials that include PCM 4202 (i.e., PCM and/or PCM encapsulation material), porous structure 4204, coating 4208, fire retardant material 4210 and high thermal conductivity material 4220.

Figure 39:
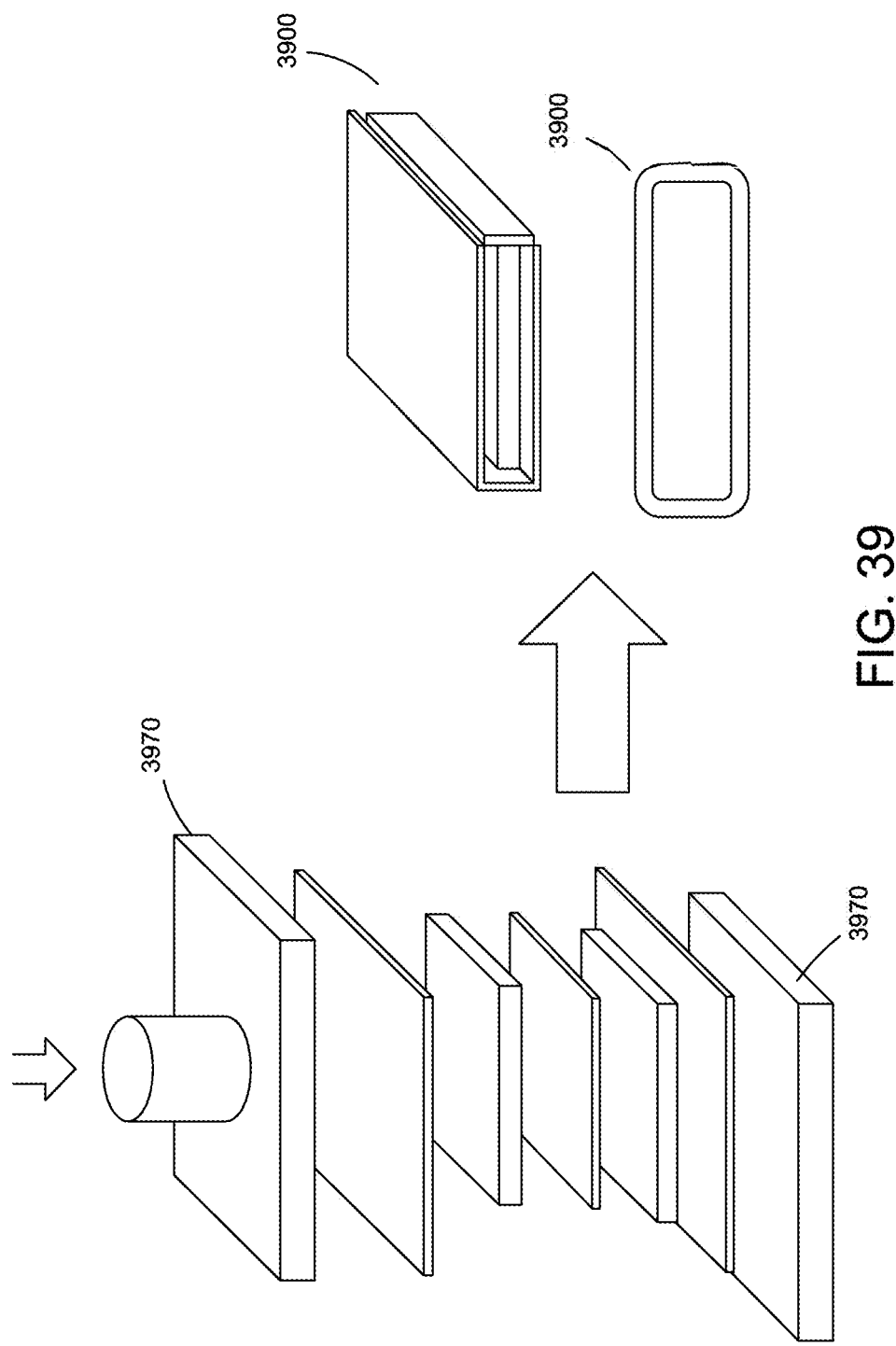
FIG. 39 depicts an exploded perspective view of materials used to fabricate a multilayer PCM composite material.

Example 11—Materials & Methods Used to Fabricate a Multilayer PCM Composite Material FIG. 39 depicts an exploded perspective view of materials used to fabricate a multilayer PCM composite material using compression molding, as well as the multilayer PCM composite material 3900 in perspective and cross-sectional views. A compression molding press process to fabricate multilayer PCM composite material may be operated at a pressure in a range from between about 50 psi to about 1000 psi. The compression platens 3970 and/or mold may be operated at a temperature of about 20° C. upto (Tm+/−10° C.), where Tm=Melting Temperature of the PCM. Materials may or may not be pre-heated inside the compression mold.

Figure 40:
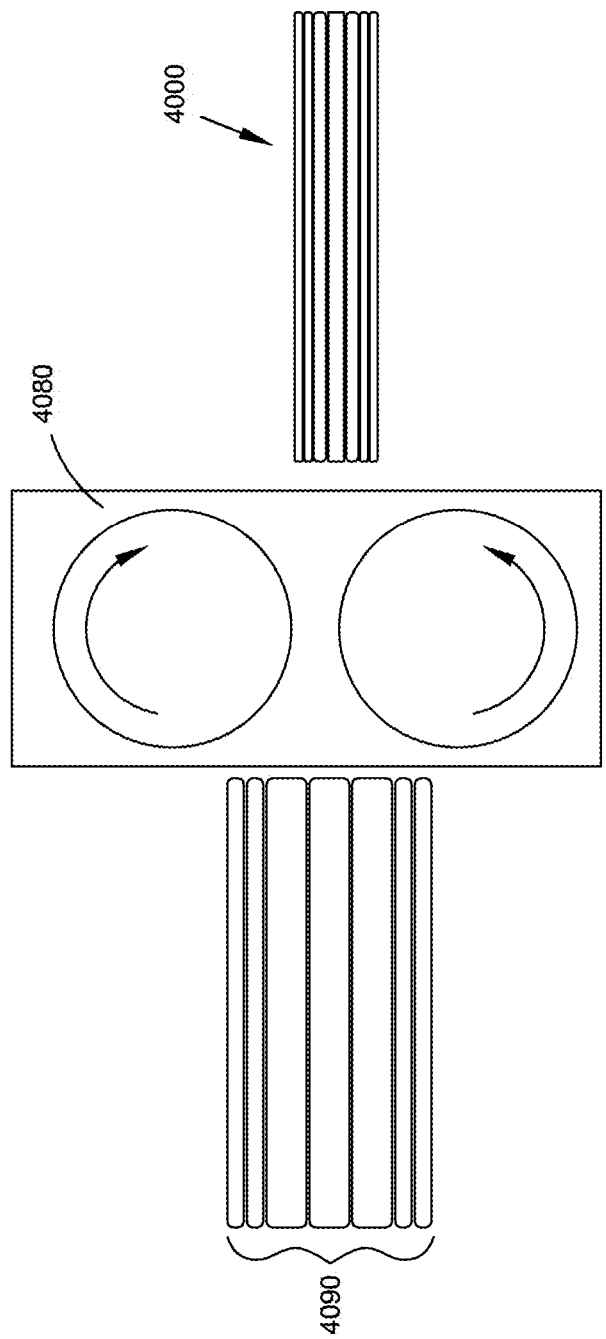
FIG. 40 depicts the calendering process of method 2 for fabricating a multilayer PCM composite material.

Multilayer PCM Composite Material was fabricated by applying a force to multiple materials for use in a multilayer PCM composite material. For example, compression molding, a calendaring press method, and/or any method used to manufacture continuous sheet such as paper may be used to form the multilayer PCM composite material 3900. Two most commonly used methods are illustrated in FIGS. 39 and 40 here to manufacture a multilayer PCM composite material configuration. FIG. 40 depicts the calendering process 4080 of method 2 for fabricating a multilayer PCM composite material 4000 from materials 4090.

Example 12—Multilayer PCM Composite Materials for Portable Electronics

Figure 36A:
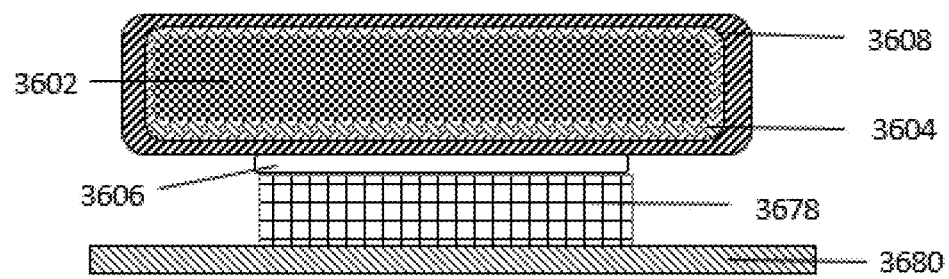
FIGS. 36a and 36b depict use of multilayer PCM Composite materials in a thermal management system for portable electronics.
Figure 36B:
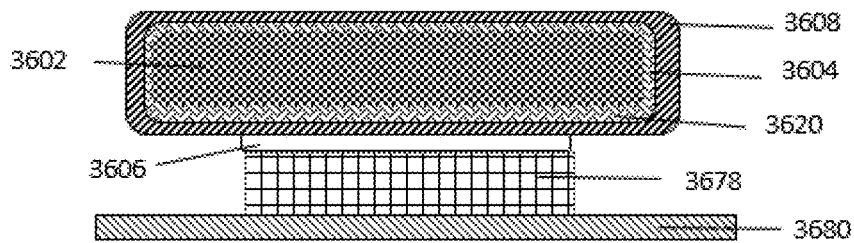

FIGS. 36a and 36b depict use of multilayer PCM Composite materials in a thermal management system for portable electronics. Multilayer PCM-Graphite composite material was used as a heat Spreader and/or TIM.

Different configurations of the Multilayer PCM-Graphite Material were used to remove heat from electronic components like CPU 3678. Depicted are two configurations of multilayer PCM-Graphite composite material used. FIGS. 36a and 36b show the cross-sectional view of the multilayer PCM composite material on top on the CPU 3678 chip mounted on the PCB 3680. Thickness of the multilayer PCM composite material were in a range from about 0.05 mm to about 5 mm. In some embodiments, it may be desired for the multilayer PCM composite material to be in a range from about 0.05 to about 0.5 mm.

As shown in FIG. 36a, multilayer PCM composite material 3600 may include PCM 3602 (i.e., PCM and/or PCM encapsulation material), porous structure 3604, coating 3608, thermal interface material ("TIM") 3606.

As shown in FIG. 36b, multilayer PCM composite material 3600 may include PCM 3602 (i.e., PCM and/or PCM encapsulation material), porous structure 3604, coating 3608, and high thermal conductivity material 3620.

Although the present invention and its advantages have been described in detail, it should be understood that various changes, substitutions and alterations can be made herein without departing from the spirit and scope of the invention as defined in the appended claims.

The invention is further described by the following numbered paragraphs:

1. A thermal management system, comprising: at least one energy storage device; and a housing structure, comprising: an external casing; a first heat sink element positioned proximate to the external casing, comprising: a flame-retardant material; and a liquid phase change material; and at least one opening in the housing structure to house the at least one energy storage device.

2. The system of paragraph 1 wherein the first heat sink element comprises at least one channel traversing the external casing with at least one inlet and at least one outlet.

3. The system of paragraph 1 wherein the phase change material is water.

4. The system of paragraph 1 wherein the flame-retardant material is a fire-retardant material.

5. The system of paragraph 1 wherein the flame-retardant material comprises an open cell foam with interconnected network structure.

6. The system of paragraph 1 wherein the flame-retardant material comprises pores and has a porosity of at least 50%.

7. The system of paragraph 1 wherein the flame-retardant material comprises a hydrophilic material.

8. The system of paragraph 1 wherein the at least one energy storage device is in thermal communication with the first heat sink element.

9. The system of paragraph 1 wherein at least a portion of the first heat sink element surrounds at least part of the at least one opening.

10. The system of paragraph 1 wherein the at least one opening is defined by at least a portion of the first heat sink element.

11. The system of paragraph 1 further comprising an internal casing element of the housing structure proximate to the at least one energy storage device.

12. The system of paragraph 1 further comprising at least one internal casing element of the housing structure and wherein the first heat sink element is positioned between the internal casing element and the external casing and wherein the at least one energy storage device is in thermal communication with the first heat sink element.

13. The system of paragraph 1 further comprising at least one internal casing element of the housing structure defining the at least one opening.

14. The system of paragraph 1 further comprising at least one internal casing element of the housing structure defining the at least one opening sized to fit the at least one energy storage device.

15. The system of paragraph 1 wherein the at least one energy storage device comprises a first group of energy storage devices and a second group of energy storage devices, and wherein the first group and the second group are separated from each other by an interior divider wall comprising a second heat sink element.

16. The system of paragraph 14 further comprising at least one internal casing element of the housing structure and wherein the first heat sink element is positioned between the internal casing element and the external casing and wherein the at least one energy storage device is in thermal communication with the first and second heat sink elements.

17. The system of paragraph 1 wherein the heat removal capacity per unit mass (or per unit volume) of the first heat sink is at least 20 J/g/cc.

18. The system of paragraph 1 further comprising a pressure release on the housing structure.

19. The system of paragraph 1 further comprising an aperture in the housing structure through which the liquid phase change material can be replenished.

20. The system of paragraph 1 further comprising a simple condensation mechanism coupled to the housing structure.

21. The system of paragraph 1 further comprising a water vapor condensation cap in the housing structure configured to capture water vapor and condense the water vapor during use such that liquid water is distributed throughout the flame-retardant material.

22. The system of paragraph 1 wherein the flame-retardant material is hydrophilic and comprises pores and wherein the liquid phase change material comprises water distributed throughout the flame-retardant material.

23. A thermal management system for exothermic devices, comprising: a housing structure configured to surround a device that generates heat, formed from a heat sink material, wherein the heat sink material comprises: a porous flame-retardant material having a porosity greater than 50%; and a liquid phase change material; wherein the liquid phase change material is distributed throughout the porous material prior to use.

24. A battery pack comprising: at least one battery, wherein said battery has a first outer surface; a battery enclosure wall comprising a first inner surface and a first outer surface; an internal battery holder having a first outer surface and a first inner surface, wherein the first outer surface of the battery holder is coupled to the first inner surface of the battery enclosure wall, thereby forming an internal reservoir and wherein the first inner surface of the internal battery holder is coupled to the first outer surface of at least one said battery, thereby inhibiting and/or preventing direct contact between the internal reservoir and the at least one battery; wherein said internal reservoir contains flame— retardant material and water.

25. The battery pack according to paragraph 24, wherein the flame-retardant material is porous.

26. The battery pack according to paragraph 24, wherein the flame-retardant material is a fire-retardant foam.

27. The battery pack according to paragraph 26, wherein the flame-retardant foam is a hydrophilic foam and has a pore size in the range of 0.001 microns to 1 mm.

28. The battery pack according to paragraph 25, wherein the flame-retardant material is a water-absorbing flame-retardant material.

29. The battery pack according to paragraph 25, wherein the flame-retardant material is a metal foam.

30. The battery pack according to paragraph 23, wherein the flame-retardant material is a carbon graphite foam.

31. The battery pack according to paragraph 24, wherein the battery enclosure wall further comprises a vapor condensation cap.

32. The battery pack according to paragraph 24, wherein the battery enclosure wall further comprises an addition port.

33. The battery pack according to paragraph 24, wherein the battery enclosure wall further comprises a pressure valve.

34. A thermal management system for managing the temperature of an energy storage device comprising: at least one energy storage device, wherein said energy storage device has a first outer surface; an enclosure wall comprising a first inner surface and a first outer surface; an internal energy storage device holder having a first outer surface and a first inner surface, wherein the first outer surface of the internal device holder is coupled to the first inner surface of the enclosure wall, thereby forming an internal reservoir and wherein the first inner surface of the internal energy storage device holder is coupled to the first outer surface of at least one said energy storage device, thereby inhibiting and/or preventing direct contact between the internal reservoir and the at least one energy storage device; wherein said internal reservoir contains a fire-retardant material and water.

35. The thermal management system according to paragraph 34, wherein the fire-retardant material is porous.

36. The thermal management system according to paragraph 34, wherein the fire-retardant material is a fire-retardant foam.

37. The thermal management system according to paragraph 36, wherein the fire-retardant foam is a hydrophilic foam and has a pore size of 0.001 microns to 1 mm.

38. The thermal management system according to paragraph 34, wherein the fire-retardant material is a water-absorbing flame-retardant material.

39. The thermal management system according to paragraph 35, wherein the fire-retardant material is a metal foam.

40. The thermal management system according to paragraph 35, wherein the fire-retardant material is a carbon graphite foam.

41. The thermal management system according to paragraph 34, wherein the enclosure wall further comprises a vapor condensation cap.

42. The thermal management system according to paragraph 34, wherein the enclosure wall further comprises an addition port.

43. The thermal management system according to paragraph 34, wherein the enclosure wall further comprises a pressure valve.

44. The thermal management system according to paragraph 34, wherein the energy storage device is a battery.

45. The thermal management system according to clam 34, wherein the battery is a lithium-ion battery.

46. A method for reducing the thermal aging or reduced power output of an energy storage device, which comprises using the thermal management system according to paragraph 34.

47. The method according to paragraph 46, wherein the energy storage device is a battery.

48. The method according to paragraph 47, wherein the battery is a lithium-ion battery.

49. A method for reducing thermal runaway in an energy storage device which comprises using the thermal management system according to paragraph 34.

50. A battery pack comprising: at least one lithium-ion battery, wherein said battery has a first outer surface; a battery enclosure wall comprising a first inner surface and a first outer surface; an internal battery holder having a first outer surface and a first inner surface, wherein the first outer surface of the battery holder is coupled to the first inner surface of the battery enclosure wall, thereby forming an internal reservoir and wherein the first inner surface of the internal battery holder is coupled to the first outer surface of at least one said battery thereby preventing direct contact between the internal reservoir and the at least one battery; said internal reservoir contains a hydrophilic flame-retardant material comprising pores, wherein said pores contain water.

51. In a method for thermal management of an energy storage device comprising a phase change material layer, the improvement which comprises including water encapsulated in pores of a material hydrophilic fire-retardant material.

52. The method of paragraph 51, wherein the energy storage device is a battery.

53. A phase change material composite structure comprising: a supporting structure comprising pores; and a phase change material positioned within the pores of the supporting structure.

54. The composite structure of paragraph 53 further comprises a channel traversing the supporting structure wherein a fluid introduced at a first end of the channel and is wherein the first heat sink element comprises at least one channel traversing the external casing with at least one inlet and at least one outlet.

55. The composite structure of paragraph 53 wherein the supporting structure comprises at least one of graphite, carbon, a thermoplastic or a metal.

56. The composite structure of paragraph 53 wherein the supporting structure comprises expanded graphite.

57. The composite structure of paragraph 53 wherein the supporting structure is formed from at least one of fiber, powder, filament, or sheet.

58. The composite structure of paragraph 53, further comprising a support element formed from at least one of paper, cloth, or a structural element.

59. The composite structure of paragraph 53, further comprising a support element comprising at least one of carbon, graphite, plastic or metal.

60. The composite structure of paragraph 53, further comprising a support element and wherein at least one of the supporting structure or the support element is formed at least in part by additive manufacturing, sintering, printing, molding, extrusion, deposition, jetting, knitting, braiding, or weaving.

61. The composite structure of paragraph 53 wherein the phase change material comprises at least one of water, paraffin, or wax.

62. The composite structure of paragraph 53 wherein the phase change material is encapsulated.

63. The composite structure of paragraph 53 wherein the phase change material is encapsulated using a polymer coating.

64. The composite structure of paragraph 53 wherein at least 5% of the pores in the supporting structure are filled with PCM.

65. The composite structure of paragraph 53 wherein the PCM occupies about 25% to about 95% of the void space of the pores in the supporting structure when the PCM is in the solid phase.

66. The composite structure of paragraph 53 wherein the PCM has a melt temperature in a range from about 25° C. to about 80° C.

67. The composite structure of paragraph 53 wherein the PCM has a melt temperature in a range from about 30° C. to about 50° C.

68. The composite structure of paragraph 53 further comprises a support element on a surface of the PCM composite structure.

69. The composite structure of paragraph 66 wherein the support element on the surface of the PCM composite structure comprises: a first support element on a first surface of the PCM composite structure; a second support element on a second surface of the PCM composite structure; and an isolation material at an outer edge of the PCM composite structure positioned between the first and second support elements such that the PCM is isolated from the surrounding structures.

70. The composite structure of paragraph 67 further comprising a coating.

71. The composite structure of paragraph 70 wherein the coating covers exterior surfaces of the composite structure.

72. The composite structure of paragraph 53 wherein the supporting structure and the PCM are coupled together and the resulting material has a thickness in a range from about 10 micron to about 1 mm and further comprising a support element.

73. A thermal management system, comprising: at least one heat generating device; and a heat sink positioned proximate the at least one heat generating device, comprising: a first heat sink zone comprising a first heat transfer rate from a first portion of a heat generating device comprising: a phase change material composite structure comprising: a supporting structure comprising pores; a phase change material positioned within the pores of the supporting structure; and a second heat sink zone comprising a second heat transfer rate from a second portion of the heat generating device.

74. The system of paragraph 73 wherein the supporting structure comprises at least one of a flame-retardant material and a fire-retardant material.

75. The system of paragraph 73 wherein the phase change material comprises at least one of water, wax, and paraffin.

76. The system of paragraph 73 wherein the phase change material occupies from 5% to 95% of a porosity of the supporting structure prior to use.

77. The system of paragraph 73 wherein the phase change material occupies from 20% to 85% of a porosity of the supporting structure prior to use.

78. The system of paragraph 73 wherein the phase change material occupies from 40% to 80% of a porosity of the supporting structure prior to use.

79. The system of paragraph 73 wherein the phase change material comprises water and the a supporting structure comprises fire-retardant foam such that the phase change material composite structure comprises a water-infused fire-retardant foam.

80. The system of paragraph 73 wherein at least one of the first or second heat sink zones comprises a non-porous thermally conducting material.

81. The system of paragraph 73 wherein the second heat sink zones comprises at least one channel.

82. The system of paragraph 73 wherein the second heat sink zone comprises at least one channel that allows for fluid flow during use such that a fluid is forced through the channel at a predetermined rate.

83. The system of paragraph 82 wherein the fluid comprises at least one of air, water, ethylene glycol, propylene glycol, silicone oil, mineral oil, dielectric oil, or liquid refrigerant.

84. The system of paragraph 73, further comprising a coating on a surface of the phase change material composite structure.

85. The system of paragraph 73, further comprising a thermal interface material positioned between the phase change material composite structure and the heat source.

86. The system of paragraph 73, further comprising a first heat sink element positioned proximate the phase change material composite structure.

87. The system of paragraph 73 wherein the phase change material is at least partially encapsulated.

88. The system of paragraph 73, wherein phase change material composite structure comprises a geometry designed to enhance thermal transfer.

89. The system of paragraph 73, wherein phase change material composite structure comprises fins.

90. The system of paragraph 73, wherein phase change material composite structure is in direct contact with at least a portion of the heat source.

91. The system of paragraph 73 further comprising a heat sink element and wherein the heat source is in thermal communication with the heat sink element.

92. The system of paragraph 73 further comprising a heat sink element and wherein the heat source is in thermal communication with the heat sink element and the phase change material composite structure.

93. A thermal management system for exothermic devices, comprising: a phase change material composite structure; a thermal interface material; and a heat sink; wherein at least one of the phase change material composite structure, the thermal interface material; and the heat sink are in thermal communication with the exothermic device.

Having thus described in detail embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A multilayer phase change material composite structure comprising:
    a first layer comprising:
        a supporting structure comprising pores; and
        a phase change material positioned within the pores of the supporting structure;
    a support element on a surface of the phase change material composite structure; and
    an isolation material at an outer edge of the phase change material composite structure such that the phase change material is isolated from surrounding structures.

2. The composite structure of claim 1 wherein the supporting structure comprises at least one of graphite, carbon, a thermoplastic or a metal.

3. The composite structure of claim 1 further comprising a fire-retardant material comprising at least one of a metal foam, a carbon foam, a graphite foam, a carbon-graphite foam, a melamine carbon foam, or melamine fibers.

4. The composite structure of claim 1 wherein the phase change material is at least partially encapsulated.

5. The composite structure of claim 1 wherein the phase change material occupies about 25% to about 95% of the void space of the pores in the supporting structure when the phase change material is in the solid phase.

6. The composite structure of claim 1, wherein the support element is formed from at least one of paper, cloth, carbon, graphite, plastic, metal, or a structural element.

7. The composite structure of claim 1, further comprising a thermal interface material positioned between the phase change material composite structure and a heat source during use.

8. The composite structure of claim 1 wherein phase change material composite structure comprises fins.

9. The composite structure of claim 1 wherein the phase change material has a melt temperature in a range from about 25° C. to about 80° C.

10. The composite structure of claim 1, wherein at least some of the phase change composite material is positioned proximate one or more heat sources during use.

11. The composite structure of claim 1, wherein at least some of the phase change composite material is sandwiched between two or more heat sources during use.

12. The composite structure of claim 1, further comprising at least one heat sink on one surface of the composite structure.

13. The composite structure of claim 12 wherein the heat sink comprises at least one channel that allows for fluid flow during use such that a fluid is forced through the channel at a predetermined rate wherein the fluid comprises at least one of air, water, ethylene glycol, propylene glycol, silicone oil, mineral oil, dielectric oil, or liquid refrigerant.

14. The composite structure of claim 1 wherein the isolation material is positioned proximate at least one of a surface of the phase change material composite structure, a surface of the first surface element, and a surface of the second support element.

15. A multilayer phase change material composite structure comprising:
    a layer comprising:
        a supporting structure comprising pores; and
        a phase change material positioned within the pores of the supporting structure;
    a first support element on a first surface of the phase change material composite structure;
    a second support element on a second surface of the phase change material composite structure; and
    an isolation material at an outer edge of the phase change material composite structure positioned between the first and second support elements such that the phase change material is isolated from the surrounding structures and is positioned proximate at least one of a surface of the phase change material composite structure, a surface of the first support element, and a surface of the second support element.

16. The composite structure of claim 15 further comprising a fire-retardant material comprising at least one of a metal foam, a carbon foam, a graphite foam, a carbon-graphite foam, a melamine carbon foam, or melamine fibers.

17. The composite structure of claim 15 wherein the phase change material is at least partially encapsulated.

18. The composite structure of claim 15 wherein the phase change material occupies about 25% to about 95% of the void space of the pores in the supporting structure when the phase change material is in the solid phase.

19. The composite structure of claim 15, wherein the support element is formed from at least one of paper, cloth, carbon, graphite, plastic, metal, or a structural element.

20. The composite structure of claim 15 wherein the supporting structure comprises at least one of graphite, carbon, a thermoplastic or a metal.

* * * * *